(12) United States Patent
Kim et al.

(10) Patent No.: US 11,336,413 B2
(45) Date of Patent: May 17, 2022

(54) METHOD FOR TRANSMITTING/RECEIVING REFERENCE SIGNAL IN WIRELESS COMMUNICATION SYSTEM, AND DEVICE THEREFOR

(71) Applicant: LG ELECTRONICS INC., Seoul (KR)

(72) Inventors: Kyuseok Kim, Seoul (KR); Jiwon Kang, Seoul (KR); Hyungtae Kim, Seoul (KR); Kilbom Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/610,892

(22) PCT Filed: Jan. 23, 2018

(86) PCT No.: PCT/KR2018/001031
§ 371 (c)(1),
(2) Date: Nov. 4, 2019

(87) PCT Pub. No.: WO2018/203592
PCT Pub. Date: Nov. 8, 2018

(65) Prior Publication Data
US 2021/0281374 A1    Sep. 9, 2021

Related U.S. Application Data

(60) Provisional application No. 62/501,120, filed on May 4, 2017.

(51) Int. Cl.
*H04L 5/00* (2006.01)
*H04J 13/00* (2011.01)
(Continued)

(52) U.S. Cl.
CPC ........ *H04L 5/0051* (2013.01); *H04J 13/0048* (2013.01); *H04J 13/18* (2013.01); *H04L 25/00* (2013.01)

(58) Field of Classification Search
CPC .... H04L 5/0051; H04L 25/00; H04J 13/0048; H04J 13/18
See application file for complete search history.

(56) References Cited

U.S. PATENT DOCUMENTS 9,197,386 B2* 11/2015 Lee ................ H04L 5/0048
10,880,717 B2* 12/2020 Xiong .............. H04W 76/10
(Continued)

FOREIGN PATENT DOCUMENTS

| WO | 2012177047 | 12/2012 |
|----|------------|---------|
| WO | 2015194825 | 12/2015 |
| WO | 2016010379 | 1/2016 |

OTHER PUBLICATIONS

PCT International Application No. PCT/KR2018/001031, International Search Report dated Apr. 25. 2018, 2 pages.
(Continued)

*Primary Examiner* — Jean B Corrielus
(74) *Attorney, Agent, or Firm* — Lee Hong Degerman Kang Waimey

(57) ABSTRACT

A method and a device, which: receive, from a base station through a demodulation reference signal (DMRS) symbol, a DMRS set according to a specific pattern by the base station, wherein the DMRS is transmitted in a specific antenna port and positioned on one or two time axis symbols, which are the same as at least one other DMRS transmitted in another antenna port; and decode data by using the DMRS.

18 Claims, 44 Drawing Sheets

(51) Int. Cl.
*H04J 13/18* (2011.01)
*H04L 25/00* (2006.01)

(56) References Cited

U.S. PATENT DOCUMENTS

| | | | |
|---|---|---|---|
| 2015/0236882 A1* | 8/2015 | Bertrand | H04L 25/022 |
| | | | 370/329 |
| 2018/0109938 A1* | 4/2018 | Xiong | H04W 8/005 |
| 2019/0045460 A1* | 2/2019 | Muruganathan | H04B 7/0482 |
| 2019/0141675 A1* | 5/2019 | Blasco Serrano | H04L 27/2613 |
| 2020/0136775 A1* | 4/2020 | Suzuki | H04L 5/0007 |
| 2021/0111937 A1* | 4/2021 | Gao | H04L 5/0051 |
| 2021/0194744 A1* | 6/2021 | Hessler | H04L 27/2607 |

OTHER PUBLICATIONS

Huawei, HiSilicon, "Design of DL DMRS for data transmission", R1-1704233, 3GPP TSG RAN WG1 Meeting #88bis, Apr. 2017, 6 pages.
LG Electronics, "On DL DMRS Design", R1-1704887, 3GPP TSG RAN WG1 Meeting #88bis, Apr. 2017, 4 pages.

* cited by examiner (a)

(b)

(a)

(b)

(a)

(b)

(a)

(b)

(a)

(b)

(a)

(b)

(a)

(b)

(a)

(b)

PDCCH
DMRS port v, v+2
DMRS port v+1, v+3

(a)

(b)

CDMF-length_4 & CDMT-length 2

(a)

(b)

PDCCH
DMRS port v, v+2, v+4, v+6, v+8, v+10, v+12, v+14
DMRS port v+1, v+3, v+5, v+7, v+9, v+11, v+13, v+15

(a)

(b)

(a) CDMF-length 2 & FDM 2

(b) FDM 4

(c) CDMT-length 2 & FDM 2

(a) CDMF-LENGTH 3 AND FDM 2 USING REPETITION PATTERN (b) CDMF-length 3 & FDM 2

(a) CDMF-LENGTH 4 AND FDM 2 USING REPETITION PATTERN (b) CDMF-length 2 & FDM 2 & TDM2

(c) CDMT-length 2 & FDM 4

(a) CDMF-LENGTH 6 AND FDM 2 USING REPETITION PATTERN (b) CDMF-length 3 & FDM 2 & TDM 2

(c) CDMF-length 3 & CDMT- length 2

ABSTRACT

METHOD FOR TRANSMITTING/RECEIVING REFERENCE SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/001031, filed on Jan. 23, 2018, which claims the benefit of U.S. Provisional Application No. 62/501,120, filed on May 4, 2017, the contents of which are all hereby incorporated by reference herein in their entirety.

TECHNICAL FIELD

The present disclosure relates to a wireless communication system and, more particularly, to a method and apparatus for generating a demodulation reference signal (DMRS) for decoding data and transmitting and receiving the generated DMRS in a wireless communication system.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present disclosure has been made in an effort to provide a method and a device for generating and transmitting/receiving a Demodulation Reference Signal (DMRS) for decoding data.

Furthermore, the present disclosure has been made in an effort to provide a method and a device for generating and transmitting/receiving a DMRS for a Common Phase Error (CPE)/Carrier Frequency Offset (CFO) value due to a Doppler Effect.

Furthermore, the present disclosure has been made in an effort to provide a mapping pattern of a demodulation reference signal considering trade-off between overhead due to transmission of a reference signal and channel estimation performance.

Furthermore, the present disclosure has been made in an effort to provide a multiplexing method for extending the number of ports for transmitting a demodulation reference signal.

Furthermore, the present disclosure has been made in an effort to provide a method for mapping a reference signal by using a Code Division Multiplexing scheme on a frequency axis and a time axis.

Furthermore, the present disclosure has been made in an effort to provide a method for generating a demodulation reference signal sequence for generating a demodulation reference signal.

The technical objects of the present disclosure are not limited to the aforementioned technical objects, and other technical objects, which are not mentioned above, will be apparently appreciated by a person having ordinary skill in the art from the following description.

Technical Solution

In order to solve the technical problem, a method for demodulating, by a terminal, data in a wireless communication system according to an embodiment of the present disclosure includes: receiving, from a base station, configuration information related to a configuration of a demodulation reference signal for demodulating the data; receiving, from the base station, the demodulation reference signal transmitted through a plurality of antenna ports based on the configuration information; and demodulating the data by using the received demodulation reference signal, in which the demodulation reference signal is mapped to an Orthogonal Frequency Division Multiplexing (OFDM) symbol according to a specific pattern and multiplexed through a Code Division Multiplexing scheme, and in the Code Division Multiplexing scheme, a cyclic shift code is applied in a frequency domain and an orthogonal cover code is applied in a time domain.

Furthermore, in the present disclosure, the specific pattern is one of a first pattern in which the demodulation reference signal is mapped to one OFDM symbol or a second pattern in which the demodulation reference signal is mapped to two OFDM symbols.

Furthermore in the present disclosure, the demodulation reference signal is transmitted on a specific antenna port among the plurality of antenna ports and positioned on one or two time axis symbols which are the same as at least one another demodulation reference signal transmitted on another antenna port among the plurality of antenna ports.

Furthermore in the present disclosure, a demodulation reference signal sequence for generating the demodulation reference signal is generated by the cyclic shift code, the orthogonal cover code, and a base sequence.

Furthermore in the present disclosure, when the cyclic shift code is $w_{freq,p}(k')$, the orthogonal cover code is $w_{time,p}(l')$, and the base sequence is $r(k'')$, the demodulation reference signal sequence $a_{k,l}^{(p)}$ is generated by one of two following equations.

$$a_{k,l}^{(p)} = w_{time,p}(l') \cdot w_{freq,p}(k') \cdot r(k'')$$

$$a_{k,l}^{(p)} = w_{time,p}(l') \cdot w_{freq,p}(k') \cdot r(k'', l'')$$

Furthermore in the present disclosure, the base sequence is generated in units of one OFDM symbol.

Furthermore in the present disclosure, the base sequence is initialized by an index of the OFDM symbol.

Furthermore, in the present disclosure, the method further includes performing a channel estimation procedure for estimating a channel for receiving the data by using the demodulation reference signal, in which the channel estimation procedure is performed by using a cyclic shift characteristic by the cyclic shift code.

Furthermore, in the present disclosure, a bit number of the configuration information is changed depending on the number of used codewords and the configuration information includes at least one of the number of a plurality of antenna ports, the number of symbols to which the demodulation reference signal is mapped, or the number of layers.

Furthermore, in the present disclosure, the cyclic shift code is a Discrete Fourier Transform (DFT) code, and the orthogonal cover code is a Walsh-Hadamard code.

Further, provided is a terminal demodulating data in a wireless communication system includes: a radio frequency (RF) unit transmitting and receiving a radio signal to and from the outside; and a processor functionally coupled with the RF unit, in which the processor is configured to receive, from a base station, configuration information related to a configuration of a demodulation reference signal for demodulating the data, receive, from the base station, the demodulation reference signal transmitted through a plurality of antenna ports based on the configuration information, and demodulate the data by using the received demodulation reference signal, in which the demodulation reference signal is mapped to an Orthogonal Frequency Division Multiplexing (OFDM) symbol according to a specific pattern and multiplexed through a Code Division Multiplexing scheme, and in the Code Division Multiplexing scheme, a cyclic shift code is applied in a frequency domain and an orthogonal cover code is applied in a time domain.

Advantageous Effects

According to the present disclosure, there is an effect that data can be decoded by estimating Common Phase Error (CPE) and Carrier Frequency Offset (CFO) values due to a Doppler Effect through a DMRS.

Furthermore, according to the present disclosure, there is an effect that a channel can be estimated through an additional DMRS in a High Doppler environment.

Furthermore, according to the present disclosure, there is an effect that a demodulation reference signal is mapped by considering trade-off between overhead due to transmission of a reference signal and channel estimation performance to change a pattern of a DMRS according to a situation of a UE.

Furthermore, according to the present disclosure, there is an effect that it is possible to extend the number of ports for transmitting a demodulation reference signal by using a Code Division Multiplexing (CDM) scheme even on a time axis in addition to a frequency axis.

Furthermore, according to the present disclosure, there is an effect that it is possible to extend the number of ports for transmitting a demodulation reference signal by mapping a reference signal by using multiplexing and repetition.

Furthermore, according to the present disclosure, there is an effect that a channel can be estimated in a time domain by applying code division multiplexing for port multiplexing by using an orthogonal code in each of a frequency domain and a time domain.

Furthermore, according to the present disclosure, there is an effect that channel estimation performance can be enhanced by performing channel estimation in a time domain having lower computational complexity than a frequency domain.

Advantages which can be obtained in the present disclosure are not limited to the aforementioned advantages and other unmentioned advantages will be clearly understood by those skilled in the art from the following description.

DESCRIPTION OF DRAWINGS

The accompany drawings, which are included to provide a further understanding of the present disclosure and are incorporated on and constitute a part of present disclosure illustrate embodiments of the present disclosure and together with the description serve to explain the principles of the present disclosure.

MODE FOR INVENTION

Figure 1:
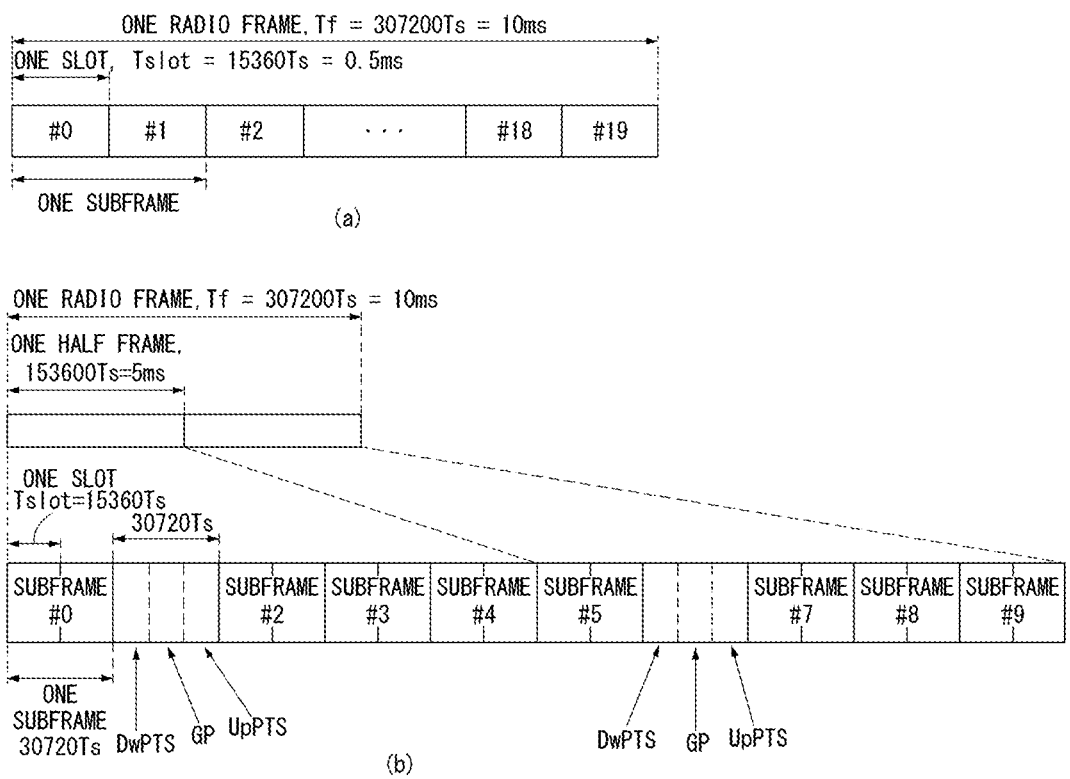
FIG. 1 shows a structure of a radio frame in a wireless communication system to which the present disclosure may be applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In present disclosure, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System to which the Present Disclosure May be Applied

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(*a*) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 's' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half-frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · T_s | 2192 · T_s | 2560 · T_s | 7680 · T_s | 2192 · T_s | 2560 · T_s |
| 1 | 19760 · T_s | | | 20480 · T_s | | |
| 2 | 21952 · T_s | | | 23040 · T_s | | |
| 3 | 24144 · T_s | | | 25600 · T_s | | |
| 4 | 26336 · T_s | | | 7680 · T_s | 4384 · T_s | 5120 · T_s |
| 5 | 6592 · T_s | 4384 · T_s | 5120 · T_s | 20480 · T_s | | |
| 6 | 19760 · T_s | | | 23040 · T_s | | |
| 7 | 21952 · T_s | | | — | — | — |
| 8 | 24144 · T_s | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
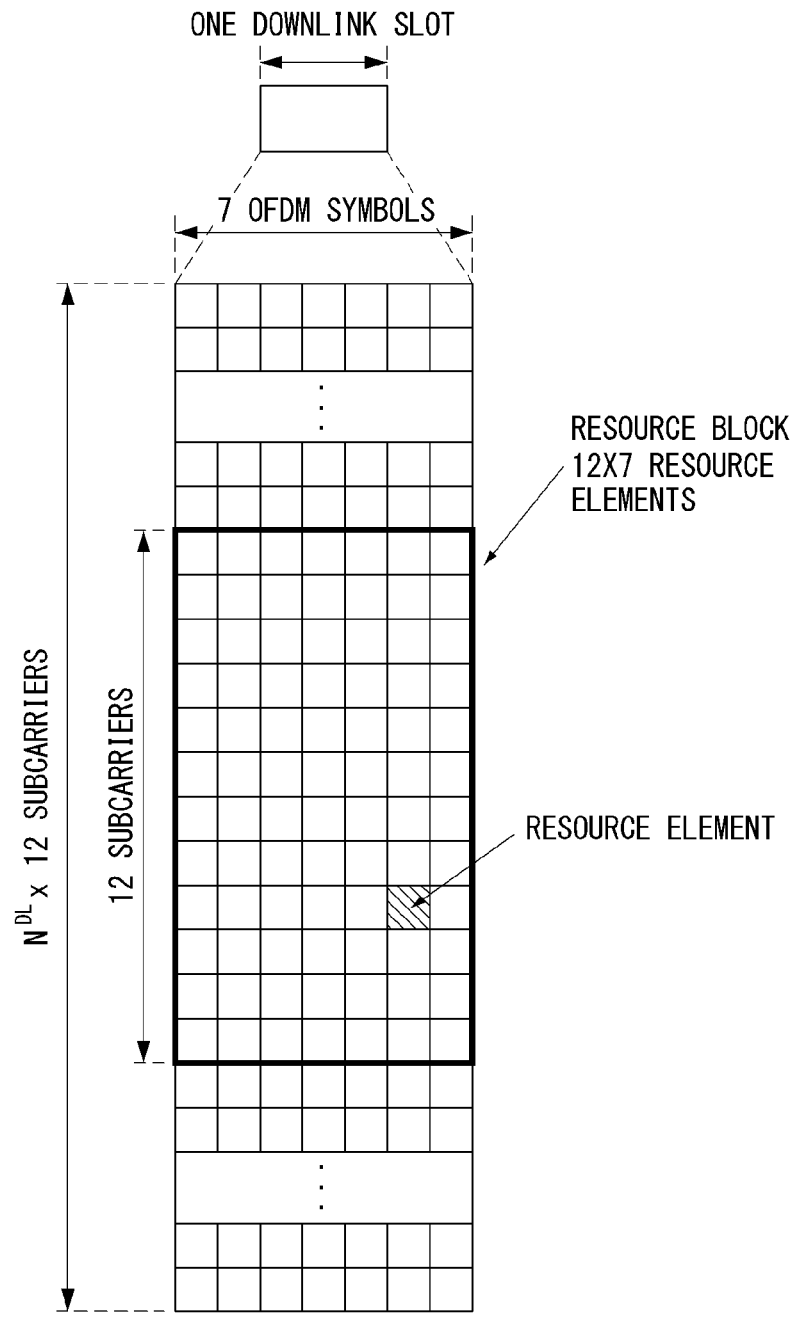
FIG. 2 is a diagram illustrating a resource grid for one downlink slot in a wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
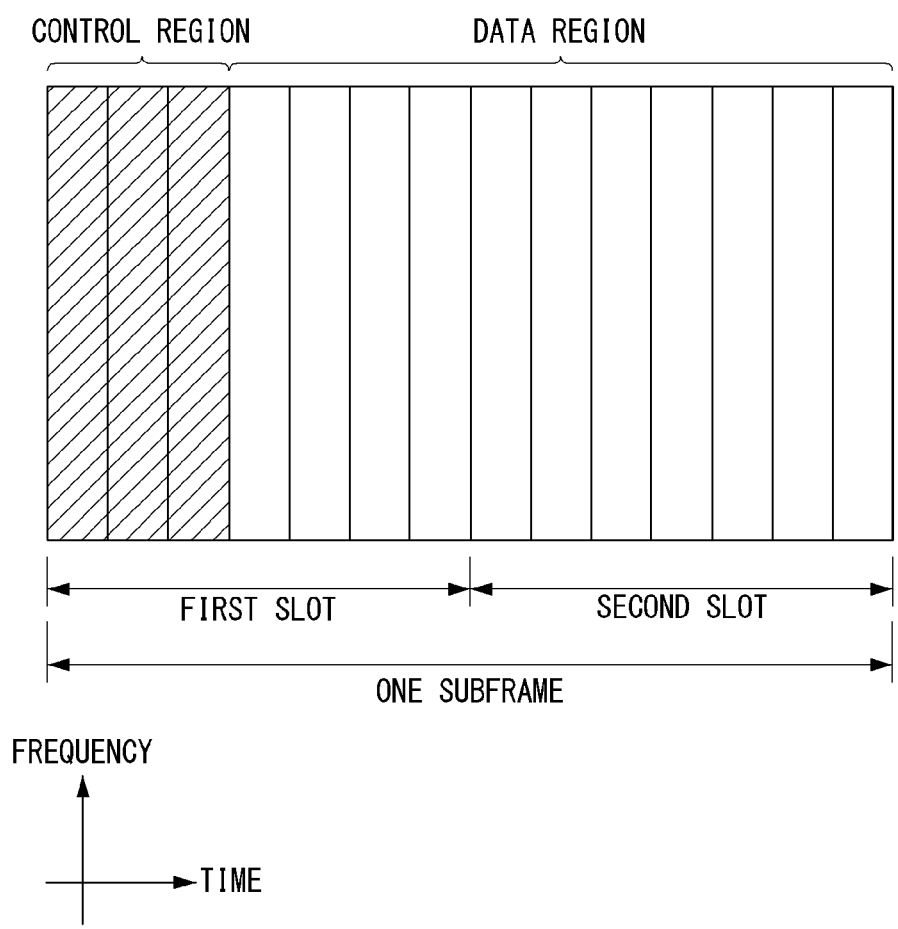
FIG. 3 shows a structure of a downlink subframe in a wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (this is called a Radio Network Temporary Identifier (RNTI)) is masked to the CRC depending on the owner or use of a PDCCH. In the case that the PDCCH is a PDCCH for specific UE, an identifier unique to the UE, for example, a Cell-RNTI (C-RNTI) may be masked to the CRC. Or, in the case that the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
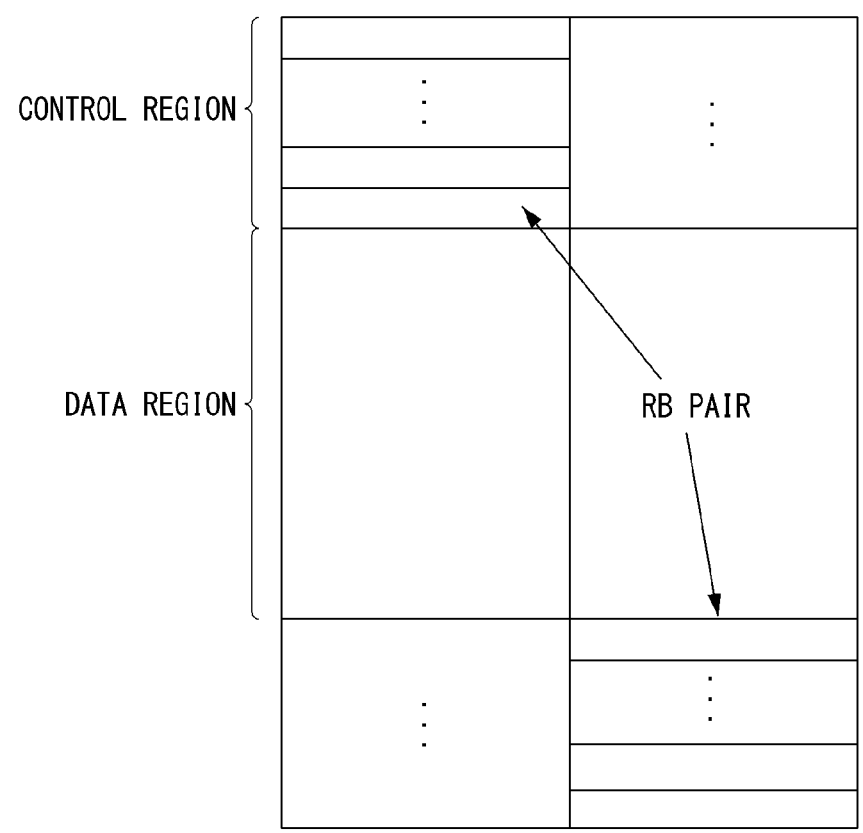
FIG. 4 shows a structure of an uplink subframe in a wireless communication system to which the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, a signal may be distorted during transmission because data is transmitted through a radio channel. In order for a terminal to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 5:
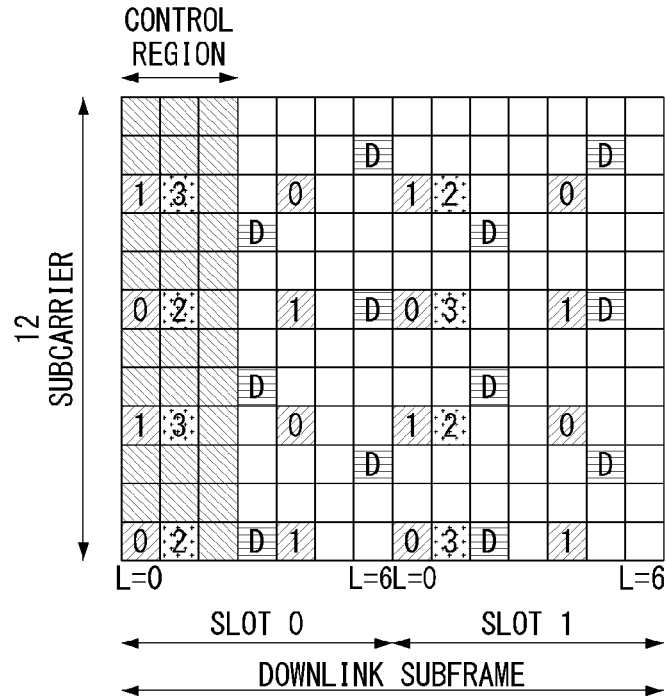
FIG. 5 illustrates a pattern of reference signals mapped to downlink resource block pairs in a wireless communication system to which the present disclosure may be applied.
Figure 5:
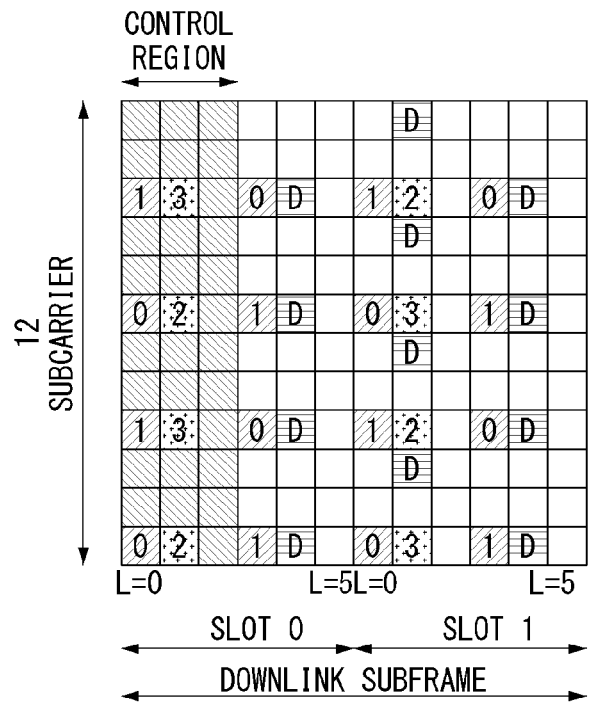

FIG. 5 illustrates reference signal patterns mapped to downlink resource block pairs in a wireless communication system to which the present disclosure may be applied.

Referring to FIG. 5, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 5*a*)

and has a length of 12 OFDM symbols in the case of an extended cyclic prefix (CP) (FIG. 5b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, in the case that the number of transmission antennas of an eNB is two, CRSs for a No. 0 antenna port and a No. 1 antenna port are transmitted. In the case that the number of transmission antennas of an eNB is four, CRSs for No. 0 to No. 3 antenna ports are transmitted.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

The rule of mapping a CRS to a resource block is defined as below.

$$k = 6m + (v + v_{shift}) \bmod 6 \quad \text{[Equation 1]}$$

$$l = \begin{cases} 0, N_{symb}^{DL} & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

-continued $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink, ns represents a slot index and, $N_{ID}^{cell}$ represents a cell ID. The mod represents an modulo operation. The position of the reference signal varies depending on the vshift value in the frequency domain. Since vshift is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific UE in the MIMO antenna transmission is used without a change in order to estimate a channel associated with and corresponding to a transmission channel transmitted in each transmitting antenna when the terminal receives the reference signal.

The 3GPP LTE system (e.g., release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$

$$k' = \begin{cases} 4'm + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift} \bmod 3) & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_2 \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 3 and 4, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks.

$N_{RB}^{PDSCH}$ represents a frequency band of the resource block for the PDSCH transmission. ns represents the slot index and $N_{ID}^{cell}$ represents the cell ID. The mod represents the modulo operation. The position of the reference signal varies depending on the value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmission antennas in the downlink of a base station. Accordingly, an RS for the maximum of 8 transmission antennas must be also supported. In the LTE system, only a downlink RS for a maximum of 4 antenna ports has been defined. In the case that a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, and the like (channel state information-RS, channel state indication-RS (CSI-RS), etc.) and a data demodulation (DM)-RS for data demodulation transmitted in 8 transmission antennas.

The existing CRS is used for channel measurement, the measurement of handover, etc. And for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DM-RS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Communication system using ultra-high frequency band

In a long term evolution (LTE)/LTE-A (LTE Advanced) system, an error value of an oscillator of a user equipment (UE) and a base station (BS) is defined as a requirement and described as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BSs is shown in Table 3 below.

TABLE 3

| BS class | Accuracy |
|---|---|
| Wide Area BS | ±0.05 ppm |
| Local Area BS | ±0.1 ppm |
| Home BS | ±0.25 ppm |

Therefore, a maximum difference of oscillators between the BS and the UE is ±0.1 ppm, and when an error occurs in one direction, a maximum of offset value of 0.2 ppm may occur. This offset value is multiplied by a center frequency and converted into Hz units appropriate for each center frequency.

Meanwhile, in the OFDM system, a center frequency offset (CFO) value appears to be different due to a frequency tone interval, and in general, even a large CFO value has a relatively small effect in the OFDM system having a sufficiently large frequency tone interval. Therefore, an actual CFO value (absolute value) needs to be expressed as a relative value affecting the OFDM system, which is called a normalized CFO. The normalized CFO is expressed as a value obtained by dividing by the CEO value by the frequency tone interval. Table 4 below shows the CFO for each center frequency and oscillator error value and the normalized CFO.

TABLE 4

| Center frequency | Oscillator Offset | | | |
|---|---|---|---|---|
| (subcarrier spacing) | ±0.05 ppm | ±0.1 ppm | ±10 ppm | ±20 ppm |
| 2 GHz(15 kHz) | ±100 Hz (±0.0067) | ±200 Hz (±0.0133) | ±20 kHz (±1.3) | ±40 kHz (±2.7) |
| 30 GHz(104.25 kHz) | ±1.5 kHz (±0.014) | ±3 kHz (±0.029) | ±300 kHz (±2.9) | ±600 kHz (±5.8) |
| 60 GHz(104.25 kHz) | ±3 kHz (±0.029) | ±6 kHz (±0.058) | ±600 kHz (±5.8) | ±1.2 MHz (±11.5) |

In Table 4, when the center frequency is 2 GHz (e.g., LTE Rel-8/9/10), the frequency tone interval (15 kHz) is assumed, and when the center frequency is 30 GHz and 60 GHz, the frequency tone interval of 104.25 kHz is used, thereby preventing performance degradation in consideration of a Doppler effect for each center frequency. Table 2 above is a simple example and it is obvious that other frequency tone intervals may be used for the center frequency.

Meanwhile, a Doppler spread phenomenon significantly occurs in a situation where the UE moves at high speed or moves in a high frequency band. The Doppler spread causes spread in the frequency domain, resulting in distortion of a received signal at the receiver's point of view. The Doppler spread may be expressed as $f_{doppler}(v/\lambda)\cos\theta$. In this case, v is a moving speed of the UE, and λ is a wavelength of a center frequency of a transmitted radio wave. θ is an angle between a received radio wave and the moving direction of the UE. The following description is based on the assumption that θ is zero.

Here, a coherence time is in inverse proportion to the Doppler spread. If the coherence time is defined as a time interval in which a correlation value of a channel response in the time domain is 50% or more, it is expressed as $$T_c \approx \frac{9}{16\pi f_{doppler}}.$$

In the wireless communication system, Equation 4 below, which represents a geometric mean between the equation for Doppler spread and the equation for the coherence time, is mainly used.

$$T_c = \sqrt{\frac{9}{16\pi f_{doppler}}} = \frac{0.423}{f_{doppler}} \quad [\text{Equation 4}]$$

New Radio Access Technology System

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are also considered. In addition, a communication system design considering a service/UE sensitive to reliability and latency is also being discussed.

The introduction of next generation radio access technology considering enhanced mobile broadband communication, massive MTC, ultra-reliable and low latency communication (URLLC) is discussed, and in the present disclosure, the technology is called new RAT (hereinafter, referred to as NR) for convenience.

Figure 6:
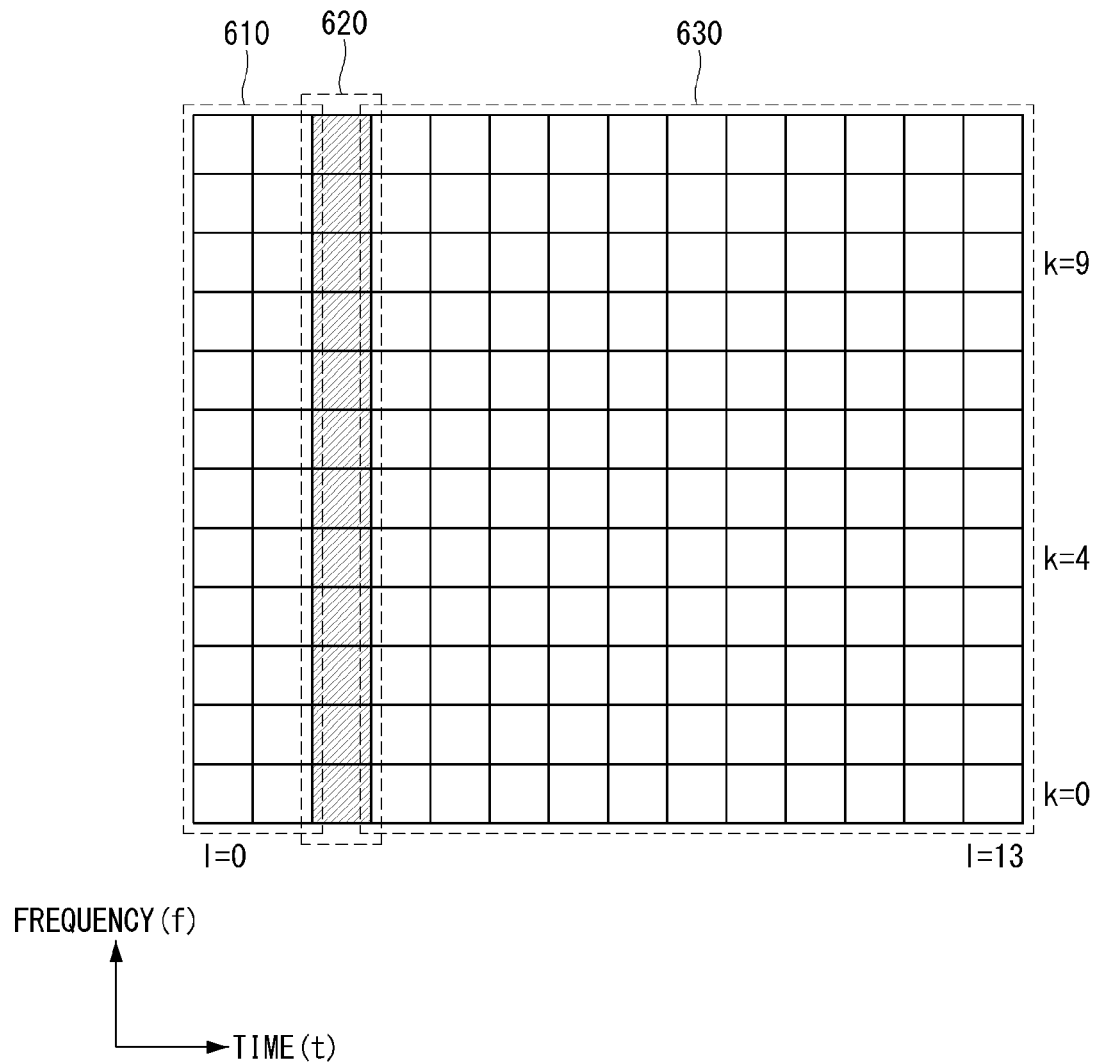
FIG. 6 shows an example of a structure of a resource area used in a communication system using mmWave to which the present disclosure may be applied.

FIG. 6 illustrates one example of a resource region structure used in a communication system using mmWave to which the present disclosure may be applied.

The communication system using an ultra-high frequency band such as mmWave uses a frequency band having a different physical property from an LTE/LTE-A communication system in the related art. As a result, in the communication system using the ultra-high frequency band, a resource structure of a different type from the structure of the resource region used in the communication system in the related art is discussed. FIG. 6 illustrates an example of a downlink resource structure in a new communication system.

When a resource block (RB) pair is considered, which is constituted by 14 Orthogonal Frequency Division Multiplexing (OFDM) symbols on a horizontal axis and 12 frequency tones on a vertical axis, first two (or three) OFDM symbols 1310 may be allocated to a control channel (e.g., Physical Downlink Control Channel (PDCCH), a DeModulation Reference Signal (DMRS) may be allocated to next one to two OFDM symbols 620, and remaining OFDM symbols 630 may be allocated to a data channel (e.g., Physical Downlink Shared Channel (PDSCH)).

Meanwhile, in the resource region structure illustrated in FIG. 6, PCRS, PNRS, or PTRS for CPE (or CFO) estimation may be loaded to some resource elements (REs) of a region 630 to which the data channel is allocated and transmitted to the UE. The signal may be a signal for estimating phase noise and as described above, the signal may be a pilot signal or a signal acquired by changing or replicating a data signal.

The present disclosure proposes a method for transmitting the DMRS for channel estimation in downlink or uplink.

Figure 7:
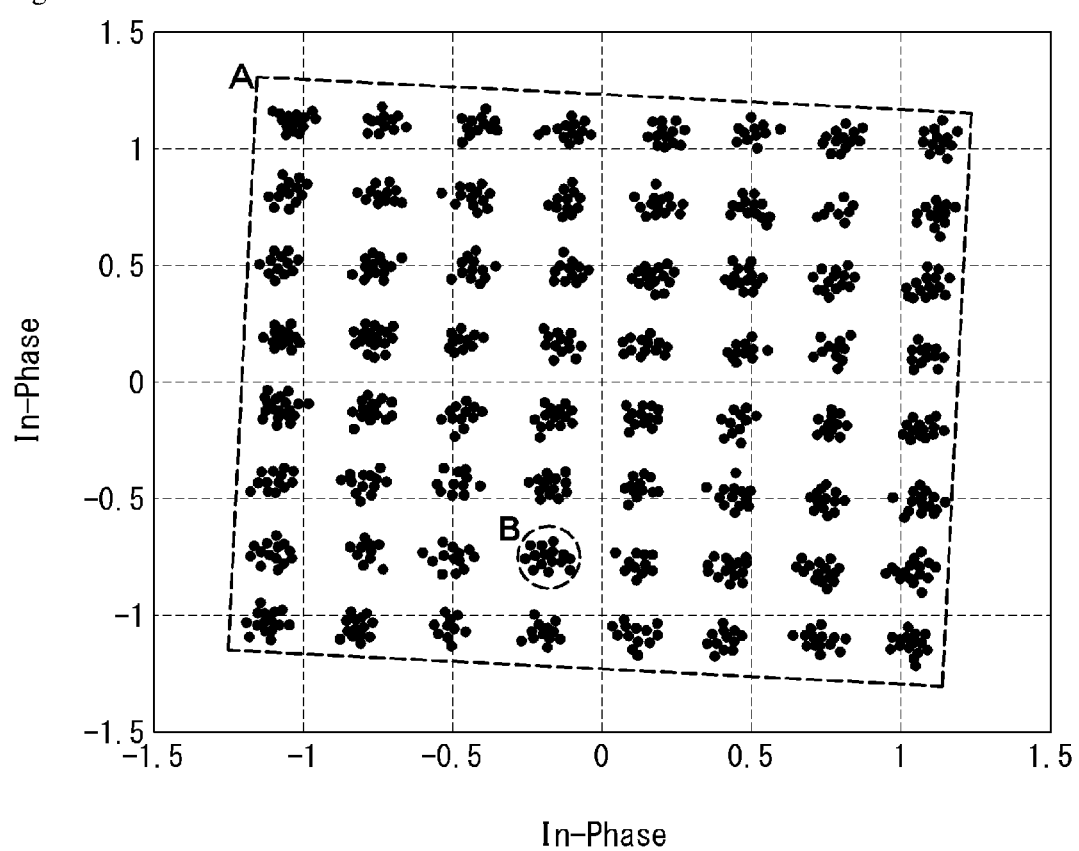
FIGS. 7 to 9 are diagrams illustrating one example of an influence by phase noise in a high-frequency band.
Figure 8:
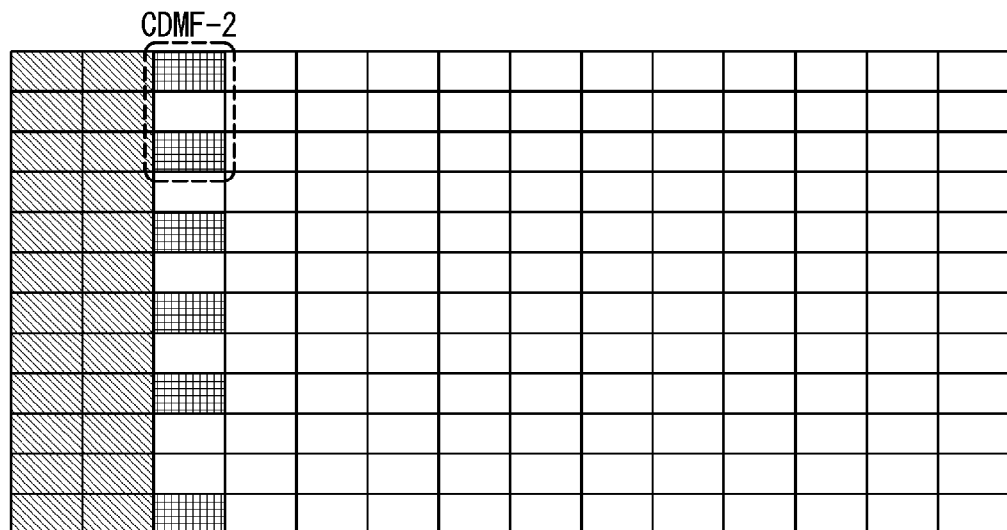
Figure 8:
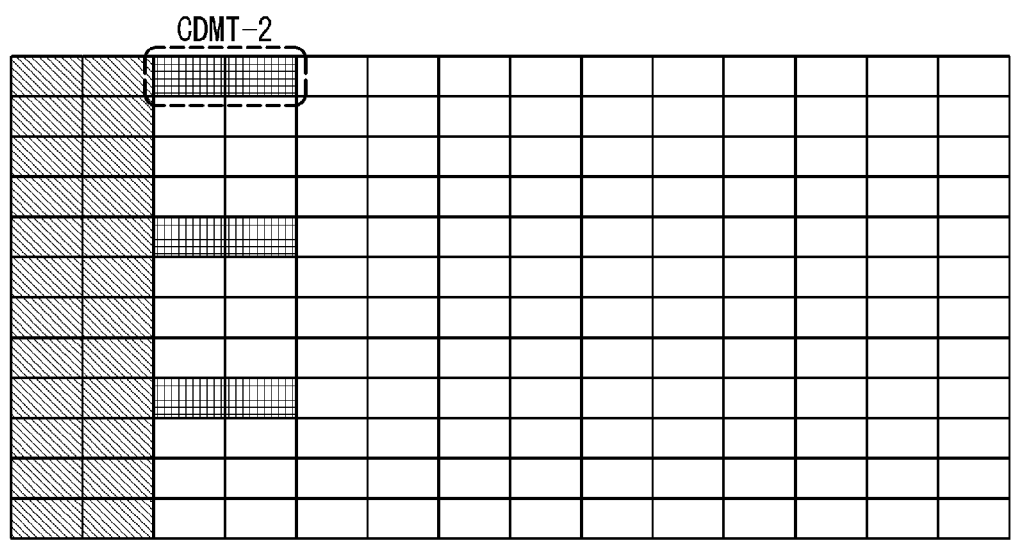
Figure 9:
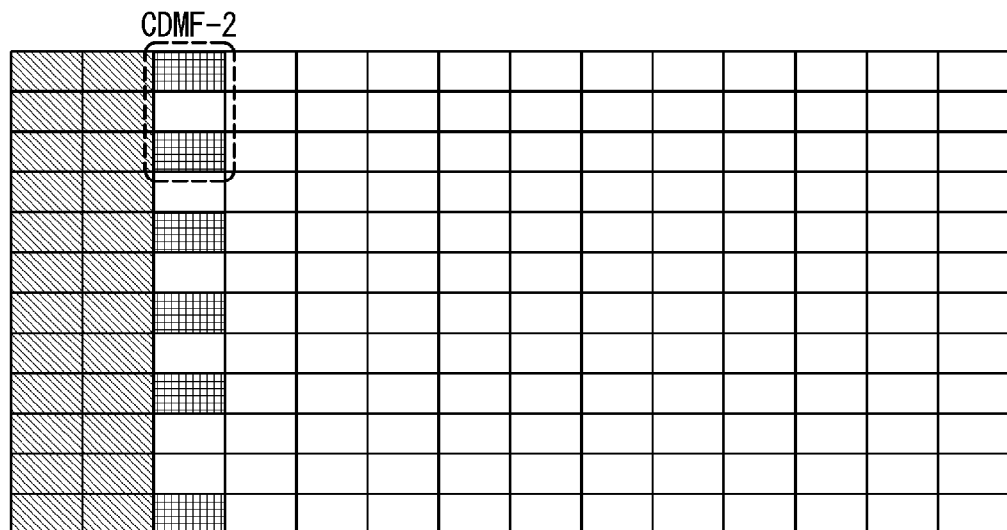
Figure 9:
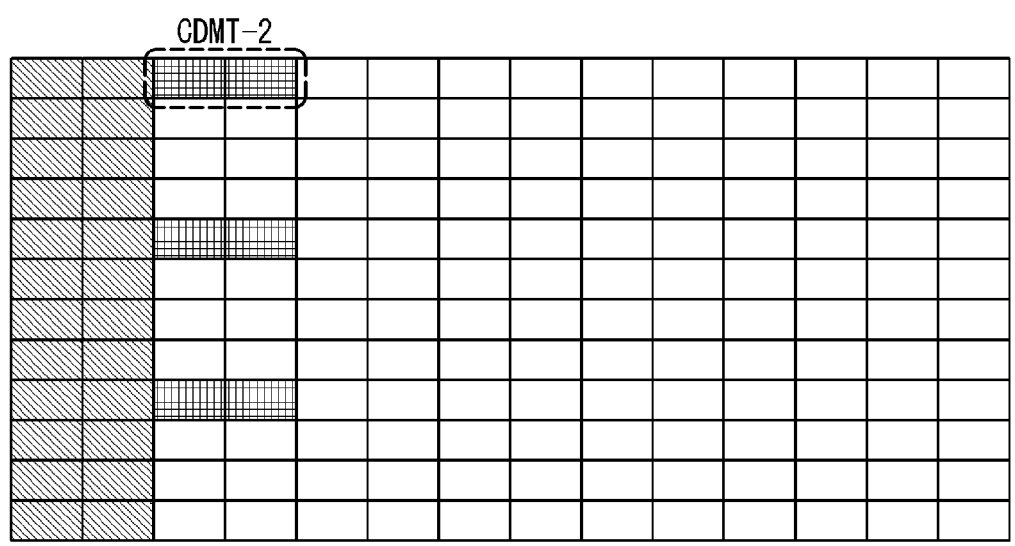

FIGS. 7 to 9 are diagrams illustrating one example of an influence by phase noise in a high-frequency band.

The phase noise (PN) is, in particular, one of disorders which degrade system performance in a high-frequency band by damaging a signal received in a time domain due to random phase rotation.

Further, the phase noise causes a common phase error (CPE) and inter-carrier interference (ICI) in a received signal in a frequency domain.

FIG. 7 illustrates an influence exerted on a set point where the CPE and the ICI are received without noise. As illustrated in FIG. 7, all constellation points rotate at the same angle which is a result of the CPE in square 'A'. In addition, the constellation point of circle 'B' is randomly disposed in a circle by the result of the ICI.

The phase noise may degrade channel estimation performance. In particular, a port multiplexing method using Code Division Multiplexing (CDM) may be more vulnerable to the phase noise because the CPE is changed per OFDM symbol.

FIG. 8(a) illustrates one example of a demodulation reference signal to which a CDM scheme having a length of 2 is applied on the frequency axis and FIG. 8(b) illustrates one example of the demodulation reference signal to which the CDM scheme having the length of 2 is applied on the time axis.

FIGS. 9(a) and 9(b) are diagrams illustrating normalized MSE and SE performance for various DMRS patterns listed in FIGS. 8(a) and 8(b).

Table 5 below shows one example of parameter values for a simulation illustrated in FIG. 9(a).

TABLE 5

| Parameters | Value |
| --- | --- |
| Carrier frequency | 30 GHz |
| Subcarrier spacing | 120 kHz |
| Transmission layers for data channel | SISO: 1 layers |
| Data allocation | 32 PRBs |
| PRB bundling | 2 |
| Modulation order, Coding rate | 256QAM(3/4), 256QAM(5/6) |
| Channel coding scheme | LTE turbo coding |
| Channel estimation | Real estimation |
| UE speed | 3 km/h |
| Channel model | CDL-B with 30 ns DS values. |
| TRP antenna configuration | (M, N, P, Mg, Ng) = (4, 8, 1, 1, 1); (dV, dH) = (0.5, 0.5)λ with directional antenna element (HPBW = 65°, directivity 8 dB) |
| UE antenna configuration | (M, N, P, Mg, Ng) = (2, 4, 1, 1, 1); (dV, dH) = (0.5, 0.5)λ with directional antenna element (HPBW = 90°, directivity 5 dB) |

Table 6 below shows one example of parameter values for a simulation illustrated in FIG. 9(b).

TABLE 6

| Assumptions | Value |
| --- | --- |
| Carrier frequency | 4 GHz |
| Subcarrier spacing | 15 kHz |

TABLE 6-continued

| Assumptions | Value |
| --- | --- |
| Transmission layers for data channel | SU-MIMO: 4/8 layers |
| Transmission scheme | Multi-antenna port transmission schemes Identity matrix is used for precoding matrix |
| Data allocation | 8 PRBs |
| PRB bundling | 2 |
| Modulation order, Coding rate | QPSK(1/2), 16QAM(1/3), 16QAM(1/2) |
| Channel coding scheme | LTE turbo coding |
| Channel estimation | Real estimation |
| UE speed | 3 km/h |
| Channel model | CDL-B with 300 ns DS values. |
| TRP antenna configuration | 4/8 with per antenna element pattern in 3GPP TR36.873 |
| UE antenna configuration | 4/8 with omni-directional antenna element |

In the simulations of FIGS. 8(a) and 8(b), a phase difference between the DMRS symbol and the PDSCH symbol may be compensated by using the reference signal for phase tracking.

As illustrated in FIGS. 8(a) and 8(b), since the CDM in the time domain may cause degradation of the channel estimation performance in the high-frequency band by the influence of the phase noise, SE performance may be degraded even in a high MCS region.

Accordingly, the CDM of the frequency domain for port multiplexing may be supported at least in the high-frequency band.

Figure 10:
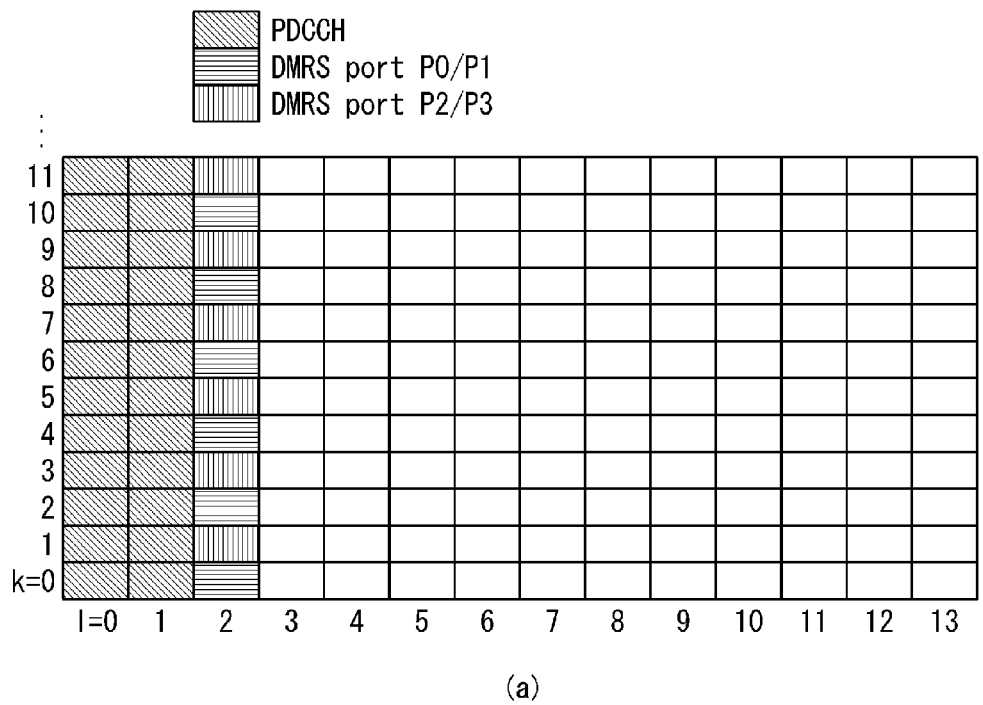
FIGS. 10 and 11 illustrate one example of a pattern of a demodulation reference signal proposed by the present disclosure.
Figure 10:
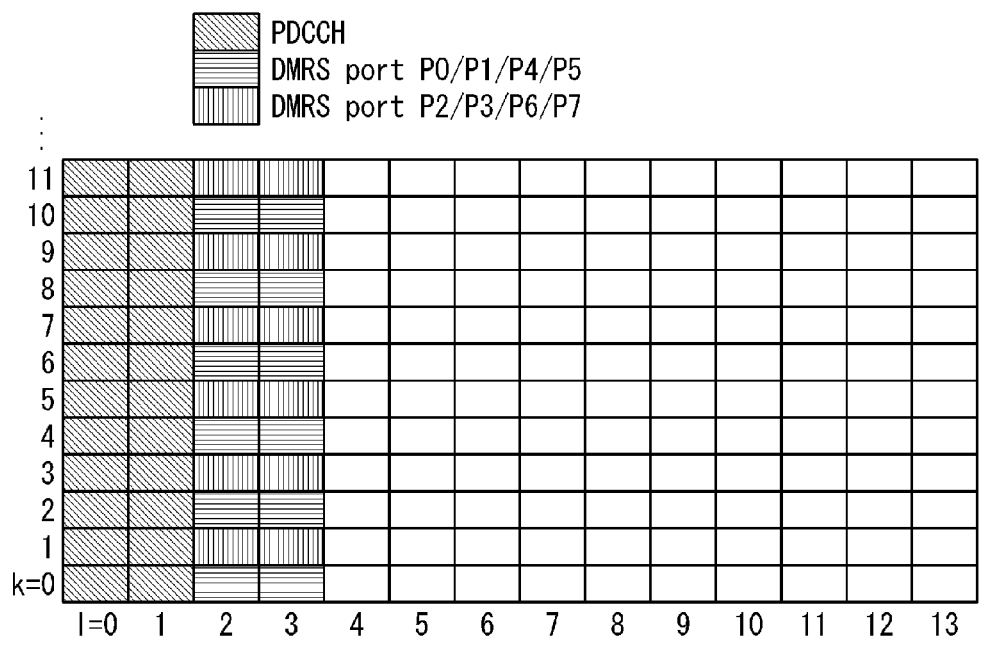
Figure 11:
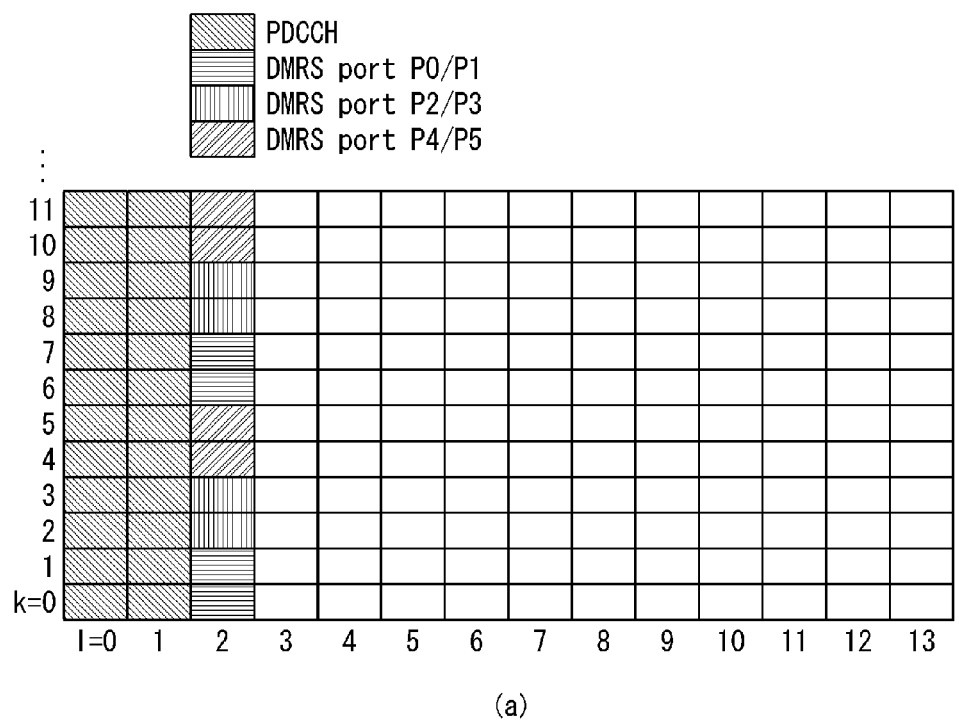
Figure 11:
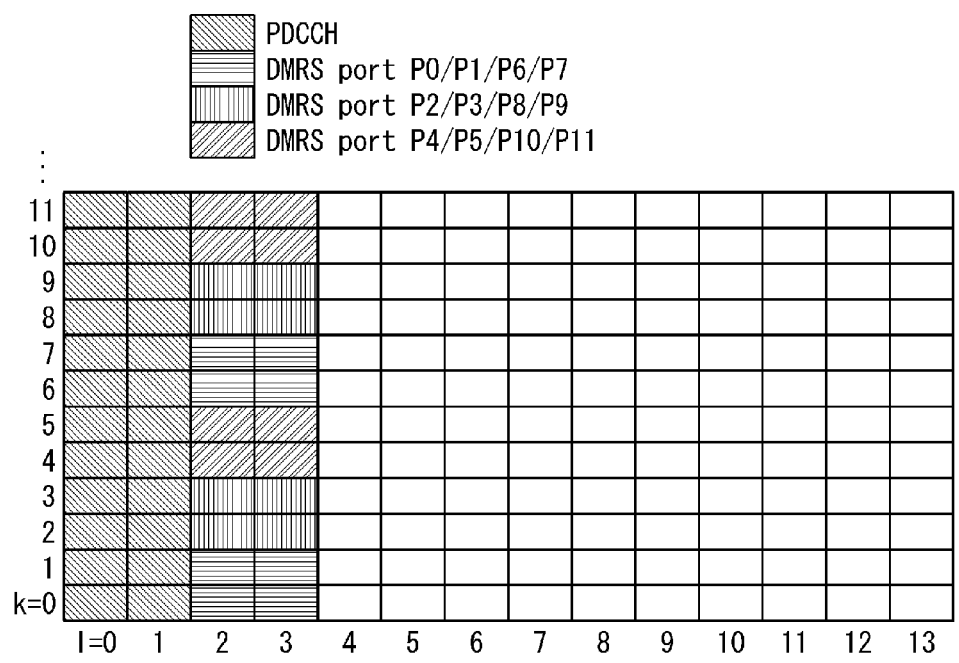

FIGS. 10 and 11 illustrate one example of a pattern of a demodulation reference signal proposed by the present disclosure.

Referring to FIGS. 10 and 11, the demodulation reference signal for estimating the channel may be mapped to one symbol or two symbols according to the maximum number of antenna ports.

Specifically, the uplink DMRS and the downlink DMRS may be generated by the following method and mapped to the resource region. FIG. 10 illustrates one example of an uplink or downlink DMRS mapped to a physical resource according Type 1 and FIG. 11 illustrates one example of the uplink or downlink DMRS mapped to the physical resource according Type 2.

The demodulation reference signal for demodulating uplink data or downlink data is generated by mapping the demodulation reference sequence to the OFDM symbol.

The demodulation reference signal sequence may be mapped according to the mapping type as illustrated in FIGS. 10 and 11 and mapped to one or two OFDM symbols. In this case, the CDM scheme may be applied for port multiplexing.

When the CDM scheme is applied to OFDM symbol mapping of the demodulation reference signal sequence, each of a frequency domain orthogonal code and a time domain orthogonal code may be separately applied.

In this case, the frequency domain orthogonal code may adopt a Cyclic Shift (CS) code and the time domain orthogonal code may adopt an Orthogonal Cover Code (OCC).

For example, the demodulation reference signal sequence may adopt a Discrete Fourier Transform (DFT) code in the frequency domain and a Walsh-Hadamard code in the time domain so as to be mapped to the OFDM symbol through the CDM scheme.

In this case, the UE may perform channel estimation by using a characteristic that the demodulation reference signal is cyclically shifted in the time domain.

That is, there may be multiple cases where a wideband resource is used for communication between the UE and the eNB in an mmWave environment. When the communication is performed by using the wideband resource as described above, the UE may perform the channel estimation in the time domain in order to enhance the channel estimation performance.

When the orthogonal code is applied to the demodulation reference signal sequence separately in the frequency domain and the time domain, the UE may separate different antenna ports performing multiplexing by using the orthogonal cover code in the time domain.

Thereafter, since different antenna ports performing multiplexing in the frequency domain use the CS code in the frequency domain, the UE may perform the channel estimation in the time domain by using a characteristic that the signal is cyclically shifted in the time domain.

When the UE to which the wideband resource is allocated performs the channel estimation in the time domain as described above, a noise attenuation effect is large, thereby enhancing the channel estimation performance.

In this case, the demodulation reference signal sequence may be generated according to Equation 5 or 6 below.

$$a_{k,l}^{(p)} = w_{time,p}(l') \cdot w_{freq,p}(k') \cdot r(k'') \quad \text{[Equation 5]}$$

$$a_{k,l}^{(p)} = w_{time,p}(l') \cdot w_{freq,p}(k') \cdot r(k'',l') \quad \text{[Equation 6]}$$

In Equations 5 and 6 above, respective parameters may be defined as follows.

$a_{k,l}^{(p)}$: Demodulation reference signal sequence of antenna port p $w_{time,p}(l')$: Orthogonal code of time domain of antenna port p $w_{freq,p}(k')$: Orthogonal code of frequency domain of antenna port k $r(k'')$ and $r(k'',l')$: Base sequence constituting demodulation reference signal k: Frequency domain index l: Time domain index p: Port index The base sequence constituting the demodulation reference signal may be generated by a pseudo random sequence per OFDM symbol and initialized by the index of the OFDM symbol.

That is, in the case of the DMRS used in the NR, the locations and the number of mapped OFDM symbols may vary depending on the UE differently from the existing DMRS. In this case, the demodulation reference signal sequence should be the same between the UEs in order to perform orthogonal MU-MIMO between different UEs.

Accordingly, the demodulation reference signal sequence may be generated per OFDM symbol in order to equalize the demodulation reference signal sequence between the UEs performing the MU-MIMO.

In this case, since the demodulation reference signal is generated per OFDM symbol, the same demodulation reference sequence may be generated between different UEs with respect to the demodulation reference sequence which may be generated different numbers and locations.

The eNB may transmit, to at least one UE, downlink control information (DCI) including information such as the antenna port depending on the number of codewords and the number of layers.

In this case, in the downlink control information, a data format may vary depending on the number of used codewords.

In the case of the NR, the number of supportable layers may vary depending on the number of codewords. That is, one codeword may be supported from layers 1 to 4 and two codewords may be supported from layer 5 or more.

In this case, when the MU-MIMO is considered, different UEs in which layer 5 or more is configured may not be MU-paired.

However, there is a combination of the UEs in which layers 1 to 4 are configured, which may be MU-paired and the DC should include more information in order to indicate the combination to the UE.

That is, in order to inform the UE information regarding the combination of the UEs which may be MU-paired, DCI is required, which has a payload having a larger size than a case where layer 5 or more is configured.

For example, from layer 1 to layer 4, 5 bits may be used for configuration information and in the case of layer 5 or more, 2 bits may be used.

The data format of the DCI may vary depending on the number of layers.

In this case, in the case of the UE in which two or more codewords are configured, the field of the DCI is compactly configured to reduce the overhead of the DCI.

Table 7 below shows one example of the DCI field when one codeword is used.

TABLE 7

| value # | # of layers | antenna port(s) | # of symbols |
|---|---|---|---|
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 3 layer | P0/P1/P2 | 1 |
| 7 | 4 layer | P0/P1/P2/P3 | 1 |
| 8 | 1 layer | P0 | 2 |
| 9 | 1 layer | P1 | 2 |
| 10 | 1 layer | P2 | 2 |
| 11 | 1 layer | P3 | 2 |
| 12 | 1 layer | P4 | 2 |
| 13 | 1 layer | P5 | 2 |
| 14 | 1 layer | P6 | 2 |
| 15 | 1 layer | P7 | 2 |
| 16 | 2 layer | P0/P1 | 2 |
| 17 | 2 layer | P2/P3 | 2 |
| 18 | 2 layer | P4/P5 | 2 |
| 19 | 2 layer | P6/P7 | 2 |
| 20 | 3 layer | P0/P1/P2 | 2 |
| 21 | 3 layer | P3/P4/P5 | 2 |
| 22 | 4 layer | P0/P1/P2/P3 | 2 |
| 23 | 4 layer | P4/P5/P6/P7 | 2 |
| 24 | reserved | reserved | reserved |
| 30 | ... | ... | ... |
| 31 | reserved | reserved | reserved |

Table 8 below shows one example of the DCI field when two codewords are used.

TABLE 8

| value # | # of layers | antenna port (s) | # of symbols |
|---|---|---|---|
| 0 | 5 layer | P0/P1/P2/P3/P4 | 2 |
| 1 | 6 layer | P0/P1/P2/P3/P4/P5 | 2 |

TABLE 8-continued

| value # | # of layers | antenna port (s) | # of symbols |
|---|---|---|---|
| 2 | 7 layer | P0/P1/P2/P3/P4/P5/P6 | 2 |
| 3 | 8 layer | P0/P1/P2/P3/P4/P5/P6/P7 | 2 |

Further, the eNB may transmit configuration information related to the mapping pattern of the DMRS to the UE through the higher layer signaling (e.g., MAC CE or RRC) in order to transmit the demodulation reference signal generated by mapping the demodulation reference signal to the OFDM symbol to at least one UE.

That is, the demodulation reference signal may be mapped to one or two OFDM symbols as illustrated in FIGS. 10 and 11. In this case, the number of antenna ports of the maximum DMRS supportable may vary depending on the number of OFDM symbols to which the DMRS is mapped.

Further, since the number of combinations of available antenna ports increases as the number of antenna ports of the DMRS increases, a DCI field having a larger size is required in order to indicate the increase in the number of combinations.

Accordingly, when different DCI fields are defined according to the mapping pattern of the DMRS, if the configuration information is transmitted through the higher layer signaling, a DCI field for optimizing DCI overhead may be configured according to the mapping pattern.

That is, since information such as the number of OFDM symbols to which the DMRS is mapped is transmitted to the UE through the higher layer signaling, the number of layers and the antenna port for transmitting the DMRS may be dynamically indicated to the UE through DCI signaling, and as a result, the DCI overhead may be reduced.

In this case, the configuration information may include at least one of the maximum number of ports related to mapping of the DMRS, the number of OFDM symbols to which the DMRS is mapped, or the port multiplexing method.

Hereinafter, a DMRS for uplink data and a DMRS for downlink data will be separately described in detail.

Demodulation Reference Signal for PUSCH

A reference signal sequence r(m) for generating the downlink DMRS is generated by Equation 7 below when transform precoding for the PUSCH is not permitted.

In this case, one example of the case where the transform precoding for the PUSCH is not permitted may include a case of generating a CP-OFDM scheme transmission signal.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 7]}$$

Here, c(i) means the pseudo-random sequence.

The reference signal sequence r(m) is generated by Equation 8 below when the transform precoding for the PUSCH is permitted.

In this case, one example of the case where the transform precoding for the PUSCH is permitted may include a case of generating a DFT-S-OFDM scheme transmission signal.

$$r(m) = e^{-j\frac{\pi q m(n+1)}{L}} \quad \text{[Equation 8]}$$

The DMRS of the generated PUSCH is mapped to the physical resource according to given Type 1 or Type 2 by a higher layer parameter as illustrated in FIGS. 7 and 8.

In this case, the DMRS may be mapped to a single symbol or double symbols according to the number of antenna ports.

When the transform precoding is not permitted, the reference signal sequence r(m) may be mapped to the physical resource by Equation 9 below.

$$a_{k,l}^{(p,\mu)} = \beta_{DMRS} w_f(k') \cdot w_t(l') \cdot r(2m + k' + m_0) \quad \text{[Equation 9]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 9 above, l is relatively defined at the start of PUSCH transmission and $w_f(k')$, $w_t(l')$, and $\Delta$ are given by Tables 9 and 10 below.

Table 9 below shows one example of the parameters for the DMRS of the PUSCH for Type 1.

TABLE 9

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 10 below shows one example of the parameters for the DMRS of the PUSCH for Type 2.

TABLE 10

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 11 below shows one example of a time domain index l' and a supported antenna port p depending on a higher layer parameter UL_DMRS_dur.

TABLE 11

| UL_DMRS_dur | l' | p Type 1 | Type 2 |
|---|---|---|---|
| Single-symbol DMRS | 0 | 1000-1003 | 1000-1005 |
| Double-symbol DMRS | 0, 1 | 1000-1007 | 1000-1011 |

Table 12 below shows one example of a start location $\bar{l}$ of the DMRS of the PUSCH.

TABLE 12

| | $\bar{l}$ | | | |
|---|---|---|---|---|
| | Single symbol DMRS | | Double symbol DMRS | |
| Uplink DMRS parameter | PUSCH mapping type A | PUSCH mapping type B | PUSCH mapping type A | PUSCH mapping type B |
| 0 | $l_0$ | $l_0$ | $l_0$ | $l_0$ |
| 1 | $l_0$,7 | | | |
| 2 | $l_0$,9 | | | |
| 3 | $l_0$,11 | | | |

Demodulation Reference Signals for PDSCH

The reference signal sequence r(m) for generating the downlink DMRS is generated by Equation 10 below.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 10]}$$

Here, c(i) means the pseudo-random sequence.

The DMRS of the generated PDSCH is mapped to the physical resource according to given Type 1 or Type 2 by the higher layer parameter as illustrated in FIGS. 7 and 8.

In this case, the reference signal sequence r(m) may be mapped to the physical resource by Equation 11 below.

$$a_{k,l}^{(p,\mu)} = \beta_{DMRS} w_f(k') \cdot w_t(l') \cdot r(2m + k' + m_0) \quad \text{[Equation 11]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 11 above, l is relatively defined at the start of the slot and $w_f(k')$, $w_t(l')$, and $\Delta$ are given by Tables 13 and 14 below.

A time axis index l' and supported antenna ports p vary depending on the higher layer parameter DL_DMRS_dur according to Table 12 below. An $\bar{l}$ value varies depending on a higher layer parameter given in Table 15 according to the mapping pattern.

For PDSCH mapping pattern A: If higher layer parameter DL_DMRS_typeA_pos is equal to 3, $l_0$=3 and if not, $l_0$=2.

For PDSCH mapping pattern B: $l_0$ is mapped to a first OFDM symbol in a PDSCH resource in which the DMRS is scheduled.

Table 13 below shows one example of the parameters for DMRS configuration type 1 of the PDSCH.

TABLE 13

| | | $w_f$(k') | | $w_t$(l') | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 14 below shows one example of the parameters for DMRS configuration type 2 of the PDSCH.

TABLE 14

| | | $w_f$(k') | | $w_t$(l') | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 15 below shows one example of l' which is duration of the PDSCH DMRS.

TABLE 15

| DL_DMRS_dur | l' | p Type 1 | Type 2 |
|---|---|---|---|
| Single-symbol DMRS | 0 | 1000-1003 | 1000-1005 |
| Double-symbol DMRS | 0, 1 | 1000-1007 | 1000-1011 |

Table 16 below shows one example of a start location $\bar{l}$ of the DMRS of the PDSCH.

TABLE 16

| | $\bar{l}$ | | | |
|---|---|---|---|---|
| | Single symbol DMRS | | Double symbol DMRS | |
| Downlink DMRS parameter | PDSCH mapping type A | PDSCH mapping type B | PDSCH mapping type A | PDSCH mapping type B |
| 0 | $l_0$ | $l_0$ | $l_0$ | $l_0$ |
| 1 | $l_0$,7 | | | |
| 2 | $l_0$,9 | | | |
| 3 | $l_0$,11 | | | |

Figure 12:
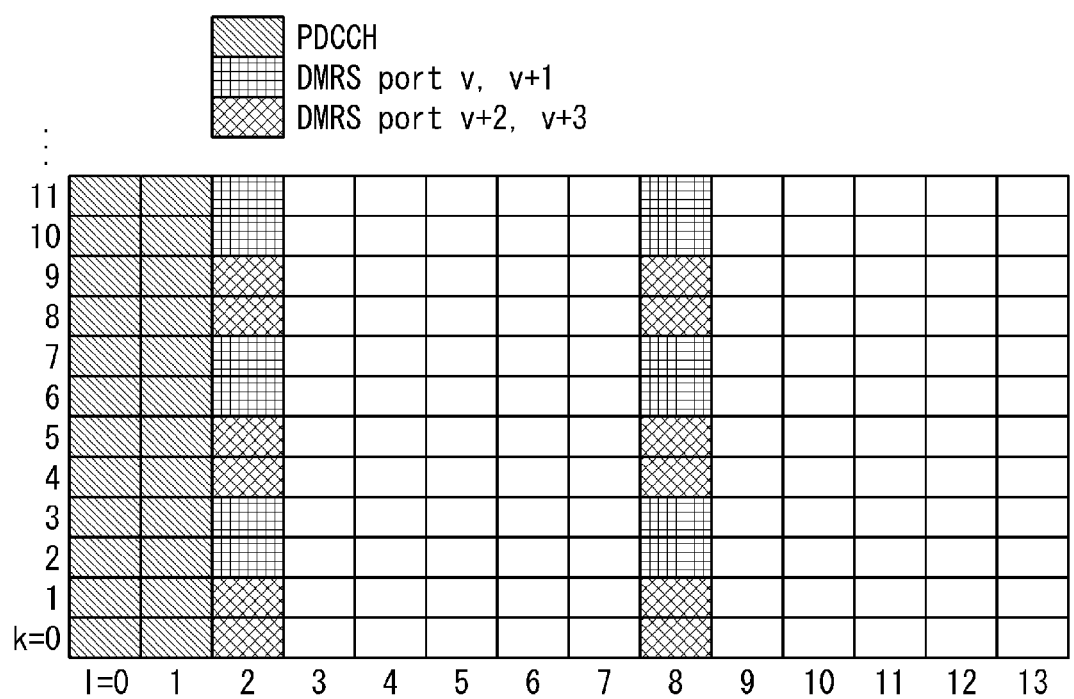
FIGS. 12 to 14 are diagrams illustrating one example of a mapping pattern of a demodulation reference signal proposed by the present disclosure.
Figure 13:
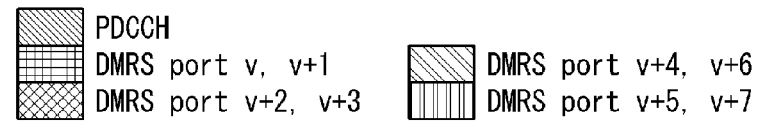
Figure 13:
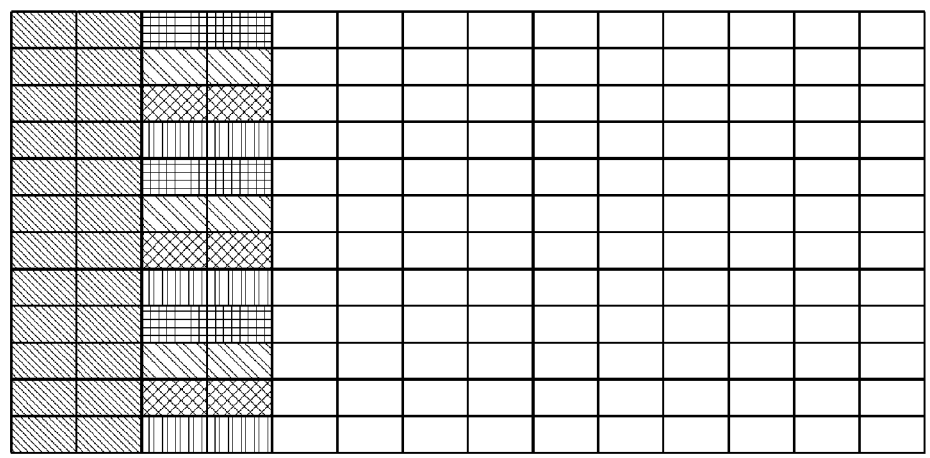
Figure 13:
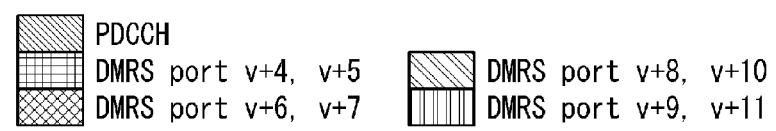
Figure 13:
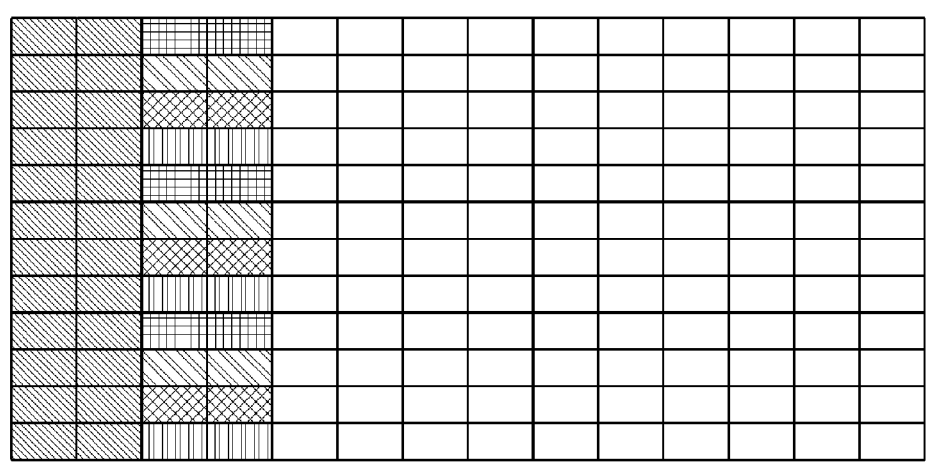
Figure 14:
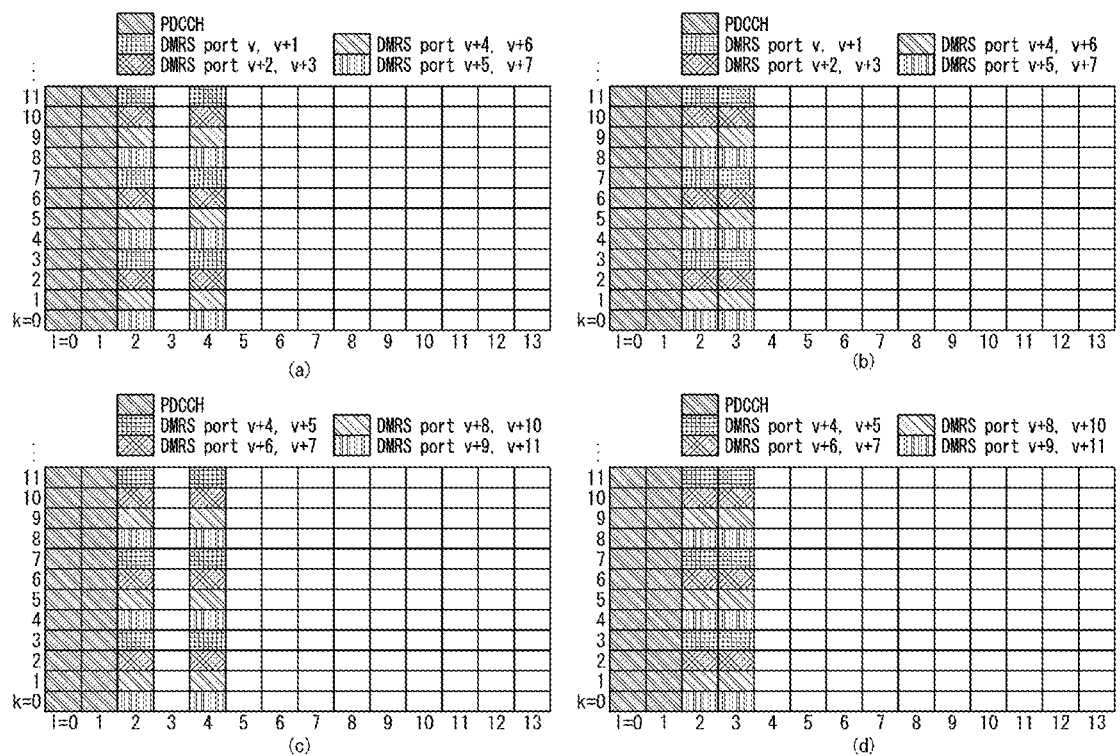
Figure 15:
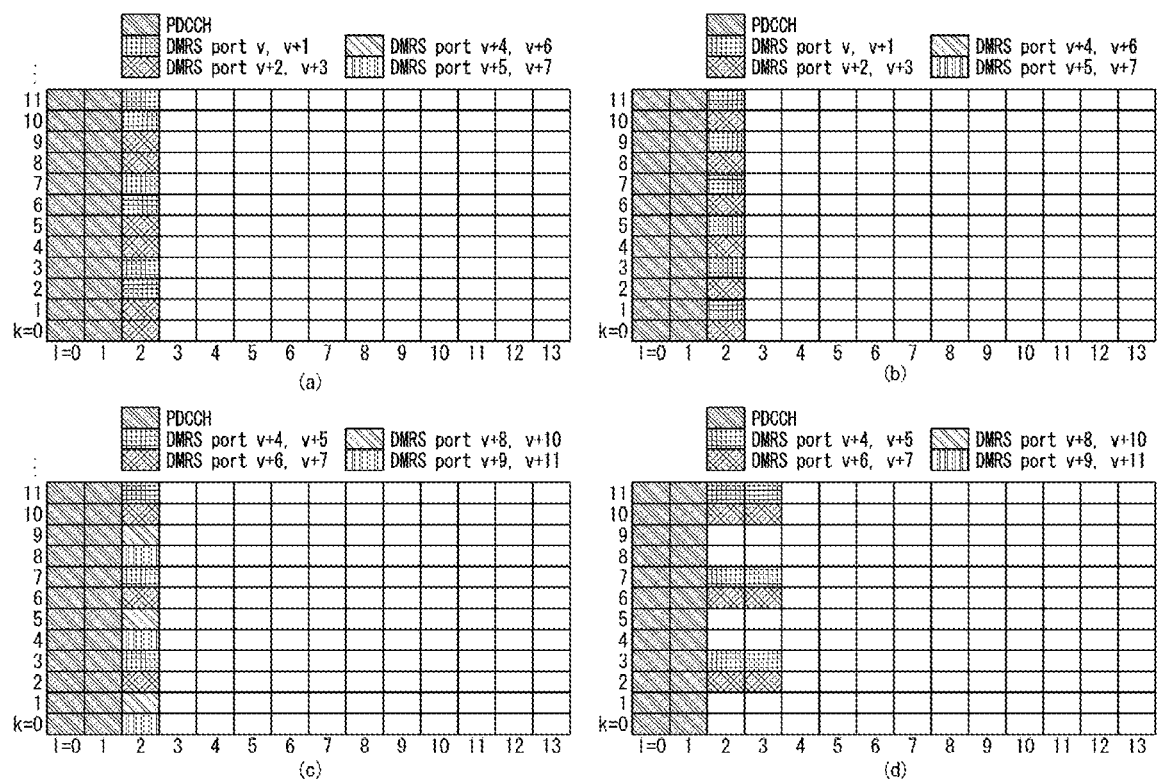
FIGS. 15 to 20 are diagrams illustrating another example of a mapping pattern of a demodulation reference signal proposed by the present disclosure.
Figure 16:
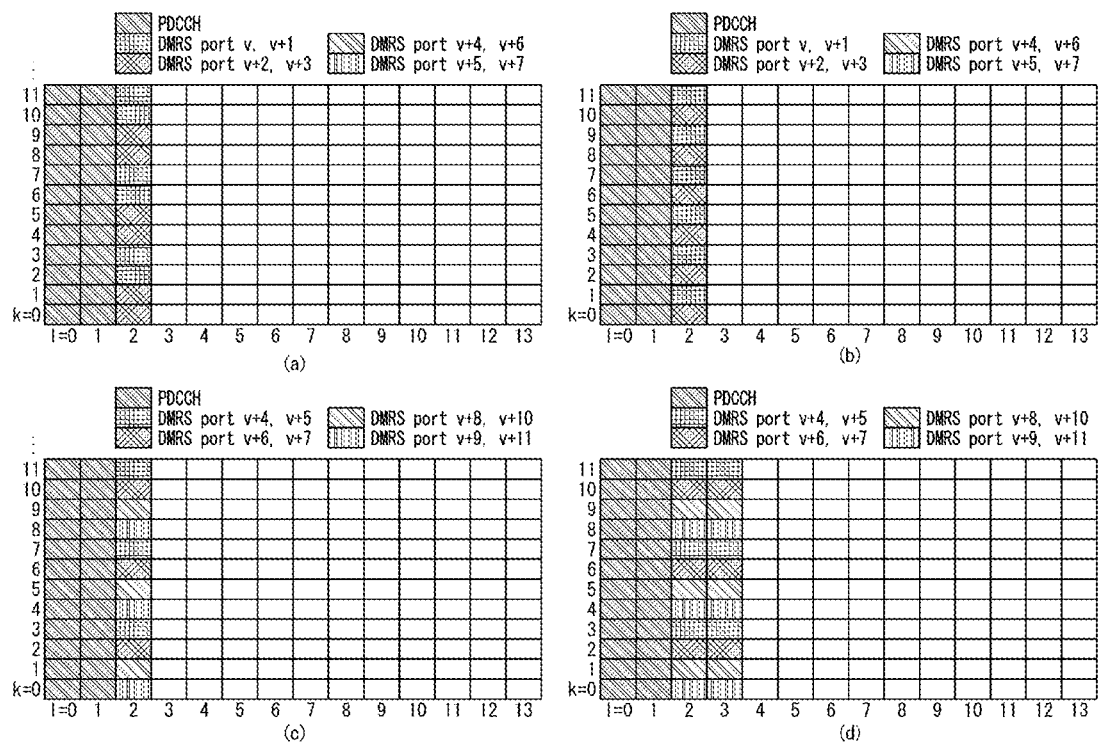

FIGS. 12 to 14 are diagrams illustrating one example of a mapping pattern of a demodulation reference signal proposed by the present disclosure.

Referring to FIGS. 12 to 14, the mapping pattern of the demodulation reference signal may vary depending on the number of transmission layer or ranks.

Specifically, the number of DMRS ports which should maintain orthogonality may vary depending on the number of transmission layer or ranks, and as a result, the overhead of the DMRS may vary.

In this case, when the number of DMRS ports increases, the channel estimation performance is enhanced, but the DMRS overhead increases.

Accordingly, designing the pattern of the DMRS considering the trade-off between the channel estimation performance and the overhead is required.

In this case, in respect to the pattern of the DMRS, the mapping pattern of the DMRS may vary depending on the port multiplexing scheme and whether a function to support a high Doppler is performed or whether a function to support high delay spread is performed in a higher layer or rank situation.

Further, the mapping pattern of the DMRS may be differently allocated according to the condition of the UE.

At least one of the OFDM symbol number, the mapping pattern, or the CDM for mapping the DMRS to the resource may be flexibly determined according to the maximum port number.

When the number of transmission layers, ranks, or ports is equal to or less than 'x', port multiplexing for the DMRS may be applied as illustrated in FIG. 12 and below.

One OFDM symbol is occupied.

A CDM scheme having a length of 'k' is applied on the frequency axis.

There are 'k' CDMed port groups on the frequency axis.

Multiplexing a maximum of x (=k*k') ports is possible.

Since the DMRS pattern occupies one OFDM symbol, a subsequent OFDM symbol at which the DMRS is positioned need not be waited, the DMRS pattern may be advantageous in an early decoding scheme.

When the number of transmission layers, ranks, or ports is equal to or more than 'x', port multiplexing for the DMRS may be applied as illustrated in FIGS. 13 and 14 and below.

Two OFDM symbols are occupied.

The CDM scheme having the length of 'k' is applied on the time axis.

There are 'k' CDMed port groups on the frequency axis.

Multiplexing a maximum of x (=k*k') ports is possible.

When the number of transmission layers, ranks, or ports is large, the channel estimation performance by the DMRS may be guaranteed by using two OFDM symbols.

The reason is that an appropriate CDM length or a distance between appropriate resource elements of multiplexed RS may be maintained and furthermore, more energy may be guaranteed with respect to the reference signal.

When two OFDM symbols are used, if the port multiplexing is performed by using the CDM on the frequency axis, power balancing may not be normally achieved, but if the CDM is used on the time axis, such a power balancing problem may be solved.

Further, in order to multiplex more ports by using one OFDM symbol, a long CDM may be used on the frequency axis as much or a distance between the resource elements of the multiplexed reference signals may increase.

In such a case, the mapping pattern is sensitive to frequency selectivity, and as a result, performance may be degraded.

FIG. 12 illustrates one example in which four DMRS ports are multiplexed and FIGS. 13 and 14 illustrate one example in which eight DMRS ports are multiplexed.

FIG. 13(a) includes a port index which is the same as the port index of FIG. 12, but FIG. 13(b) does not include the port index which is the same as the port index of FIG. 12.

Since the case of FIG. 13(b) is different from the case of 4 ports of FIG. 12 in terms of the port index, the eNB may explicitly inform the UE of the mapping pattern of the DMRS by using the port index of the DMRS.

FIGS. 14(a) and 14(b) include the port index which is the same as the port index of FIG. 12 as in FIG. 13(a).

FIG. 14(a) may have the same resource element interval in the CDM on the frequency axis and the CDM on the time axis and FIG. 14(b) may have an adjacent resource element when applying the CDM on the time axis in order to reduce an influence of the Doppler effect.

FIGS. 14(c) and 14(d) include the port index which is not the same as the port index of FIG. 12 as in FIG. 13(b).

Accordingly, the eNB may explicitly inform the UE of the DMRS mapping patterns of FIGS. 14(c) and 14(d) by using the port index of the DMRS as in FIG. 13(b).

FIGS. 15 to 20 are diagrams illustrating another example of a mapping pattern of a demodulation reference signal proposed by the present disclosure.

Referring to FIGS. 15 to 20, a value of SE for an SNR value may vary depending on the number of OFDM symbols to which the DMRS is mapped and the mapping pattern.

Specifically, FIGS. 15(a) to 15(c) illustrate one example of the mapping pattern of the DMRS mapped to one OFDM symbol when the number of antenna ports is 4 and FIG. 15(d) illustrates one example of the mapping pattern of the DMRS mapped to two OFDM symbols when the number of antenna ports is 4.

FIGS. 16(a) to 16(c) illustrate one example of the mapping pattern of the DMRS mapped to one OFDM symbol when the number of antenna ports is 4 and FIG. 16(d) illustrates one example of the mapping pattern of the DMRS mapped to two OFDM symbols when the number of antenna ports is 4.

Figure 17:
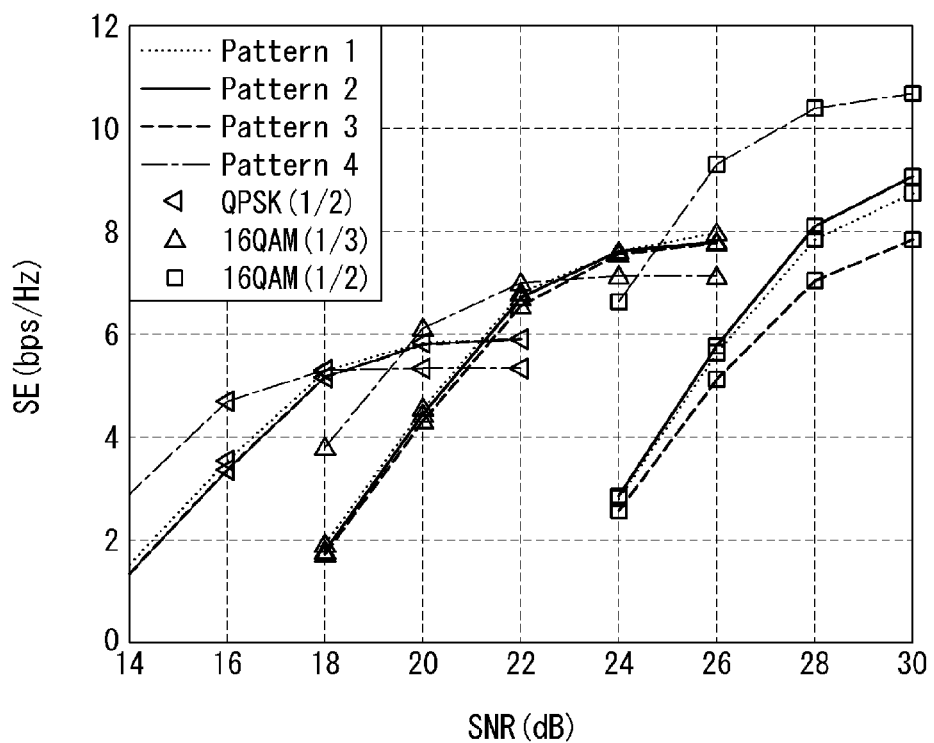
Figure 18:
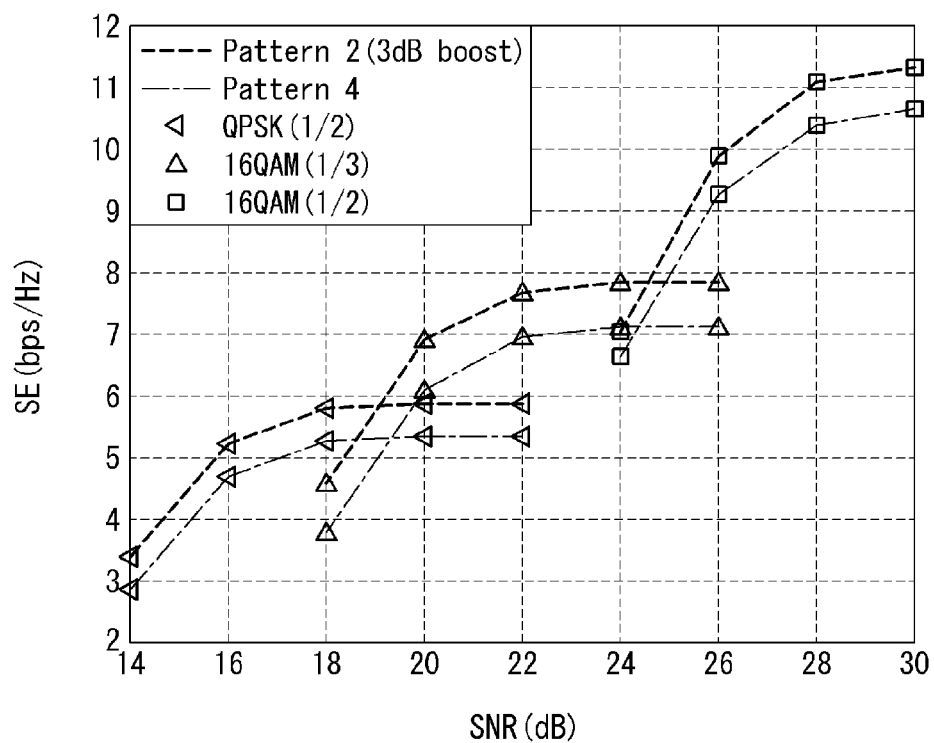

FIGS. 17 and 18 are graphs showing one example of a simulation result in an environment shown Table 17 below.

TABLE 17

| Parameter | Value |
| --- | --- |
| CDL-B | 300 ns, 3 km/h |
| CF | 4 GHz |
| SS | 15 kHz |
| MCS | QPSK(1/2), 16QAM(1/3, 1/2) |

As illustrated in FIGS. 17 and 18, it can be seen that when 8 antenna ports are used, the SE value is the larger in the case where the DMRS is mapped to one OFDM symbol than in the case where the DMRS is mapped to two OFDM symbols.

That is, more power for transmitting the DMRS may be acquired in the case of using two OFDM symbols than in the case of using one OFDM symbol in order to transmit the DMRS, and as a result, the channel estimation performance may be enhanced.

Figure 19:
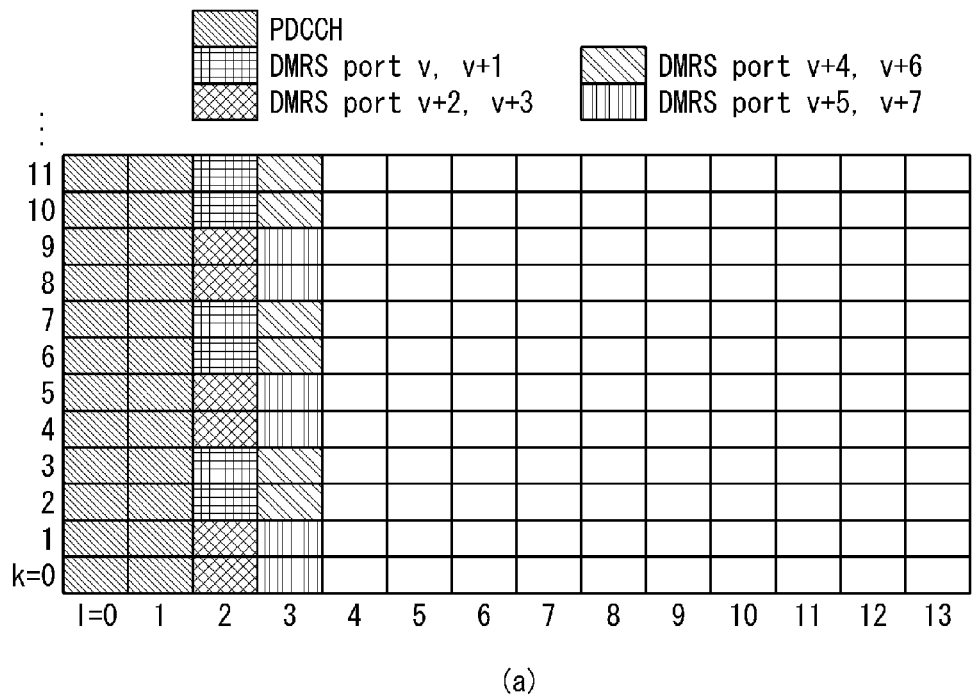
Figure 19:
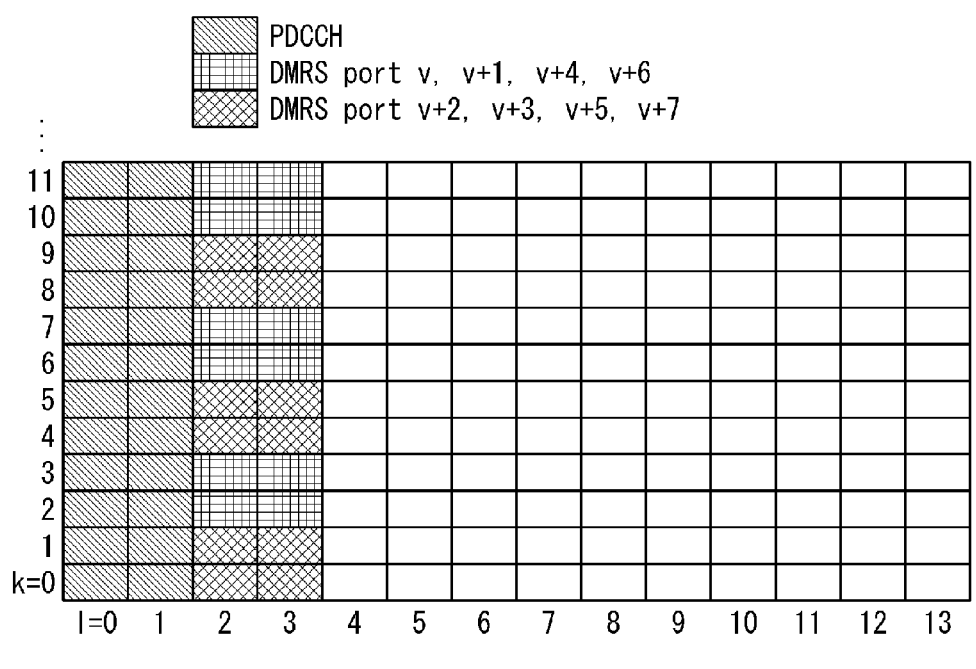
Figure 20:
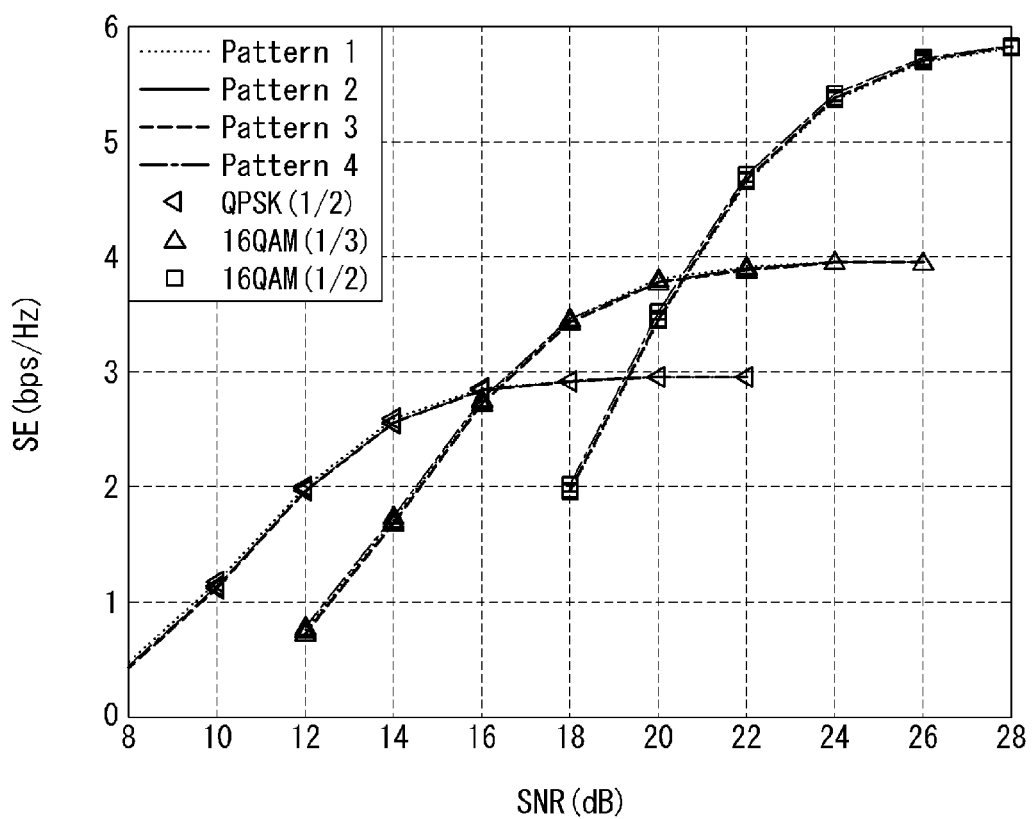

FIGS. 19 and 20 are diagrams illustrating a DMRS mapping pattern and a simulation result in the case of using eight antenna ports.

In the case of using eight antenna ports, three mapping patterns may exist in addition to the DMRS mapping pattern described above.

First, one OFDM may be mapped to the DMRS. In this case, the CDM scheme having the length of 4 may be applied onto the frequency axis. When the DMRS is mapped to one OFDM symbol, the overhead of the reference signal may be reduced. However, the DMRS is vulnerable to frequency selectivity and RS power is acquired which is lower than RS power when the DMRS is mapped to two OFDM symbols.

Second, as illustrated in FIG. 12(*a*), the DMRS may be mapped to two OFDMs by using CDM having a length of 2 on the frequency axis. When the DMRS is mapped as illustrated in FIG. 12(*a*), RS power may be acquired, which is higher than the RS power when the DMRS is mapped to one OFDM symbol.

However, high reference signal overhead may occur and transmission power between the OFDM symbols may not be uniform.

Third, as illustrated in FIG. 12(*b*), the DMRS may be mapped to two OFDMs by using the CDM having the length of 2 on the time axis. When the DMRS is mapped as illustrated in FIG. 12(*b*), RS power may be acquired, which is higher than the RS power when the DMRS is mapped to one OFDM symbol and the frequency selectivity may be strong.

However, the high reference signal overhead may occur.

When the frequency selectivity, the RS power, and the power balancing between the OFDM symbols are considered among three methods above, the mapping method illustrated in FIG. 12(*b*) may be preferred.

When four antenna ports are used as illustrated in FIG. 20, the case where the DMRS is mapped to one OFDM symbol and the case where the DMRS is mapped to two OFDM symbols may have the same SE performance.

In this case, when early-decoding is considered, the pattern mapped to one OFDM may be preferred in the case of using four antenna ports.

The eNB may inform the UE of the mapping patterns of the DMRS described in FIGS. 8 to 20 through the RRC and/or DCI signaling.

That is, the eNB may transmit to the UE information indicating the mapping pattern of the DMRS through the RRC signaling and/or DCI signaling and the UE may recognize the mapping pattern of the DMRS through the received RRC signaling and/or DCI signaling.

Alternatively, the eNB may inform the UE of the mapping pattern of the DMRS through an implicit method. That is, the transmitting UE may implicitly signal the mapping pattern of the DMRS through a predetermined definition.

For example, the mapping pattern of the DMRS depending on the number of antenna ports may be determined according to at least one of the number of transmission layer (or ranks) or the index of the allocated port. In this case, the eNB may inform to the UE of at least one of the number of transmission layers (or ranks) for determining the mapping pattern of the DMRS or the index of the allocated port through the RRC signaling and/or the DCI signaling.

The UE may recognize the mapping pattern of the DMRS by using at least one of the number of transmission layers (or ranks) for determining the mapping pattern of the DMRS or the index of the allocated port through the RRC signaling and/or the DCI signaling transmitted from the eNB.

The eNB may perform rate matching with respect to the DMRS REs of different ports through the following method.

First, the eNB informs the UE of information on a port together used for transmitting the DMRS through the RRC and/or DCI signaling to perform rate matching with respect to an RE to which the DMRS of the port used by another UE.

The port information may include the number of ports used for transmitting the DMRS and the index of the used port.

In this case, power boosting may be performed for the RE of the DMRS in units of the OFDM symbol. That is, the power boosting may be performed by reducing the power of the RE performing the late matching and increasing the power of the RE actually transmitting the DMRS.

Information related to the RE of the DMRS to reduce the power and the RE of the DMRS to increase the power may be preconfigured in the transmitting UE or the eNB may transmit the information may transmit the information to the eNB through the RRC and/or DCI signaling.

Second, the UE may perform the rate matching for the RE to which the DMRS of another UE is mapped. That is, the UE may perform the rate matching based on information on the port to which the DMRS thereof is mapped.

Specifically, the UE may recognize the maximum number ports to which the DMRS is transmitted based on whether the DMRS thereof is CDMed on the frequency axis or on the time axis and perform the rate matching for all REs which another UE may use for transmitting the DMRS except for the RE to which the corresponding UE transmits the DMRS.

In this case, the power boosting may be performed for the RE to which the DMRS is transmitted in units of the OFDM symbol. That is, the UE performs the power boosting by bringing the power of the RE performing the rate matching to the RE actually transmitting the DMRS.

In this case, similarly to the first method described above, the information related to the RE of the DMRS to reduce the power and the RE of the DMRS to increase the power may be preconfigured in the transmitting UE or the eNB may transmit the information may transmit the information to the eNB through the RRC and/or DCI signaling.

Third, when at least one of the following points is assumed, the UE may not perform the rate matching for the RE to which the DMRS transmitted through another port is mapped. That is, the UE may transmit/receive data in the corresponding resource.

The UE protects only DMRS resources of the port in which the DMRS is transmitted and a code divided multiplexed port.

There is non interference between the UEs through appropriate precoding and/or analog beamforming.

Figure 21:
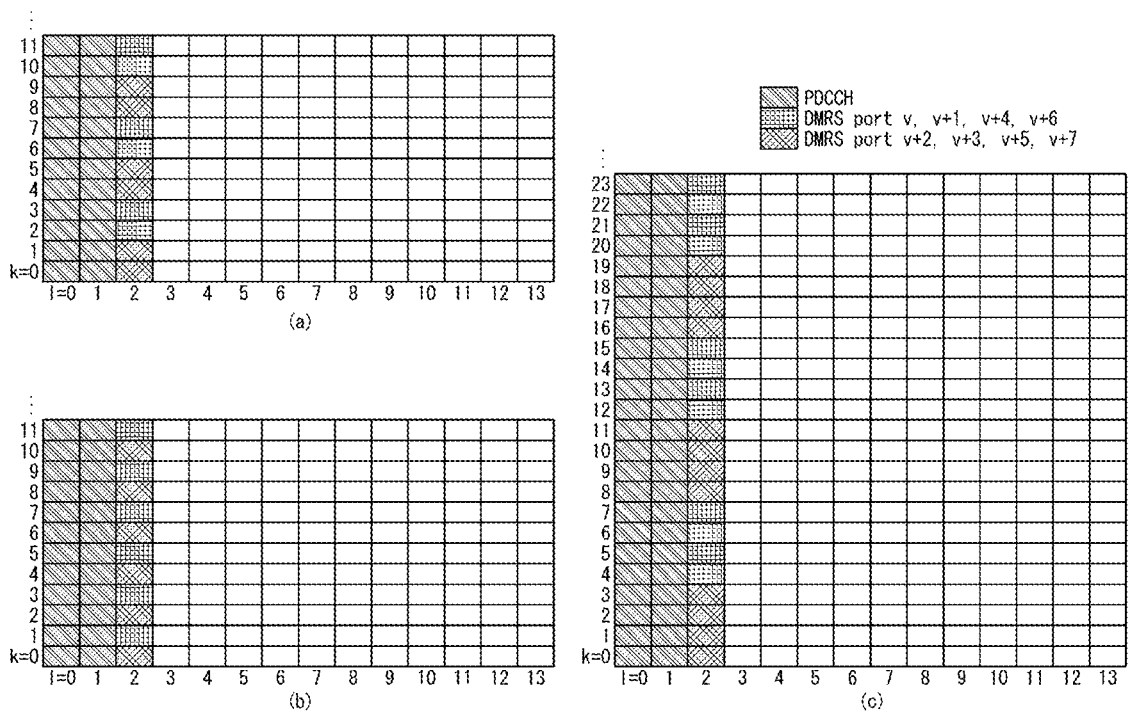
FIGS. 21 to 23 are diagrams illustrating one example of a mapping pattern of a demodulation reference signal depending on a channel environment proposed by the present disclosure.
Figure 22:
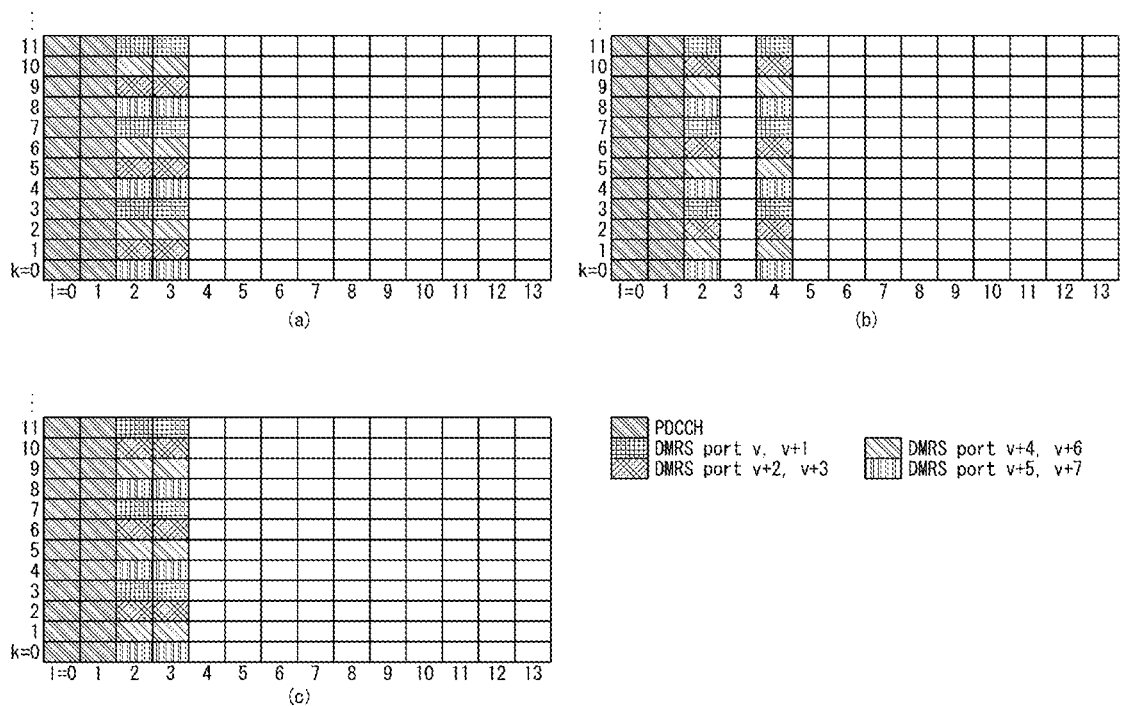
Figure 23:
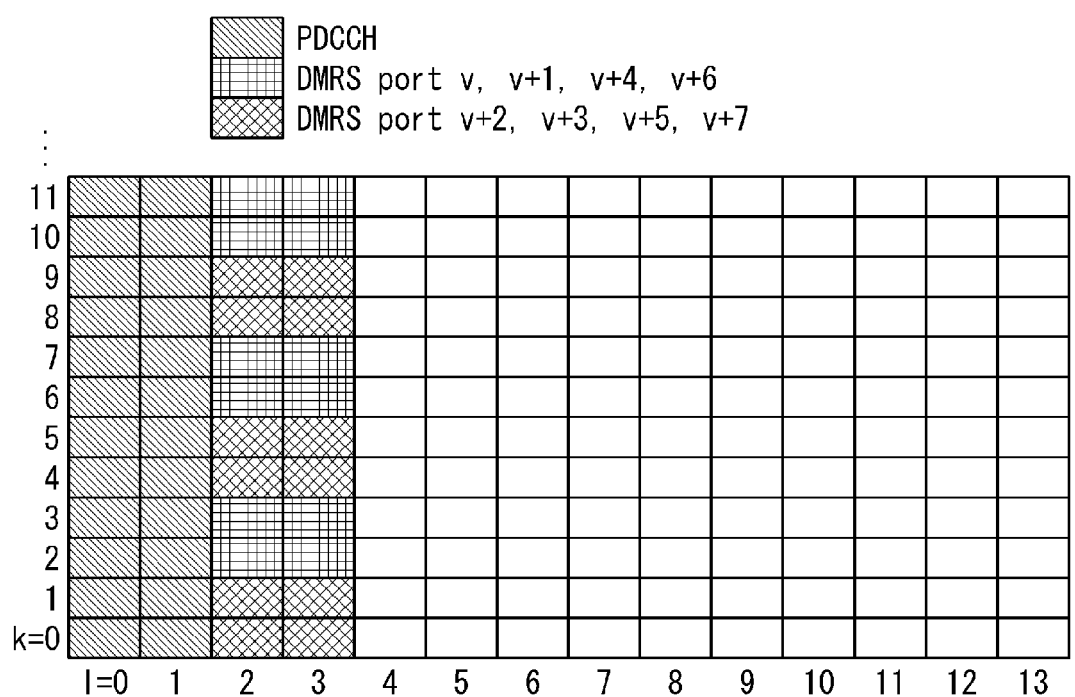

FIGS. 21 to 23 are diagrams illustrating one example of a mapping pattern of a demodulation reference signal depending on a channel environment proposed by the present disclosure.

Referring to FIGS. 21 to 23, the eNB may change the pattern of the DMRS according to the transmission layer (or rank) and a channel environment (e.g., Doppler shift and delay spread).

Specifically, when the value of the transmission layer or rank is large, limit values of the Doppler shift and the delay spread having appropriate channel compensation performance on the time axis and the frequency axis vary due to an increase in CDM length.

That is, when the CDM scheme is applied on the time axis, degradation of performance may occur in a high Doppler environment and when the CDM scheme is applied on the frequency axis, performance degradation may occur in a high delay spread environment.

Accordingly, since the mapping pattern of a suitable DMRS may vary depending on the number of ranks and the channel environment, when the eNB may recognize the Doppler or the delay spread of the channel, the eNB may accordingly map the DMRS to the RE according to the appropriate mapping pattern.

For example, the eNB may acquire uplink or downlink channel information through the following method.

Specifically, the eNB may indicate that the reference signal is aperiodically or periodically transmitted to the UE in order to acquire the downlink channel information. That is, the eNB informs the UE that the reference signal (e.g., CSI, etc.) is aperiodically or periodically transmitted and transmits to the UE the reference signal for estimating the downlink channel information.

The UE may estimate the channel information of the downlink channel based on the received reference signal.

In this case, the UE may request transmission of the reference signal for channel estimation to the eNB.

The UE may transmit the estimated channel information included in a CSI feedback to the eNB. For example, the UE may define the estimated channel information as a type such as CQI, RI, or PMI and transmit the defined channel information included in the CSI feedback to the UE.

In this case, the channel information estimated by the UE may be a value which varies depending on the performance of the UE or defined as an absolute value regardless of the performance of the UE.

Further, the eNB may aperiodically or periodically indicate transmission of the reference signal (e.g., SRS, etc.) for estimating the uplink channel information to the UE in order to acquire the uplink channel information.

The UE may aperiodically or periodically transmit the reference signal for estimating the uplink channel information to the eNB according to the indication from the eNB and the eNB may estimate the uplink channel information based on the received reference signal.

The eNB may determine the mapping pattern of the DMRS based on the estimated channel information and map the DMRS to the RE according to the determined pattern. Thereafter, the DMRS added on the time axis in the high Doppler environment may be mapped by using the determined mapping pattern.

FIG. 21 is a diagram illustrating one example of the mapping pattern in which the DMRS is mapped to one OFDM symbol in the case of high Doppler shift and low delay spread.

Referring to FIGS. 21(a) to 21(c), when eight antenna ports are used, the eNB may map the DMRS to the RE by using the CDM scheme having the length of 4 on the frequency axis in order to prevent the degradation of the channel estimation performance due to the high Doppler shift.

FIG. 22 is a diagram illustrating one example of the mapping pattern in which the DMRS is mapped to two OFDM symbols in the case of low Doppler shift and high delay spread.

Referring to FIGS. 22(a) to 22(c), when eight antenna ports are used, the eNB may map the DMRS to the RE by using the CDM scheme having the length of 2 on the frequency axis in order to prevent the degradation of the channel estimation performance due to the high delay spread.

FIG. 23 is a diagram illustrating one example of the mapping pattern in which the DMRS is mapped to two OFDM symbols in the case of high Doppler shift and high delay spread.

Referring to FIG. 23, when eight antenna ports are used, the eNB may map the DMRS to the RE by using the CDM scheme having the length of 2 on the frequency axis in order to prevent the degradation of the channel estimation performance due to the high Doppler shift and the high delay spread.

As described above, the mapping pattern of the suitable DMRS is determined according to the situation of the UE and the DMRS is mapped and transmitted according to the determined mapping pattern, thereby preventing the channel estimation performance from being degraded according to a high Doppler effect and delay spread.

Figure 24:
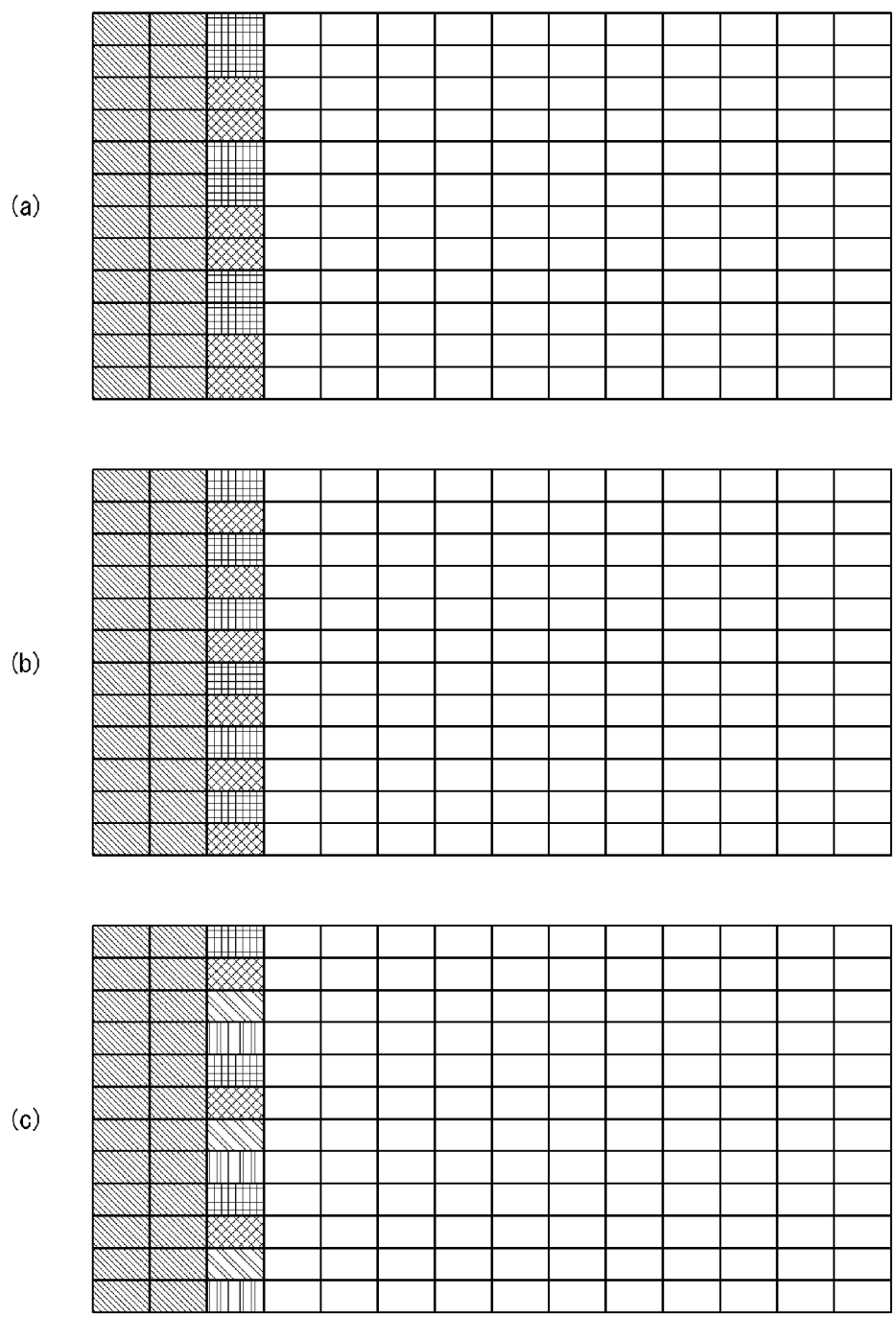
FIGS. 24 to 26 are diagrams illustrating one example of a method for mapping a DMRS by using the same mapping pattern proposed by the present disclosure.
Figure 25:
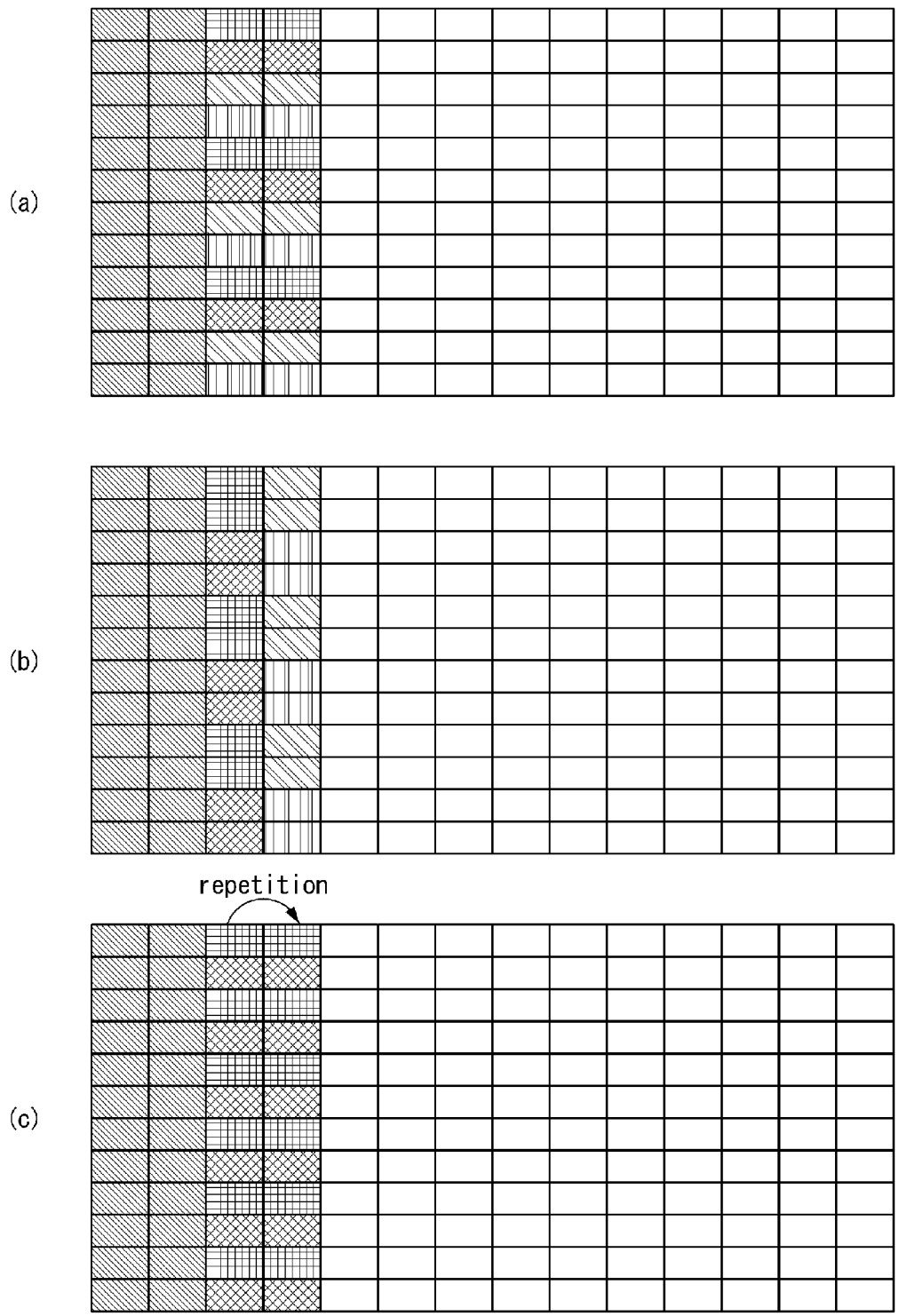
Figure 26:
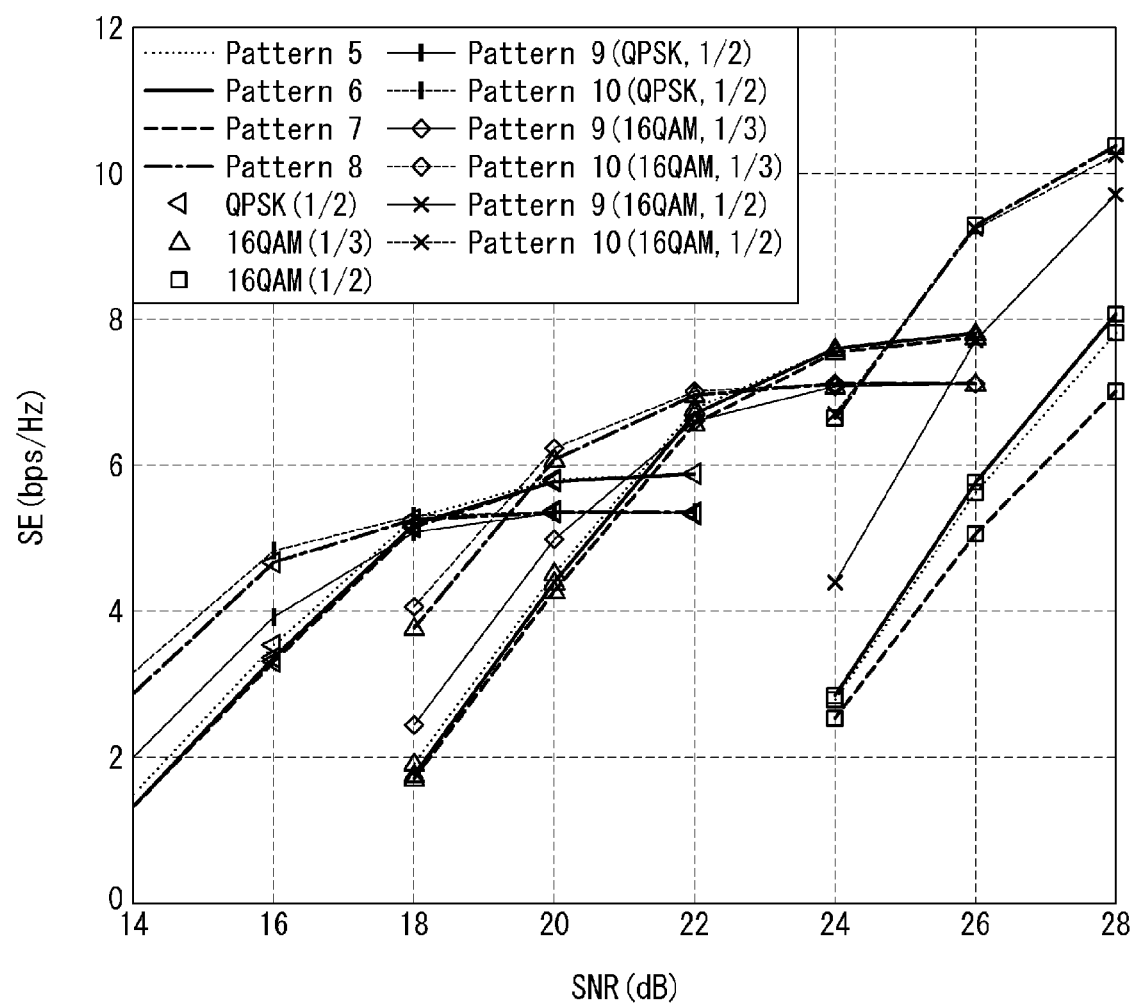

FIGS. 24 to 26 are diagrams illustrating one example of a method for mapping a DMRS by using the same mapping pattern proposed by the present disclosure.

Referring to FIGS. 24 to 26, when the number of antenna ports used for transmitting the DMRS is equal to or more than a predetermined number, the eNB may map the DMRS to the resource by repeating the same mapping pattern.

Specifically, an OCC (or DFT) code of the DMRS sequence for mapping the DMRS to the resource may repeatedly use a length k digit code on the frequency axis in units of k.

In this case, as illustrated in FIGS. 24(a) to 24(c), when the maximum number of antenna ports for transmitting the DMRS is 4, the DMRS may be mapped by applying the CDM scheme having the length of 2 may be mapped to one OFDM symbol.

Hereinafter, FIG. 24(a) will be referred to as pattern 5, FIG. 24(b) will be referred to as pattern 6, and FIG. 24(c) will be referred to as pattern 7.

However, as illustrated in FIG. 25(a) to 25(c), when the maximum number of antenna ports for transmitting the DMRS is more than 4, the CDM length of the pattern defined in FIG. 24 is increased twice and the mapping pattern is repeated on the time axis as illustrated in FIG. 25(c) or the DMRS is mapped by using all CDM schemes having the same length to support eight antenna ports.

Hereinafter, FIG. 25(a) will be referred to as pattern 8, FIG. 25(b) will be referred to as pattern 9, and FIG. 25(c) will be referred to as pattern 10.

In this case, the eNB may inform the UE of the mapping pattern through an explicit or implicit method.

That is, the eNB may inform the UE of the mapping pattern of the DMRS by transmitting the RRC and/or DCI signaling indicating the mapping pattern to the UE.

Alternatively, the UE receives all available candidate mapping patterns in which the DMRS may be mapped from the UE and decodes all candidate mapping patterns.

The UE may recognize a mapping pattern which is successfully decoded as a pattern allocated from the eNB and then perform decoding by the recognized mapping pattern.

Alternatively, when the mapping pattern is determined according to the port index, the UE may recognize the mapping pattern allocated thereto based on the port index transmitted from the eNB.

When the DMRS is mapped by using one OFDM symbol, there is an advantage of being advantageous for early decoding and a case of mapping the DMRS by using two OFDM symbols has an advantage in that RS energy may be increased by using the mapping pattern repeated on the time axis.

In this case, different RS sequences may be applied to the DMRS sequence according to a waveform.

For example, in the case of CP-OFDM, a PN sequence may be used and in the case of DFT-s-OFDM, a ZC sequence may be used.

FIG. 26 is a diagram illustrating one example of SE performance for each mapping pattern of FIGS. 24 and 25.

As illustrated in FIG. 26, it can be seen that when the number of antenna ports is more than 4, the mapping patterns of FIG. 25 using two OFDM symbols show better SE performance.

In this case, it can be seen that a pattern in which the same pattern as first OFDM to which the DMRS of FIG. 25(c) is mapped is repeatedly used even among the patterns of FIG.

25 is a mapping pattern more suitable for a high carrier frequency (mmWave) band on which the phase noise exerts a large influence.

That is, in the case of pattern 10, since the DMRS is mapped to eight ports by using two OFDM symbols, the RS energy may be increased, and as a result, there is a gain in estimating a channel coefficient.

Further, interlayer interference is reduced due to the gain of the channel coefficient estimation, and as a result, the performance may be enhanced in terms of the SE even though the RS overhead increases.

Further, when the influence of the phase noise which causes different CPEs for each OFDM symbol is considered, in the case of pattern 10 in which the same DMRS sequence is repeatedly mapped to the OFDM symbol, a phase difference between adjacent OFDM symbols may be estimated and the CPE value due to the phase noise may be compensated. Accordingly, the performance degradation due to the phase noise may be reduced, thereby enhancing the performance.

Figure 27:
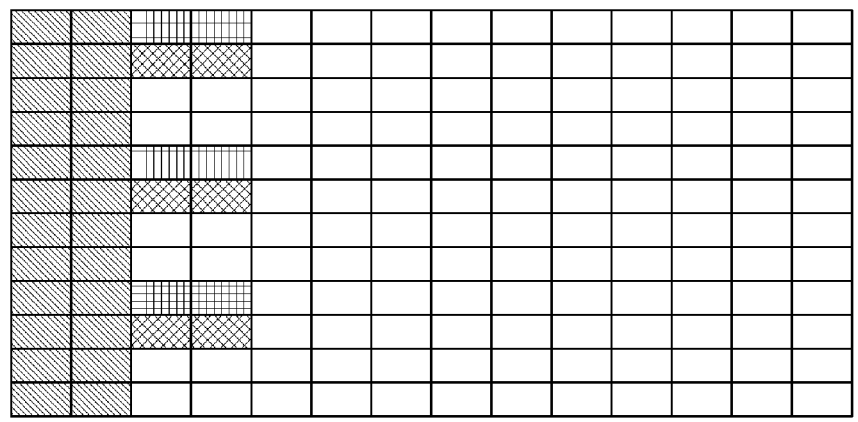
FIGS. 27 and 28 are diagrams illustrating one example of a demodulation reference signal for the numbers of antenna ports and layers proposed by the present disclosure.
Figure 27:
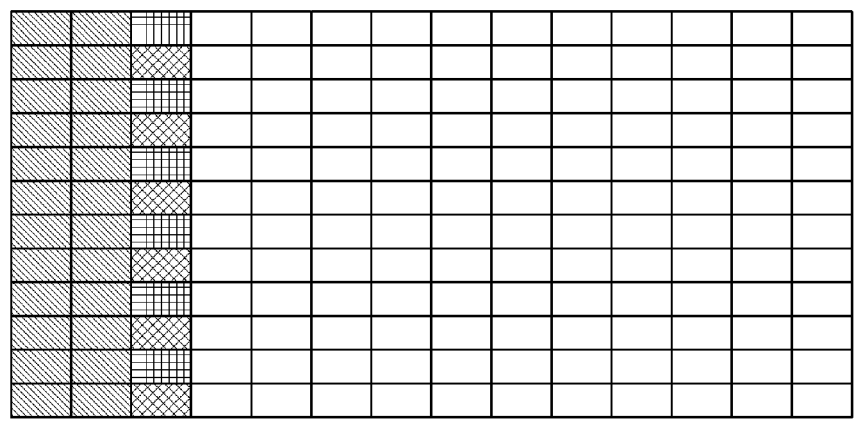
Figure 27:
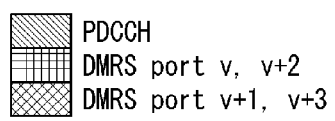
Figure 28:
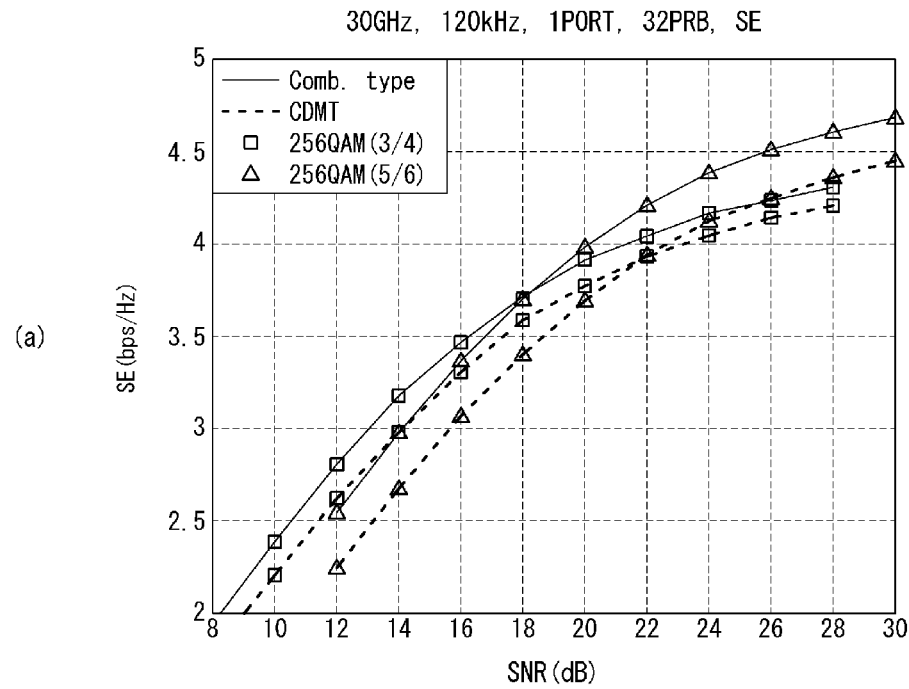
Figure 28:
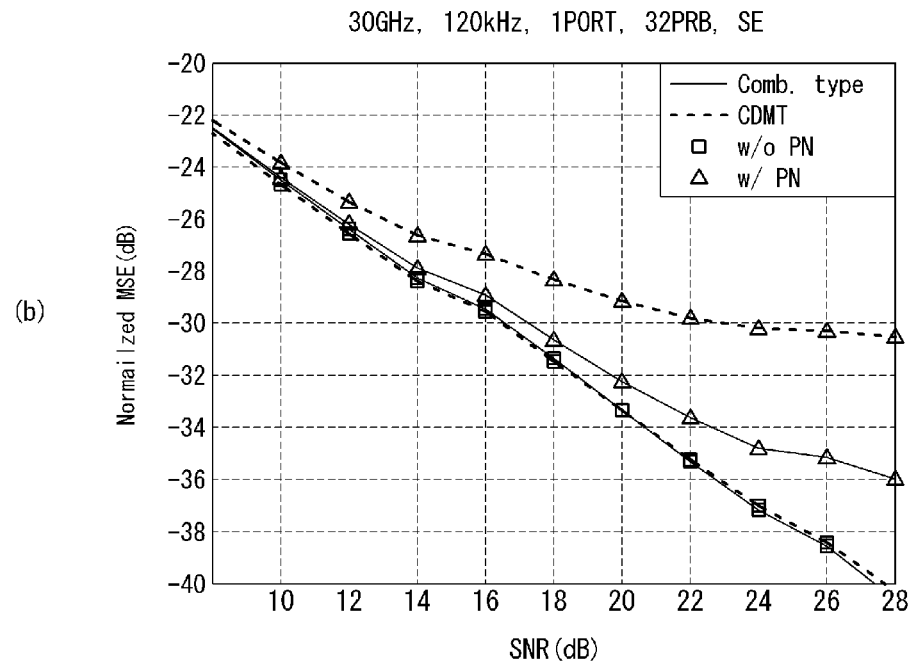

FIGS. 27 and 28 are diagrams illustrating one example of a demodulation reference signal for the numbers of antenna ports and layers proposed by the present disclosure.

FIGS. 27(a) and 27(b) illustrate examples of the mapping pattern of the DMRS to which the CDM scheme is applied on the time axis and the mapping pattern of a comb type DMRS and FIG. 28 is a diagram illustrating SE and MSE performance for the mapping pattern of FIG. 27.

The comb type DMRS represents a DMRS mapped to the resource element at the same frequency interval having the same OFDM symbol index.

As illustrated in FIGS. 28(a) and 28(b), it can be seen that the performance degradation occurs due to the phase noise in a band of 60 GHz or more in the case of the mapping pattern of the DMRS using the CDM scheme on the time axis of FIG. 27(a).

Accordingly, in order to use the mapping pattern of the same DMRS regardless of the carrier frequency or MCS, the mapping pattern of the comb type DMRS of FIG. 27(b) should be used as a default pattern.

When the mapping pattern of comb type DMRS of FIG. 27(b) is used as the default pattern, the port for transmitting the DMRS may be extended by using at least one time domain OCC or repetition of the mapping pattern.

In this case, when a repetition factor indicating the number of times at which the mapping pattern of the OFDM symbol is repeated is set to 2, the CDM length on the frequency axis is increased and the CDM is additionally applied on the time axis to extend the antenna port.

When the CDM is extended on the frequency axis, if the repetition factor is set to 2, the performance degradation may be minimized.

When the repetition factor is changed by extending or reducing the port, orthogonality between the mapping patterns of the DMRSs having different repetition factors is not guaranteed.

Figure 29:
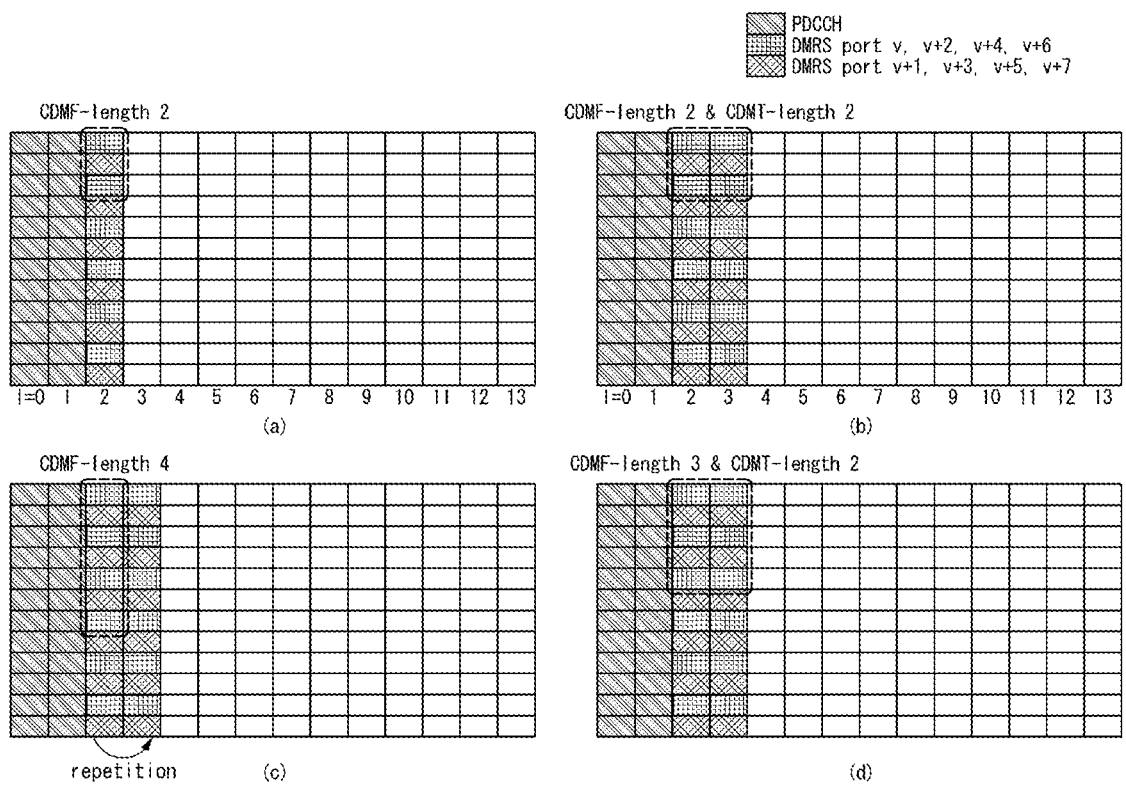
FIGS. 29 and 30 are diagrams illustrating another example of a demodulation reference signal for the numbers of antenna ports and layers proposed by the present disclosure.
Figure 30:
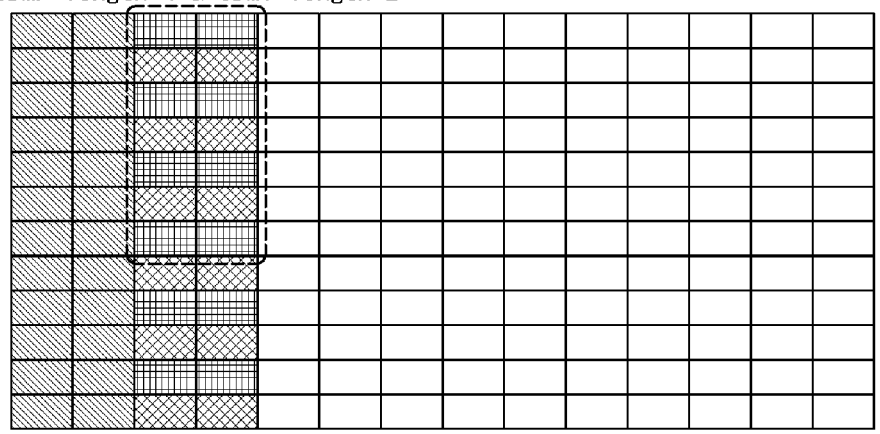
Figure 30:
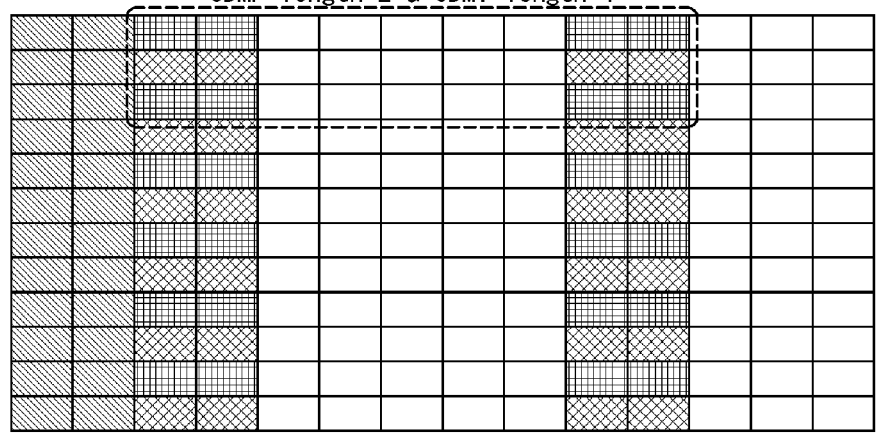
Figure 30:

FIGS. 29 and 30 are diagrams illustrating another example of a demodulation reference signal for the numbers of antenna ports and layers proposed by the present disclosure.

Referring to FIGS. 29 and 30, the DMRS may be mapped by applying the CDM scheme on the frequency axis and the time axis in order to extend the number of ports for transmitting the DMRS.

Specifically, the number of ports may be extended through 6 schemes shown in Table 18 below in a frequency band of 6 Ghz or less.

TABLE 18

| Method | Port number | Mapping pattern |
|---|---|---|
| 1 | Port 1/2/3/4 | CDMF-2/FDM-2 |
|  | Port 5/6 | CDMF-3/FDM-2 |
|  | Port 7/8 | CDMF-2/CDMF-2/FDM-2 |
|  | Port 9/10/11/12 | CDMF-3/CDMF-2/FDM-2 |
| 2 | Port 1/2/3/4 | CDMF-2/FDM-2 |
|  | Port 5/6 | CDMF-3/FDM-2 |
|  | Port 7/8/9/10/11/12 | CDMF-3/CDMT-2/FDM-2 |
| 3 | Port 1/2/3/4 | CDMF-2/FDM-2 |
|  | Port 5/6/7/8 | CDMF-2/CDMT-2/FDM-2 |
|  | Port 9/10/11/12 | CDMF-3/CDMT-2/FDM-2 |
| 4 | Port 1/2/3/4 | CDMF-2/FDM-2 |
|  | Port 5/6/7/8/9/10/11/12 | CDMF-3/CDMT-2/FDM-2 |
| 5 | Port 1/2/3/4/5/6 | CDMF-3/FDM-2 |
|  | Port 7/8 | CDMF-2/CDMT-2/FDM-2 |
|  | Port 9/10/11/12 | CDMF-3/CDMT-2/FDM-2 |
| 6 | Port 1/2/3/4/5/6 | CDMF-3/FDM-2 |
|  | Port 7/8/9/10/11/12 | CDMF-3/CDMT-2/FDM-2 |

Referring to Table 18, the DMRS may be applied on the time axis in addition to the frequency axis by using the CDM scheme in order to extend the number of ports for transmitting the DMRS by using the CDM scheme.

In the case of single UE, since the maximum number of ports is 8 ports (6 GHz or less) or 4 ports (6 GHz or more), method 3 may show best performance in Table 18.

However, in order to reduce types of pattern, methods 4 and 6 may be used. However, in the case of methods 4 and 6, since the types of pattern for mapping the DMRS it is difficult to provide an optimal pattern depending on the situation of the UE.

FIG. 29 is a diagram illustrating one example of a mapping method of the DMRS using the CDM scheme on the frequency axis and the time axis in order to extend a maximum of eight ports.

FIG. 29(a) illustrates a DMRS mapping pattern when the maximum number of ports is 4. In this case, the DMRS is mapped by using the CDM scheme having the length of 2 on the frequency axis.

FIG. 29(b) illustrates the DMRS mapping pattern when the maximum number of ports is 8. In this case, the DMRS is mapped by using the CDM scheme having the length of 2 on the frequency axis and the time axis.

FIG. 29(c) illustrates the DMRS mapping pattern using repetition when the maximum number of ports is 8. In this case, the DMRS is mapped by using the CDM scheme having the length of 4 on the frequency axis in a first symbol to which the DMRS is mapped and a second symbol is mapped through the same method as the first symbol.

In the case of the mapping pattern illustrated in FIG. 29(c), the DMRS sequences of the first symbol and the second symbol to which the DMRS is mapped may be the same as each other.

FIG. 29(d) illustrates the DMRS mapping pattern when the maximum number of ports is 12. In this case, the DMRS is mapped by using the CDM scheme having the length of 3 on the frequency axis and the CDM scheme having the length of 2 on the time axis.

FIG. 30 is a diagram illustrating one example of the mapping pattern of the DMRS for supporting a maximum of 16 ports.

FIG. 30(a) illustrates a mapping pattern for mapping the DMRS by using the CDM scheme having the length of 4 on the frequency axis and the CDM scheme having the length of 2 on the time axis and the mapping pattern may maintain the same RS overhead as the mapping pattern in which the maximum number of ports is 12. However, the degradation of the performance may occur in a channel environment in which the frequency selectivity is high.

FIG. 30(b) illustrates a mapping pattern for mapping the DMRS by using the CDM scheme having the length of 2 on the frequency axis and the CDM scheme having the length of 4 on the time axis and in the case of the mapping pattern, the performance degradation may occur and the RS overhead may increase in a channel which is resistant to the frequency selectivity, but has the high Doppler environment.

In the case of the port indexes of the mapping patterns described in FIGS. 29 and 30, each odd/even is FDMed and respective FDMed DMRSs are defined to be CDMed so as to reduce the interlayer interference in an environment of transmitting multiple layers.

The number of CDMed layers may be reduced in the case of transmitting the same layer in order to reduce the interlayer interference.

Specifically, when a difference in power between CDMed interlayer channels is large, small interference from a channel having large power exerts a very large influence on a layer having small power, and as a result, the degradation of the channel estimation performance may be caused and the degradation of overall SE performance may occur.

Accordingly, the port is defined so as to decrease the number of CDMed layers to guide stable performance.

Further, it may be advantageous in applying the rate matching to the structure of the mapping pattern in terms of the following points.

Since the rate matching is applied, the RS overhead is equal even in the case of additionally turning on the FDMed ports.

The structure has the same RS overhead, but may reduce the interlayer interference which occurs due to the CDM.

The rate matching means emptying the DMRS RE with respect to a port which is not transmitted. That is, even in the case of transmitting the DMRS only in port v, data or the DMRS is not transmitted and the RE is emptied and transmitted with respect to port v+1.

The eNB generates the DMRS sequence in order to the DMRS to the UE and generates the signal by mapping the generated DMRS sequence to the RE.

In this case, a specific sequence may be used for the resource in order to map the DMRS sequence generated through the methods described in FIGS. 10 and 11 according to the mapping patterns described in FIGS. 8 to 30. That is, the sequence is defined with respect to an entire band for transmitting the DMRS and the UE may be configured to use only the sequence for the band allocated thereto in order to maintain orthogonality with other UEs to which the same band is allocated.

When the DMRS is mapped on the frequency axis and the time axis by using the CDM in FIGS. 8 to 30, the CDMs are separated from each other with respect to the frequency domain and the time domain and different orthogonal codes may be applied to the frequency domain and the time domain, respectively.

Hereinafter, the orthogonal code may be referred to as an orthogonal cover code or an OCC code.

In this case, as the orthogonal code of the frequency domain may be a DFT code may be used and as the orthogonal code of the time domain, a Walsh-Hadamard code may be used.

When the orthogonal code is separately used in the frequency domain and the time domain, since the UE uses the DFT code in the frequency domain, the UE may perform channel estimation by using a characteristic that the signal in the time domain is cyclically shifted.

Alternatively, the CDMs as many as multiplexed ports may be applied to both the frequency domain and the time domain. In this case, as the orthogonal code, the DFT code or Walsh-Hadamard code may be used.

Equation 12 below shows one example of a method of applying the CDM in the case of using one orthogonal code.

$$a_{k,l}^{(p)} = w_{time,p}(l') \cdot w_{freq,p}(k') \cdot r(k'') \qquad \text{[Equation 12]}$$

When the orthogonal code is defined, which includes both the frequency domain and the time domain as described above, the orthogonal code of the CDM for mapping the DMRS may be defined more simply than separately defining the frequency domain and the time domain.

Equation 13 below shows one example of separately applying the orthogonal code to the frequency domain and the time domain.

$$a_{k,l}^{(p)} = w_{time,p}(l') \cdot w_{freq,p}(k') \cdot r(k'')$$

$$a_{k,l}^{(p)} = w_{time,p}(l') \cdot w_{freq,p}(k') \cdot r(k'',l'') \qquad \text{[Equation 13]}$$

In Equations 12 and 13, k represents a frequency axis index, l represents a time axis index, and p represents the port index.

Further, $w_{time,p}(l')$ means the orthogonal code of the time domain of a port index p and $w_{freq,p}(k')$ means the orthogonal code of the frequency domain of the port index p.

r(k'') and r(k'',l'') mean base sequences constituting the DMRS sequence.

r(k'',l'') which is the base sequence constituting the DMRS sequence is generated based on a pseudo-random sequence in units of one OFDM symbol.

r(k'',l'') may be initialized by using the cell ID and the OFDM symbol index and all DMRS sequences positioned in the same subframe may be similarly defined. That is, one base sequence may be similarly used for multiple symbols.

r(k'') is generated based on the pseudo-random sequence in units of one subframe.

r(k'') may be initialized by using the cell ID and the subframe index for sequence randomization between different cells.

In this case, the subframe index is a variable for minimizing a sequence in which mutual interference between different cell IDs is large.

A value signaled through the DCI may not be included in order to initialize r(k''). That is, since a maximum of 12 ports are supported in the NR in order to support a quasi-orthogonal DMRS, the value signaled by the DCI may not be required in order to initialize r(k'').

The code orthogonal to the time domain is allocated to ports using the same frequency domain orthogonal code with respect to ports occupying the same RE in the frequency domain.

Equation 19 below shows an example of the orthogonal code having the length of 2 in the frequency domain.

TABLE 19

| Antenna port $p$ | $[\overline{w}_p(0)\ \overline{w}_p(1)]$ |
|---|---|
| v | [+1 +1] |
| v + 1 | [+1 +1] |
| v + 2 | [+1 −1] |
| v + 3 | [+1 −1] |
| v + 4 | [+1 +1] |
| v + 5 | [+1 +1] |
| v + 6 | [+1 −1] |
| v + 7 | [+1 −1] |
| v + 8 | [+1 +1] |
| v + 9 | [+1 +1] |

TABLE 19-continued

| Antenna port $p$ | $[\overline{w}_p(0)\ \overline{w}_p(1)]$ |
|---|---|
| v + 10 | [+1 −1] |
| v + 11 | [+1 −1] |
| v + 12 | [+1 +1] |
| v + 13 | [+1 +1] |
| v + 14 | [+1 −1] |
| v + 15 | [+1 −1] |

In the orthogonal code of Table 19, when the maximum port is 12 ports, up to v+7 ports may be defined.

Table 20 below shows an example of the orthogonal code having the length of 3 in the frequency domain.

TABLE 20

| Antenna port $p$ | $[\overline{w}_p(0)\ \overline{w}_p(1)\ \overline{w}_p(2)]$ |
|---|---|
| v | [+1 +1 +1] |
| v + 1 | [+1 +1 +1] |
| v + 2 | [+1 $e^{j2\pi/3}$ $e^{j4\pi/3}$] |
| v + 3 | [+1 $e^{j2\pi/3}$ $e^{j4\pi/3}$] |
| v + 4 | [+1 +1 +1] |
| v + 5 | [+1 +1 +1] |
| v + 6 | [+1 $e^{j2\pi/3}$ $e^{j4\pi/3}$] |
| v + 7 | [+1 $e^{j2\pi/3}$ $e^{j4\pi/3}$] |
| v + 8 | [+1 $e^{j4\pi/3}$ $e^{j2\pi/3}$] |
| v + 9 | [+1 $e^{j4\pi/3}$ $e^{j2\pi/3}$] |
| v + 10 | [+1 $e^{j4\pi/3}$ $e^{j2\pi/3}$] |
| v + 11 | [+1 $e^{j4\pi/3}$ $e^{j2\pi/3}$] |

In the case of the orthogonal code having the length of 3, in order to use the orthogonal code having the length of 2 in the time domain similarly in the cases where the maximum port is 8 and 12, the orthogonal code having the length of 3 in the frequency domain should be used as shown in Table 20.

That is, antenna ports v, v+2, and v+8 should be orthogonal to each other in the frequency domain and when the entire frequency/time domain is considered, v, v+2, v+4, v+6, v+8, and v+10 should be orthogonal to each other.

Table 21 below shows one example of the orthogonal code having the length of 4 in the frequency domain.

TABLE 21

| Antenna port $p$ | $[\overline{w}_p(0)\ \overline{w}_p(1)\ \overline{w}_p(2)\ \overline{w}_p(3)]$ |
|---|---|
| v | [+1 +1 +1 +1] |
| v + 1 | [+1 +1 +1 +1] |
| v + 2 | [+1 $e^{j2\pi/4}$ $e^{j4\pi/4}$ $e^{j6\pi/4}$] |
| v + 3 | [+1 $e^{j2\pi/4}$ $e^{j4\pi/4}$ $e^{j6\pi/4}$] |
| v + 4 | [+1 $e^{j4\pi/4}$ $e^{j8\pi/4}$ $e^{j12\pi/4}$] |
| v + 5 | [+1 $e^{j4\pi/4}$ $e^{j8\pi/4}$ $e^{j12\pi/4}$] |
| v + 6 | [+1 $e^{j6\pi/4}$ $e^{j12\pi/4}$ $e^{j18\pi/4}$] |
| v + 7 | [+1 $e^{j6\pi/4}$ $e^{j12\pi/4}$ $e^{j18\pi/4}$] |
| v + 8 | [+1 $e^{j4\pi/4}$ $e^{j8\pi/4}$ $e^{j12\pi/4}$] |
| v + 9 | [+1 $e^{j4\pi/4}$ $e^{j8\pi/4}$ $e^{j12\pi/4}$] |
| v + 10 | [+1 +1 +1 +1] |
| v + 11 | [+1 +1 +1 +1] |
| v + 12 | [+1 $e^{j6\pi/4}$ $e^{j12\pi/4}$ $e^{j18\pi/4}$] |
| v + 13 | [+1 $e^{j6\pi/4}$ $e^{j12\pi/4}$ $e^{j18\pi/4}$] |
| v + 14 | [+1 $e^{j2\pi/4}$ $e^{j4\pi/4}$ $e^{j6\pi/4}$] |
| v + 15 | [+1 $e^{j2\pi/4}$ $e^{j4\pi/4}$ $e^{j6\pi/4}$] |

When the orthogonal code having the length of 4 is defined in the frequency domain, up to port index v+7 should be defined as the orthogonal code in order to support the maximum antenna port up to 7 ports.

In order to support the maximum antenna port up to 16 ports, the orthogonal code having the length of 2 should be defined in the time domain in addition to the orthogonal code of Table 21.

In order to share the orthogonal code having the length of 2 in the time domain, multiplexing shown in Table 21 is required. That is, antenna ports v, v+2, v+8, and v+12 should be orthogonal to each other in the frequency domain.

When the entirety of the frequency and time domains is considered, antenna ports v, v+2, v+4, v+6, v+8, v+10, v+12, and v+14 should be orthogonal to each other.

Table 22 below shows one example of the orthogonal code having the length of 2 in the time domain.

TABLE 22

| Antenna port $p$ | $[\overline{w}_p(0)\ \overline{w}_p(1)]$ |
|---|---|
| v | [+1 +1] |
| v + 1 | [+1 +1] |
| v + 2 | [+1 +1] |
| v + 3 | [+1 +1] |
| v + 4 | [+1 −1] |
| v + 5 | [+1 −1] |
| v + 6 | [+1 −1] |
| v + 7 | [+1 −1] |
| v + 8 | [+1 +1] |
| v + 9 | [+1 +1] |
| v + 10 | [+1 −1] |
| v + 11 | [+1 −1] |
| v + 12 | [+1 +1] |
| v + 13 | [+1 +1] |
| v + 14 | [+1 −1] |
| v + 15 | [+1 −1] |

When the orthogonal code having the length of 2 is defined in the time domain, up to port index v+11 should be defined as the orthogonal code having the length of 2 in order to support the maximum antenna port up to 12 ports.

Table 23 below shows one example of the orthogonal code having the length of 4 in the time domain.

TABLE 23

| Antenna port p | $[\overline{w}_p(0)\ \overline{w}_p(1)\ \overline{w}_p(2)\ \overline{w}_p(3)]$ |
|---|---|
| v | [+1 +1 +1 +1] |
| v + 1 | [+1 +1 +1 +1] |
| v + 2 | [+1 +1 +1 +1] |
| v + 3 | [+1 +1 +1 +1] |
| v + 4 | [+1 −1 +1 −1] |
| v + 5 | [+1 −1 +1 −1] |
| v + 6 | [+1 −1 +1 −1] |
| v + 7 | [+1 −1 +1 −1] |
| v + 8 | [+1 −1 −1 +1] |
| v + 9 | [+1 −1 −1 +1] |
| v + 10 | [+1 −1 −1 +1] |
| v + 11 | [+1 −1 −1 +1] |
| v + 12 | [+1 +1 −1 −1] |
| v + 13 | [+1 +1 −1 −1] |
| v + 14 | [+1 +1 −1 −1] |
| v + 15 | [+1 +1 −1 −1] |

The eNB may inform the UE of the length of the orthogonal code in the frequency domain and the length of the orthogonal code in the time domain through the explicit method or the implicit method.

Specifically, in the case of the explicit method, the eNB may indicate the length of the orthogonal code to the UE through the RRC and/or DCI signaling and the UE may recognize the length of the orthogonal code through the RRC and/or DCI signaling transmitted from the eNB.

In the case of the implicit method, the UE may recognize the length of the orthogonal code in the time domain and the length of the orthogonal code in the frequency domain through different methods, respectively.

In the case of the length of the orthogonal code in the frequency domain, the length of the orthogonal code may vary depending on the maximum port number supported. Accordingly, the eNB may inform the UE of the maximum port number and the UE may recognize the length of the orthogonal code based on the maximum port number.

In the case of the length of the orthogonal code in the time domain, a maximum of 12 antenna ports may be supported with the orthogonal code having the orthogonal code having the length of 2. Accordingly, when the eNB informs the UE of whether the CDM is applied to the time domain, the UE may recognize that the CDM length in the time domain is 2 up to 12 ports.

Alternatively, when it is determined whether the CDM is applied to the time domain according to the maximum port number, the eNB may inform the UE of the maximum port number and the UE may recognize whether the CDM is applied to the time domain according to the maximum port number.

Further, in this case, the UE may recognize the CDM length as 2 when the maximum port number is equal to or less than 12 ports and recognize the CDM length as 4 when the maximum port number is more than 12 ports.

In the high-frequency band of 6 GHz or more, the eNB may support a maximum of 4 ports in the case of a single-user (SU) and support a maximum of 12 ports in the case of multi-users (MUs).

In the high-frequency band, the eNB may map the DMRS to the OFDM symbol by considering the MU-MIMI in addition to the SU.

The DMRS may be mapped to one OFDM symbol up to four antenna ports and in the case of the MU-MIMO for the antenna port number which is more than 4, the following method may be used.

Since the degradation of the performance occurs due to the phase noise when applying the CDM to the time domain, the DMRS may be mapped by using the repetition pattern in order to support a plurality of UEs of high MCS in layer 1. When the DMRS is mapped by using the repetition pattern, a beam supporting each UE varies, and as a result, an environment in which interference is very small may be created.

Since the influence of the phase noise is comparatively small due to the CDM to the time domain in low MCS, layer 2 may support higher SE than layer 1 by using the low MCS. Accordingly, in the case of the MU-MIMO for layer 2 or more, the CDM to the time domain may be applied.

Table 24 below shows one example of a mapping pattern depending on the number of antenna ports in the high-frequency band.

TABLE 24

| Port 1/2/3/4 | Port 5/6/7/8 | Port 9/10/11/12 |
|---|---|---|
| CDMF-2/FDM-2 | CDMF-2/CDMT-2/FDM-2 CDMF-4/FDM-2 with repetition (for high MCS MU-MIMO) | CDMF-3/CDMT-2/FDM-2 |

Figure 31:
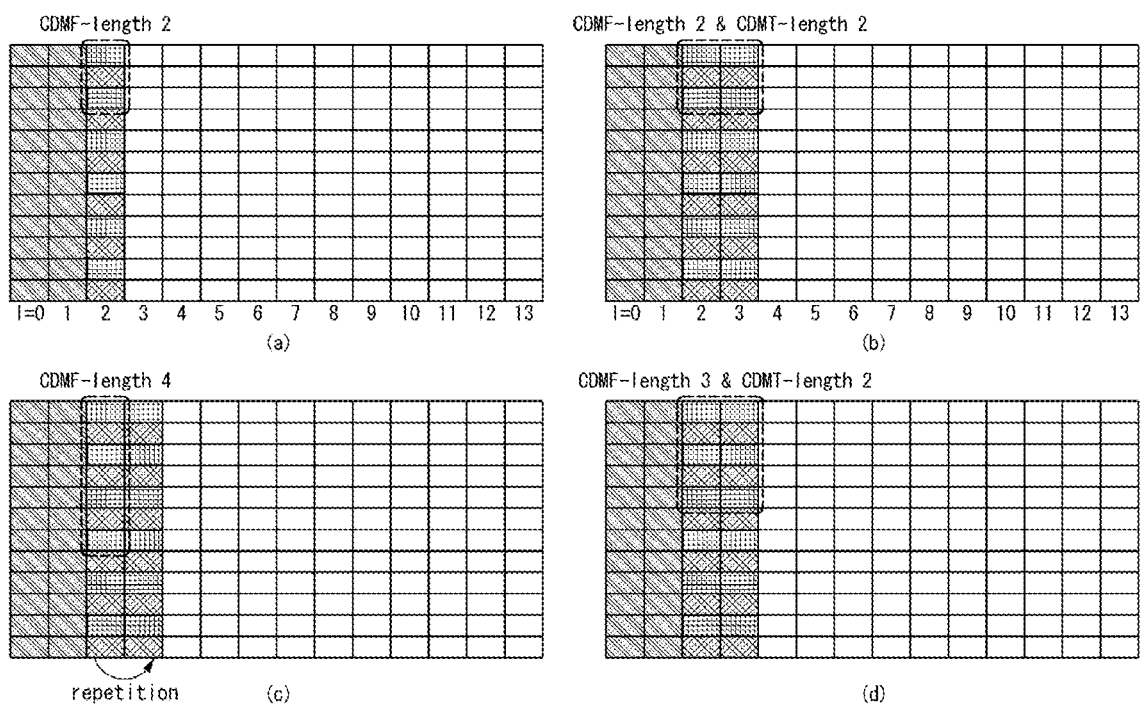
FIG. 31 is a diagram illustrating another example of a mapping pattern of a demodulation reference signal using a code division multiplexing scheme proposed by the present disclosure.

FIG. 31 is a diagram illustrating another example of a mapping pattern of a demodulation reference signal using a code division multiplexing scheme proposed by the present disclosure.

Referring to FIG. 31, when the MU-MIMO is supported, the DMRS may be mapped by using considering transparency.

As illustrated in FIG. 31, the DMRS may be mapped in different patterns according to the number of antenna ports and the number of layers.

That is, the CDM scheme having the length of 2 or 4 may be applied in the frequency domain and the CDM scheme having the length of 2 may be applied in the time domain according to the number of antenna ports and the number of layers.

Further, as illustrated in FIG. 31(c), the repetition pattern may be applied, in which the pattern of the first symbol to which the DMRS is mapped is repeatedly used. In this case, the same DMRS sequence may be used among the repeated patterns.

The numbers of antenna ports, scrambling identifies, and layers for supporting the DMRS to the resource may be transmitted to the UE through the DCI.

Table 25 below shows one example of the numbers of antenna ports, scrambling identifies, and layers depending on the codeword.

TABLE 25

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11,13, $n_{SCID} = 1$ (OCC = 4) |
| 6 | 1 layer, port 8, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

In Table 25, the numbers of antenna ports, scrambling identifies, and layers may be defined by 3 bits or 4 bits.

In this case, when the numbers of antenna ports, scrambling identifies, and layers are defined by 3 bits, nSCID represents scrambling identifiers of antenna ports 7 and 8 and when the numbers of antenna ports, scrambling identifies, and layers are defined by 3 bits, nSCID represents scrambling identifiers of antenna ports 7, 8, 11, and 13.

In the NR, the number of codewords described below is supported every PDSCH/PUSCH allocated to each UE.

Layer 1 to 4 transmission: One codeword
Layer 5 to 8 transmission: Two codewords DMRS port groups which belong to each codeword have different QCL assumptions.

One uplink or downlink related to the DCI includes one MCS for each codeword and one CQI may be calculated for each codeword.

In this case, a method for indicating the numbers of antenna ports and layers may be as follows.

First, when the DMRS is mapped through a third scheme of Table 18, a bit number of the DCI field for indicating the numbers of antenna ports and layers may be differently defined according to the number of codewords.

Specifically, as described above, the number of supported layers may vary depending on the number of codewords. Accordingly, the number of combinations in which the MU-MIMO is available may vary depending on the number of codewords.

That is, when number of codewords is one, more MU-MIMO combinations are available, and as a result, more bits for indicating the combinations are required.

For example, when the number of codewords is one, information related to the numbers of antenna ports and layers may be indicated by using 5 bits.

When the number of codewords is two, the information related to the numbers of antenna ports and layers may be indicated by using 3 or 4 bits.

Table 26 below shows one example of the table for the codeword in the case of supporting layers 3 to 8 in two codewords.

TABLE 26

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 1 (OCC = 2) | 0 | 3 layer, port 1-3 (OCC = 2) |
| 1 | 1 layer, port 2 (OCC = 2) | 1 | 3 layer, port 1-3 (OCC = 3) |
| 2 | 1 layer, port 3 (OCC = 2) | 2 | 3 layer, port 4-6 (OCC = 3) |
| 3 | 1 layer, port 4 (OCC = 2) | 3 | 3 layer, port 7-9 (OCC = 3) |
| 4 | 1 layer, port 1, TDOCC (OCC = 2) | 4 | 3 layer, port 10-12 (OCC = 3) |
| 5 | 1 layer, port 2, TDOCC (OCC = 2) | 5 | 4 layer, port 1-4 (OCC = 2) |
| 6 | 1 layer, port 3, TDOCC (OCC = 2) | 6 | 4 layer, port 1-4 (OCC = 3) |
| 7 | 1 layer, port 4, TDOCC (OCC = 2) | 7 | 4 layer, port 5-8 (OCC = 3) |
| 8 | 1 layer, port 5, TDOCC (OCC = 2) | 8 | 4 layer, port 9-12 (OCC = 3) |
| 9 | 1 layer, port 6, TDOCC (OCC = 2) | 9 | 5 layer, port 1-5 (OCC = 3) |
| 10 | 1 layer, port 7, TDOCC (OCC = 2) | 10 | 5 layer, port 6-10 (OCC = 3) |

TABLE 26-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 11 | 1 layer, port 8, TDOCC (OCC = 2) | 11 | 6 layer, port 1-6 (OCC = 3) |
| 12 | 2 layer, port 1-2 (OCC = 2) | 12 | 6 layer, port 7-12 (OCC = 3) |
| 13 | 2 layer, port 3-4 (OCC = 2) | 13 | 7 layer, port 1-7, TDOCC (OCC = 2) |
| 14 | 2 layer, port 1-2 (OCC = 3) | 14 | 8 layer, port 1-8, TDOCC (OCC = 2) |
| 15 | 2 layer, port 3-4 (OCC = 3) | 15 | |
| 16 | 2 layer, port 5-6 (OCC = 3) | | |
| 17 | 2 layer, port 7-8 (OCC = 3) | | |
| 18 | 2 layer, port 9-10 (OCC = 3) | | |
| 19 | 2 layer, port 11-12 (OCC = 3) | | |
| 20 | 1 layer, port 1 (OCC = 4) | | |
| 21 | 1 layer, port 2 (OCC = 4) | | |
| 22 | 1 layer, port 3 (OCC = 4) | | |
| 23 | 1 layer, port 4 (OCC = 4) | | |
| 24 | 1 layer, port 5 (OCC = 4) | | |
| 25 | 1 layer, port 6 (OCC = 4) | | |
| 26 | 1 layer, port 7 (OCC = 4) | | |
| 27 | 1 layer, port 8 (OCC = 4) | | |
| 28 | 3 layer, port 1-3 (OCC = 2) | | |
| 29 | 4 layer, port 1-4 (OCC = 2) | | |
| 30 | | | |
| 31 | | | |

In Table 26, a case where the rate matching is performed is assumed and in the case where the rate matching is performed, transparent MU-MIMO is available.

In this case, the UE may implicitly recognize whether the MU-MIMO is performed through the DCI signaling. For example, when values of 4 to 11/14 to 27 of Table 26 are allocated in one codeword, the UE may recognize that the MU-MIMO is performed.

When Table 26 above is applied, it may be efficient to support layers 3 and 4 in two codewords in terms of the DCI signaling.

That is, when the MU-MIMO for layer 3 or 4 UE is supported, 6 bits are required for supporting the MU-MIMO in one codeword, the table may be separately defined according to whether the SU/MU-MIMO is performed.

However, in this case, the UE should explicitly or implicitly receive whether the SU/MU-MIMO is performed from the eNB.

Table 27 below shows one example of the table for the codeword in the case of supporting layers 5 to 8 in two codewords.

TABLE 27

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 1 (OCC = 2) | 0 | 5 layer, port 1-5 (OCC = 3) |
| 1 | 1 layer, port 2 (OCC = 2) | 1 | 5 layer, port 6-10 (OCC = 3) |
| 2 | 1 layer, port 3 (OCC = 2) | 2 | 6 layer, port 1-6 (OCC = 3) |
| 3 | 1 layer, port 4 (OCC = 2) | 3 | 6 layer, port 7-12 (OCC = 3) |
| 4 | 1 layer, port 1, TDOCC (OCC = 2) | 4 | 7 layer, port 1-7, TDOCC (OCC = 2) |
| 5 | 1 layer, port 2, TDOCC (OCC = 2) | 5 | 8 layer, port 1-8, TDOCC (OCC = 2) |
| 6 | 1 layer, port 3, TDOCC (OCC = 2) | 6 | |
| 7 | 1 layer, port 4, TDOCC (OCC = 2) | 7 | |
| 8 | 1 layer, port 5, TDOCC (OCC = 2) | | |
| 9 | 1 layer, port 6, TDOCC (OCC = 2) | | |
| 10 | 1 layer, port 7, TDOCC (OCC = 2) | | |
| 11 | 1 layer, port 8, TDOCC (OCC = 2) | | |
| 12 | 2 layer, port 1-2 (OCC = 2) | | |
| 13 | 2 layer, port 3-4 (OCC = 2) | | |
| 14 | 2 layer, port 1-2 (OCC = 3) | | |
| 15 | 2 layer, port 3-4 (OCC = 3) | | |
| 16 | 2 layer, port 5-6 (OCC = 3) | | |
| 17 | 2 layer, port 7-8 (OCC = 3) | | |
| 18 | 2 layer, port 9-10 (OCC = 3) | | |
| 19 | 2 layer, port 11-12 (OCC = 3) | | |
| 20 | 1 layer, port 1 (OCC = 4) | | |
| 21 | 1 layer, port 2 (OCC = 4) | | |
| 22 | 1 layer, port 3 (OCC = 4) | | |
| 23 | 1 layer, port 4 (OCC = 4) | | |
| 24 | 1 layer, port 5 (OCC = 4) | | |
| 25 | 1 layer, port 6 (OCC = 4) | | |
| 26 | 1 layer, port 7 (OCC = 4) | | |
| 27 | 1 layer, port 8 (OCC = 4) | | |
| 28 | 3 layer, port 1-3 (OCC = 2) | | |
| 29 | 4 layer, port 1-4 (OCC = 2) | | |
| 30 | | | |
| 31 | | | |

Second, when the DMRS is mapped through a third scheme of Table 18, a bit number of the DCI field for indicating the numbers of antenna ports and layers may be differently defined according to whether the SU-MIMO or MU-MIMO is performed.

That is, since more combinations in the case of the MU-MIMO are available than in the case of the SU-MIMO, more bits are required to indicate the combinations. Accordingly, the bit number of the DCI field for indicating the numbers of antenna ports and layers may be differently set according to whether the SU-MIMO or MU-MIMO is performed.

In this case, the eNB may explicitly or implicitly inform the UE of whether the SU-MIMO or MU-MIMO is performed.

When the eNB explicitly informs the UE of whether the SU-MIMO or MU-MIMO is performed, the eNB may inform the UE of whether the SU-MIMO or MU-MIMO is performed through the RRC and/or DCI signaling.

When the eNB implicitly informs the UE of whether the SU-MIMO or MU-MIMO is performed, the UE may recognize whether the SU-MIMO or MU-MIMO is performed through the RRC and/or DCI signaling.

Table 28 below shows one example of the table for the codeword according to whether the SU-MIMO or MU-MIMO is performed.

TABLE 28

| SU-MIMO | | MU-MIMO | |
| --- | --- | --- | --- |
| Value | Message | Value | Message |
| 0 | 1 layer, port 1 (OCC = 2) | 0 | 1 layer, port 1 (OCC = 2) |
| 1 | 2 layer, port 1-2 (OCC = 2) | 1 | 1 layer, port 2 (OCC = 2) |
| 2 | 3 layer, port 1-3 (OCC = 2) | 2 | 1 layer, port 3 (OCC = 2) |
| 3 | 4 layer, port 1-4 (OCC = 2) | 3 | 1 layer, port 4 (OCC = 2) |
| 4 | 5 layer, port 1-5, TDOCC (OCC = 2) | 4 | 1 layer, port 1, TDOCC (OCC = 2) |
| 5 | 6 layer, port 1-6, TDOCC (OCC = 2) | 5 | 1 layer, port 2, TDOCC (OCC = 2) |
| 6 | 7 layer, port 1-7, TDOCC (OCC = 2) | 6 | 1 layer, port 3, TDOCC (OCC = 2) |
| 7 | 8 layer, port 1-8, TDOCC (OCC = 2) | 7 | 1 layer, port 4, TDOCC (OCC = 2) |
| | | 8 | 1 layer, port 5, TDOCC (OCC = 2) |
| | | 9 | 1 layer, port 6, TDOCC (OCC = 2) |
| | | 10 | 1 layer, port 7, TDOCC (OCC = 2) |
| | | 11 | 1 layer, port 8, TDOCC (OCC = 2) |
| | | 12 | 1 layer, port 1 (OCC = 4) |
| | | 13 | 1 layer, port 2 (OCC = 4) |
| | | 14 | 1 layer, port 3 (OCC = 4) |
| | | 15 | 1 layer, port 4 (OCC = 4) |
| | | 16 | 1 layer, port 5 (OCC = 4) |

TABLE 28-continued

| SU-MIMO | | MU-MIMO | |
|---|---|---|---|
| Value | Message | Value | Message |
| | | 17 | 1 layer, port 6 (OCC = 4) |
| | | 18 | 1 layer, port 7 (OCC = 4) |
| | | 19 | 1 layer, port 8 (OCC = 4) |
| | | 20 | 2 layer, port 1-2 (OCC = 2) |
| | | 21 | 2 layer, port 3-4 (OCC = 2) |
| | | 22 | 2 layer, port 1-2 (OCC = 3) |
| | | 23 | 2 layer, port 3-4 (OCC = 3) |
| | | 24 | 2 layer, port 5-6 (OCC = 3) |
| | | 25 | 2 layer, port 7-8 (OCC = 3) |
| | | 26 | 2 layer, port 9-10 (OCC = 3) |
| | | 27 | 2 layer, port 11-12 (OCC = 3) |
| | | 28 | 4 layer, port 1-4 (OCC = 3) |
| | | 29 | 4 layer, port 5-8 (OCC = 3) |
| | | 30 | 4 layer, port 9-12 (OCC = 3) |
| | | 31 | |

When the eNB is the SU-MIMO, information of Table 28 is indicated by 3 bits and when the eNB is the MU-MIMO, information of Table 26 is indicated by 5 bits.

Further, the eNB may transmit to the UE pattern information related to the mapping pattern in which the DMRS is mapped through the higher layer signaling (e.g., MAC CE, RRC, etc.).

The pattern information may include at least one of the maximum number of ports, the number of layers, or the port multiplexing scheme for recognizing the mapping pattern of the DMRS.

Since the number of OFDM symbols to which the DMRS is mapped may be related to the maximum port number, the UE may recognize the DMRS pattern in the cell by receiving the pattern information.

In this case, the mapping pattern of the DMRS may be determined according to the maximum port number and the eNB informs the UE of the pattern information including the maximum port number to inform the UE of the mapping pattern of the DMRS.

Further, the eNB defines the table for informing the UE of the transmission port of the DMRS according to the mapping pattern of the DMRS and informs of the port index through the DCI by using the defined table to support the UE without a scheduling limit in the case of the MU-MIMO.

Alternatively, when the eNB informs the UE of the mapping pattern of the DMRS through the port multiplexing scheme, the eNB may transmit to the UE information (e.g., the CDM length, whether the repetition pattern is used in the time domain, whether the CDM is used in the time domain, etc.) related to the port multiplexing scheme through the DCI.

In this case, the eNB may transmit only the mapping pattern of the DMRS through the higher layer signaling and transmit information related to a detailed port multiplexing method through the DCI.

Alternatively, the length of the CDM may vary depending on the maximum port number even in the same DMRS pattern. Accordingly, information such as the maximum port number capable of recognizing the mapping pattern of the DMRS may be transmitted to the UE through the higher layer signaling and information such as the CDM length may be transmitted to the UE through the DCI.

When such a method is used, the table becomes larger in order to define different CDM lengths, but the mapping pattern of the DMRS may be flexibly supported according to the situation of the UE.

The code included in the mapping information such as the numbers of antenna ports and layers represents a variable used for initializing the DMRS sequence for quasi-orthogonal transmission. That is, when the codes are different, the quasi-orthogonal transmission may be available between ports in which the codes are different by using different DMRS sequences.

Tables 29 to 30 below are tables showing one example for indicating the mapping information in the case of the DMRS mapping pattern supporting four antenna ports as illustrated in FIG. 31(a).

Table 29 below shows one example of indication of mapping information for allowing a quasi-orthogonal DMRS when performing the rate matching.

TABLE 29

One Codeword:
Codeword 0 enabled,
Codeword 1 disabled

| Value | Message |
|---|---|
| 0 | 1 layer, port 1, code = 0 |
| 1 | 1 layer, port 2, code = 0 |
| 2 | 1 layer, port 3, code = 0 |
| 3 | 1 layer, port 4, code = 0 |
| 4 | 1 layer, port 1, code = 1 |
| 5 | 1 layer, port 2, code = 1 |
| 6 | 1 layer, port 3, code = 1 |
| 7 | 1 layer, port 4, code = 1 |
| 8 | 2 layer, port 1-2, code = 0 |
| 9 | 2 layer, port 3-4, code = 0 |
| 10 | 2 layer, port 1-2, code = 1 |
| 11 | 2 layer, port 3-4, code = 1 |
| 12 | 3 layer, port 1-3 |
| 13 | 4 layer, port 1-4 |
| 14 | |
| 15 | |

Table 30 below shows one example of indication of mapping information for not allowing the quasi-orthogonal DMRS when performing the rate matching.

TABLE 30

One Codeword:
Codeword 0 enabled,
Codeword 1 disabled

| Value | Message |
|---|---|
| 0 | 1 layer, port 1 |
| 1 | 1 layer, port 2 |
| 2 | 1 layer, port 3 |
| 3 | 1 layer, port 4 |
| 4 | 2 layer, port 1-2 |
| 5 | 2 layer, port 3-4 |
| 6 | 3 layer, port 1-3 |
| 7 | 4 layer, port 1-4 |

Table 31 below shows one example of indication of mapping information for allowing the quasi-orthogonal DMRS when not performing the rate matching.

TABLE 31

| | One Codeword: Codeword 0 enabled, Codeword 1 disabled | |
|---|---|---|
| Value | Message | |
| 0 | 1 layer, port 1, code = 0 | |
| 1 | 1 layer, port 3, code = 0 | |
| 2 | 1 layer, port 1, code = 1 | |
| 3 | 1 layer, port 3, code = 1 | |
| 4 | 2 layer, port 1/3, code = 0 | |
| 5 | 2 layer, port 1/3, code = 1 | |
| 6 | 3 layer, port 1-3 | |
| 7 | 4 layer, port 1-4 | |

Table 32 below shows one example of indication of mapping information for not allowing the quasi-orthogonal DMRS when not performing the rate matching.

TABLE 32

| | One Codeword: Codeword 0 enabled, Codeword 1 disabled |
|---|---|
| Value | Message |
| 0 | 1 layer, port 1 |
| 1 | 1 layer, port 3 |
| 2 | 2 layer, port 1/3 |
| 3 | 3 layer, port 1-3 |
| 4 | 4 layer, port 1-4 |
| 5 | |
| 6 | |
| 7 | |

Tables 33 to 35 below are tables showing one example for indicating the mapping information in the case of the DMRS mapping pattern supporting eight antenna ports as illustrated in FIG. 31(b).

Table 33 below shows one example of indication of mapping information for not allowing the quasi-orthogonal DMRS when performing the rate matching.

TABLE 33

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 1 | 0 | 5 layer, port 1-5 |
| 1 | 1 layer, port 2 | 1 | 6 layer, port 1-6 |
| 2 | 1 layer, port 3 | 2 | 7 layer, port 1-7 |
| 3 | 1 layer, port 4 | 3 | 8 layer, port 1-8 |
| 4 | 1 layer, port 5 | | |
| 5 | 1 layer, port 6 | | |
| 6 | 1 layer, port 7 | | |
| 7 | 1 layer, port 8 | | |
| 8 | 2 layer, port 1-2 | | |
| 9 | 2 layer, port 3-4 | | |
| 10 | 2 layer, port 5-6 | | |
| 11 | 2 layer, port 7-8 | | |
| 12 | 3 layer, port 1-3 | | |
| 13 | 3 layer, port 4-6 | | |
| 14 | 4 layer, port 1-4 | | |
| 15 | 4 layer, port 5-8 | | |

Table 34 below shows one example of indication of mapping information for allowing the quasi-orthogonal DMRS when not performing the rate matching.

TABLE 34

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 1, code = 0 | 0 | 5 layer, port 1-5 |
| 1 | 1 layer, port 3, code = 0 | 1 | 6 layer, port 1-6 |
| 2 | 1 layer, port 5, code = 0 | 2 | 7 layer, port 1-7 |
| 3 | 1 layer, port 7, code = 0 | 3 | 8 layer, port 1-8 |
| 4 | 1 layer, port 1, code = 1 | | |
| 5 | 1 layer, port 3, code = 1 | | |
| 6 | 1 layer, port 5, code = 1 | | |
| 7 | 1 layer, port 7, code = 1 | | |
| 8 | 2 layer, port 1/3, code = 0 | | |
| 9 | 2 layer, port 5/7 code = 0 | | |
| 10 | 2 layer, port 1/3 code = 1 | | |
| 11 | 2 layer, port 5/7 code = 1 | | |
| 12 | 3 layer, port 1-3 code = 0 | | |
| 13 | 3 layer, port 1-3 code = 1 | | |
| 14 | 4 layer, port 1-4 code = 0 | | |
| 15 | 4 layer, port 1-4 code = 1 | | |

Table 35 below shows one example of indication of mapping information for not allowing the quasi-orthogonal DMRS when not performing the rate matching.

TABLE 35

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 1 | 0 | 5 layer, port 1-5 |
| 1 | 1 layer, port 3 | 1 | 6 layer, port 1-6 |
| 2 | 1 layer, port 5 | 2 | 7 layer, port 1-7 |
| 3 | 1 layer, port 7 | 3 | 8 layer, port 1-8 |
| 4 | 2 layer, port 1/3 | | |
| 5 | 2 layer, port 5/7 | | |
| 6 | 3 layer, port 1-3 | | |
| 7 | 4 layer, port 1-4 | | |

Tables 36 and 37 below are tables showing one example for indicating the mapping information in the case of the DMRS mapping pattern supporting twelve antenna ports as illustrated in FIG. 31(d).

Table 36 below shows one example of indication of mapping information for not allowing the quasi-orthogonal DMRS when performing the rate matching.

TABLE 36

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 1 | 0 | 5 layer, port 1-5 |
| 1 | 1 layer, port 2 | 1 | 5 layer, port 6-10 |
| 2 | 1 layer, port 3 | 2 | 6 layer, port 1-6 |
| 3 | 1 layer, port 4 | 3 | 6 layer, port 7-12 |
| 4 | 1 layer, port 5 | 4 | 7 layer, port 1-7 |
| 5 | 1 layer, port 6 | 5 | 8 layer, port 1-8 |
| 6 | 1 layer, port 7 | 6 | |
| 7 | 1 layer, port 8 | 7 | |
| 8 | 1 layer, port 9 | | |
| 9 | 1 layer, port 10 | | |
| 10 | 1 layer, port 11 | | |
| 11 | 1 layer, port 12 | | |
| 12 | 2 layer, port 1-2 | | |
| 13 | 2 layer, port 3-4 | | |
| 14 | 2 layer, port 5-6 | | |

TABLE 36-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 15 | 2 layer, port 7-8 | | |
| 16 | 2 layer, port 9-10 | | |
| 17 | 2 layer, port 11-12 | | |
| 18 | 3 layer, port 1-3 | | |
| 19 | 3 layer, port 4-6 | | |
| 20 | 3 layer, port 7-9 | | |
| 21 | 3 layer, port 10-12 | | |
| 22 | 4 layer, port 1-4 | | |
| 23 | 4 layer, port 5-8 | | |
| 24 | 4 layer, port 9-12 | | |
| 25 | | | |
| 26 | | | |
| 27 | | | |
| 28 | | | |
| 29 | | | |
| 30 | | | |
| 31 | | | |

Table 37 below shows one example of indication of mapping information for not allowing the quasi-orthogonal DMRS when not performing the rate matching.

TABLE 37

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 1 | 0 | 5 layer, port 1/3/5/7/9 |
| 1 | 1 layer, port 3 | 1 | 6 layer, port 1/3/5/7/9/11 |
| 2 | 1 layer, port 5 | 2 | 7 layer, port 1-2/3/5/7/9/11 |
| 3 | 1 layer, port 7 | 3 | 8 layer, port 1-4/5/7/9/11 |
| 4 | 1 layer, port 9 | | |
| 5 | 1 layer, port 11 | | |
| 6 | 2 layer, port 1/3 | | |
| 7 | 2 layer, port 5/7 | | |
| 8 | 2 layer, port 9/11 | | |
| 9 | 3 layer, port 1/3/5 | | |
| 10 | 3 layer, port 7/9/10 | | |
| 11 | 4 layer, port 1/3/5/7 | | |
| 12 | | | |
| 13 | | | |
| 14 | | | |
| 15 | | | |

Figure 32:
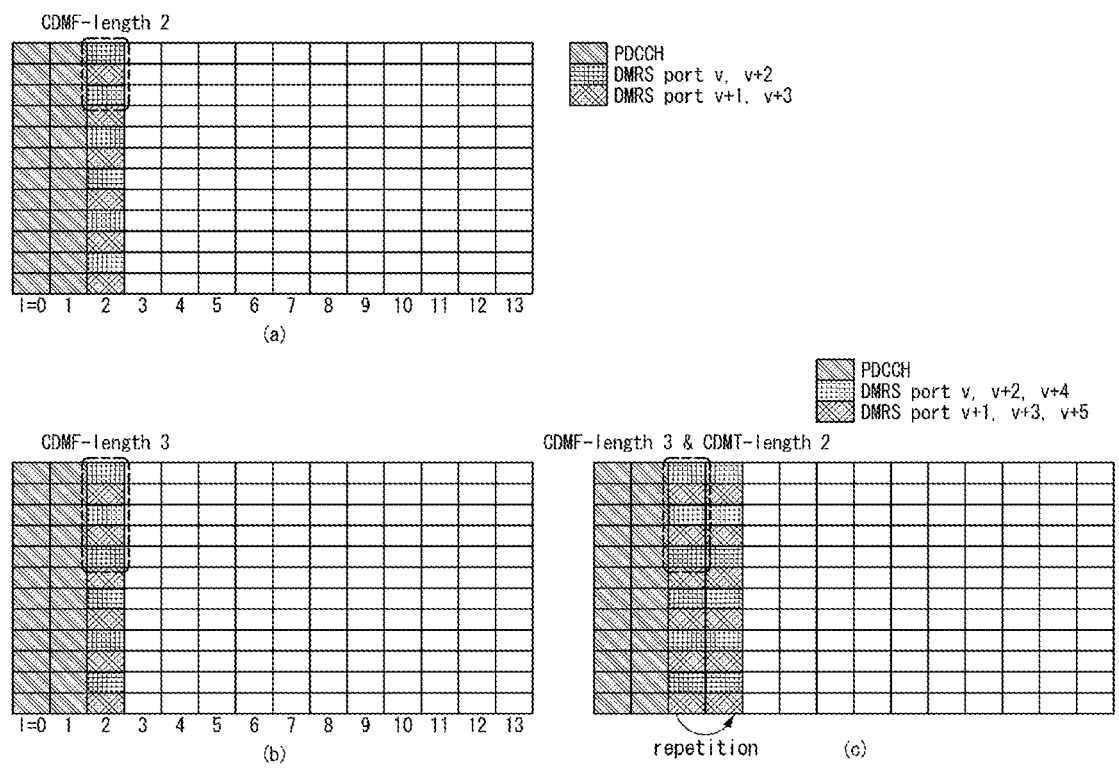
FIGS. 32 and 33 are diagrams illustrating one example of a mapping pattern of a demodulation reference signal using a repetition pattern proposed by the present disclosure.
Figure 33:
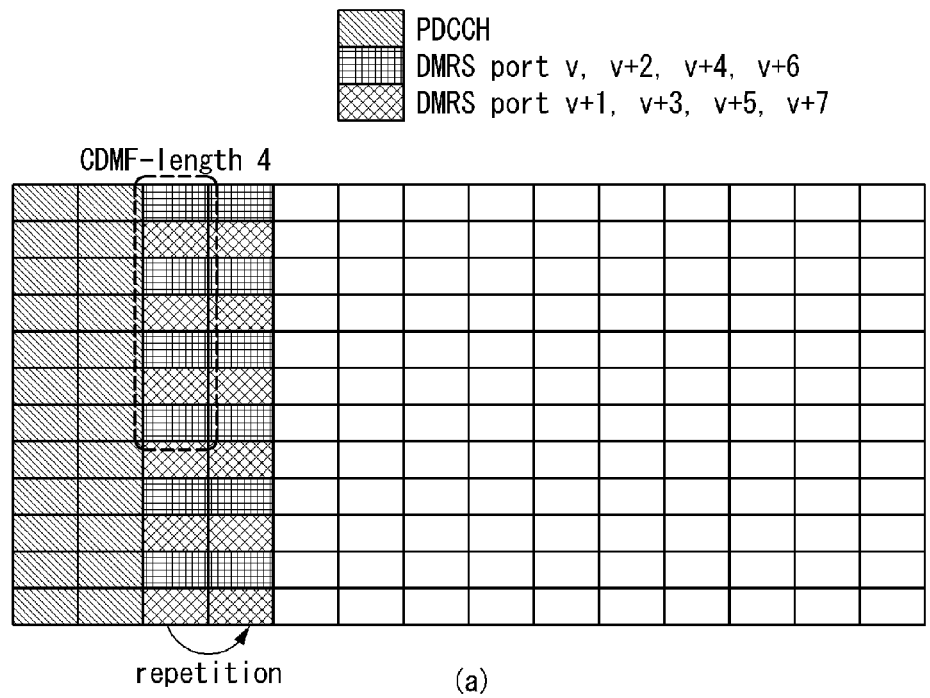
Figure 33:
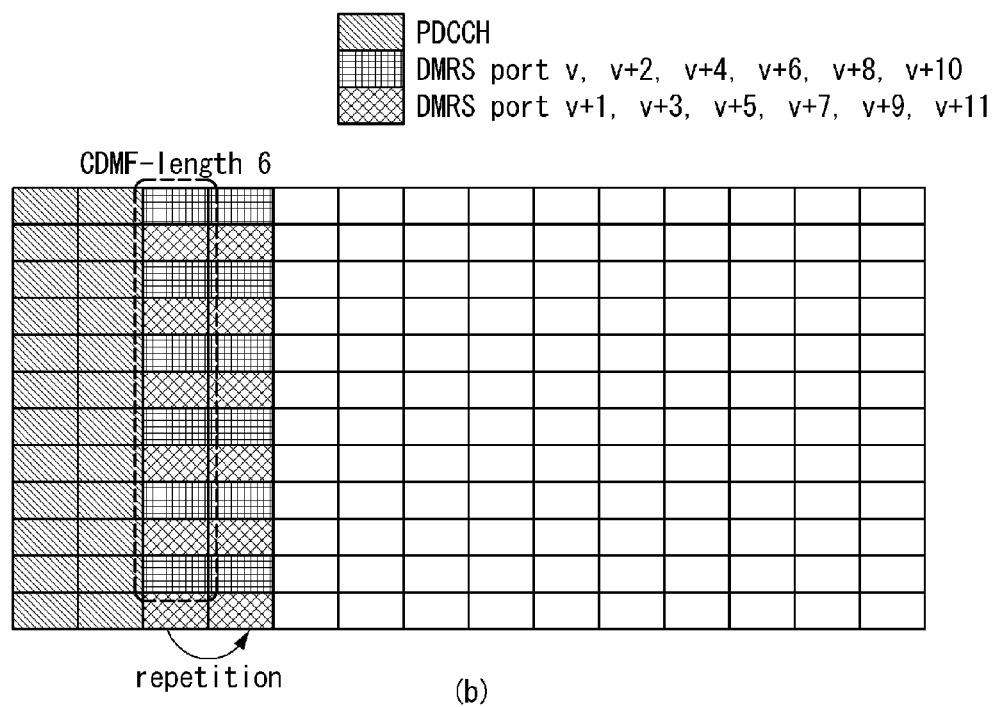

FIGS. 32 and 33 are diagrams illustrating one example of a mapping pattern of a demodulation reference signal using a repetition pattern proposed by the present disclosure.

Referring to FIGS. 32 and 33, when the number of antenna ports for transmitting the DMRS is more than a specific number, the DMRS may be mapped to the resource by using the repetition pattern.

Specifically, when the number of antenna ports for transmitting the DMRS is equal to or more than the specific number, the eNB may increase the CDM length in the frequency domain and repeatedly use the same pattern in the time domain.

For example, when the number of antenna ports for using the repetition is 4, the number of ports for transmitting the DMRS is 4 in FIG. 32(a), and as a result, the ports are multiplexed by using the CDM scheme having the length of 2 in the frequency domain without using the repetition pattern in the time domain.

However, in FIGS. 32(b) and 32(c), the number of ports for transmitting the DMRS is 6, and as a result, the DMRS may be mapped by using the repetition pattern in the time domain.

That is, as illustrated in FIG. 33(b), the length of the CDM is increased to 3 in the frequency domain and as illustrated in FIG. 33(c), six antenna ports may be supported by repeatedly using the pattern of FIG. 33(b) in the time domain.

In this case, the eNB may signal the number of ports for using the repetition pattern to the UE through the RRC and/or the DCI.

FIG. 33(a) illustrates one example of a method for mapping the DMRS by using the repetition pattern when the number of antenna ports for transmitting the DMRS is 8 and FIG. 33(b) is a diagram illustrating one example of a method of using the repetition pattern when the number of antenna ports is 12.

In the case of FIG. 33(b), since the maximum port number is 12, the maximum port number may exceed the maximum port number of the SU-MIMO. Accordingly, when the mapping pattern of FIG. 33(b) is used, it may be recognized that the MU-MIMO is applied.

In this case, when 12 antenna ports are used for transparent support of the MU, the rate matching may be performed for FDMed REs.

In this case, when the rate matching may also be performed for power boosting of the DMRS RE in an SU-MIMO situation, it is not assumed that the UE is not the SU-MIMO.

When the rate matching is performed, the UE may recognize that the MU-MIMO is applied. Accordingly, the UE may determine whether the MU-MIMO is applied through interference measurement and enhance reception performance through interference compensation.

In the embodiment, the maximum antenna port number of 12 is one embodiment and another specific value may be applied.

Further, the eNB may transmit to the UE a specific value indicating the number of antenna ports capable of recognizing whether the FDMed DMRS is rate-matched and that the MU-MIMO is applied.

The mapping patterns illustrated in FIGS. 32 and 33 are defined so that odd port indexes are CDMed and even port indexes are CDMed, but this is just one embodiment and ½ port is CDMed and ¾ port is CDMed and then various mapping methods including a method in which ports in which the indexes are odd/even are CDMed with each other may be applied for the subsequent ports.

As another embodiment of the present disclosure, the mapping pattern of the DMRS may be determined according to a transmission frequency.

Specifically, in the high-frequency band, the degradation of the CDM performance in the time domain may occur due to the influence of the phase noise. Accordingly, the CPE due to the phase noise may be estimated and compensated in the high-frequency band and the repetition pattern capable of enhancing the channel estimation performance by providing sufficient RS energy may be prioritized.

For example, when the maximum number of antenna ports is 12, the DMRS may be mapped as illustrated in FIG. 33(b).

When the mapping pattern illustrated in FIG. 33(b) is used, the length of the CDM may be increased in the frequency domain, and as a result, the prioritized mapping pattern may be changed according to a transmission frequency band.

Accordingly, the transmission frequency band and the DMRS pattern which may be preferred in the corresponding frequency band are associated with each other and determined to enhance the channel estimation performance according to the frequency band.

As yet another embodiment of the present disclosure, whether the CDM in the time domain is applied according to the CDM length of the frequency domain or the type of OCC code applied to the CDM in the time domain may be limited.

For example, when the CDM length in the frequency domain is 4, a maximum of 8 ports are supported in one symbol, and such a pattern is repeated on the time axis, the OCC applied to the CDM in the time domain may be limited to a specific OCC.

When the value of the CDM length in the frequency domain is large, more DMRS ports may be multiplexed in one OFDM symbol.

In this case, when the number of ports of the DMRS is more than 4, the RS energy is increased by mapping the DMRS by using the repetition pattern, thereby enhancing the performance. In particular, when the CDM in the time domain is used, the degradation of the performance due to the phase noise may be reduced.

When the DMRS is mapped by using the repetition pattern, whether the pattern is repeated may be indicated by CDM on/off of the time domain or indicated by the limit of the OCC code applied to the CDM.

For example, when the OCC code having the CDM length of 2 is used in the time domain in FIG. 31(d), the OCC code is shown as [+1, +1] and [+1, −1].

In this case, the total number of multiplexed ports in the DMRS pattern of FIG. 31(d) is 6, but when only one OCC code of the time domain is used, a total of 3 ports may be multiplexed.

In this case, when only the OCC code [+1, +1] is limited to be used, the same effect as using the repetition pattern may be acquired.

That is, when the CDM length in the frequency domain is 3 as illustrated in FIG. 31(d), a total of 12 ports may be multiplexed by using the OCC code having the length of 2 in the time domain.

In this case, when the CDM length in the frequency domain is equal to or more than 4, the CDM of the time domain is turned off or the type of OCC code is limited to one type, thereby acquiring the same effect as using the repetition pattern as illustrated in FIGS. 33(a) and 33(b).

In this case, the eNB may explicitly inform the UE of whether the CDM is applied in the time domain or the limit for the type of OCC code applied to the CDM through at least one of the higher layer signaling (e.g., RRC, MAC, CE, etc.) or DCI.

Alternatively, the eNB may inform of the CDM length in the frequency domain through at least one of the higher layer signaling or the DCI and the UE may recognize whether the CDM is applied in the time domain or the limit of the OCC code applied to the CDM based on the CDM length transmitted from the eNB.

As yet another embodiment of the present disclosure, the eNB may inform the UE of whether the CDM in the time domain is turned on/off or the type of OCC code applied to the CDM through the higher layer signaling or the DCI.

For example, the eNB may directly inform the UE of the OCC length in the time domain through the physical layer or the DCI.

In this case, when there is no limit for the time domain OCC code, a total of 12 ports should be supported, but when there is no limit, only a total of 6 ports are supported, the amount of information to be represented may be reduced.

When such information is informed through the DCI, since the UE may recognize whether the OCC code of the DMRS pattern is limited, the UE may estimate the CPE and the CFO and then receive a DMRS in which the estimated value is compensated.

When the eNB does not directly inform the UE of whether the CDM is turned on/off in the time domain or the type of OCC code applied to the CDM in the time domain, the UE may assume that MU pairing with another UE having another OCC code is not achieved in the time domain based on the transmission frequency, whether the PTRS for phase estimation is transmitted, the MCS, or the number of layers.

In such a case, the UE may compensate a phase difference between the DMRS symbols due to the CPE represented by each DMRS based on the assumption and perform a receiving operation of performing combining of concatenated DMRS symbols.

For example, when the UE uses a transmission frequency of the mmWave band and the MCS uses 256QAM, a process of combining the concatenated DMRSs after compensating the phase difference between the concatenated DMRS symbols may be performed.

Alternatively, the eNB may schedule to use only the same OCC code in the time domain.

In this case, the UE may receive the DMRS by assuming even a situation in which MU pairing is not achieved in a specific environment to prevent the degradation due to the phase noise and perform channel estimation.

FIGS. 34 to 41 are diagrams illustrating one example of a mapping pattern and performance of a demodulation reference signal depending on the number of antenna ports proposed by the present disclosure.

Figure 34:
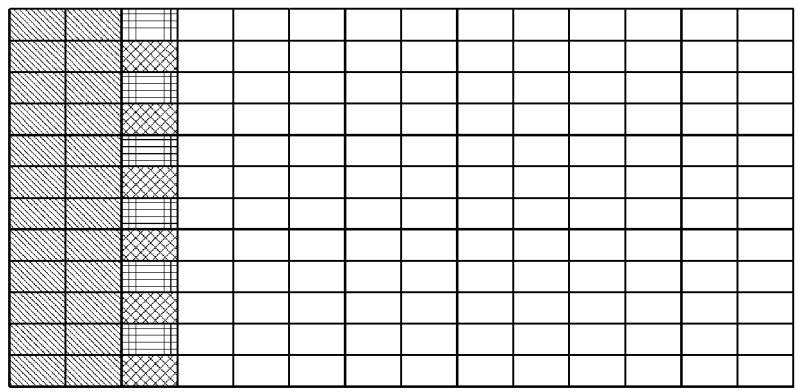
FIGS. 34 to 41 are diagrams illustrating one example of a mapping pattern and performance of a demodulation reference signal depending on the number of antenna ports proposed by the present disclosure.
Figure 34:
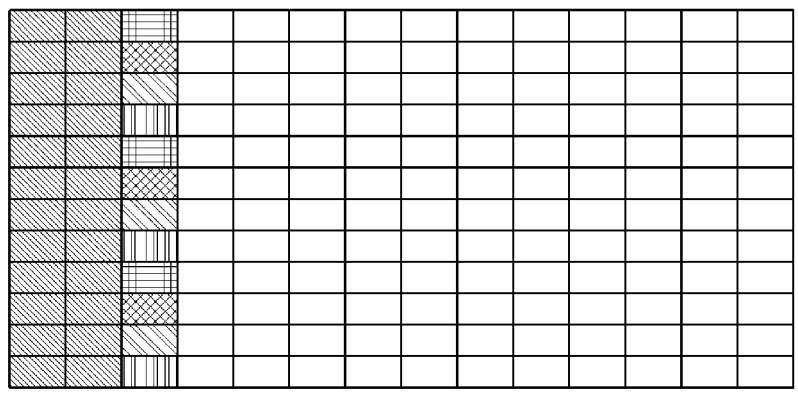
Figure 34:
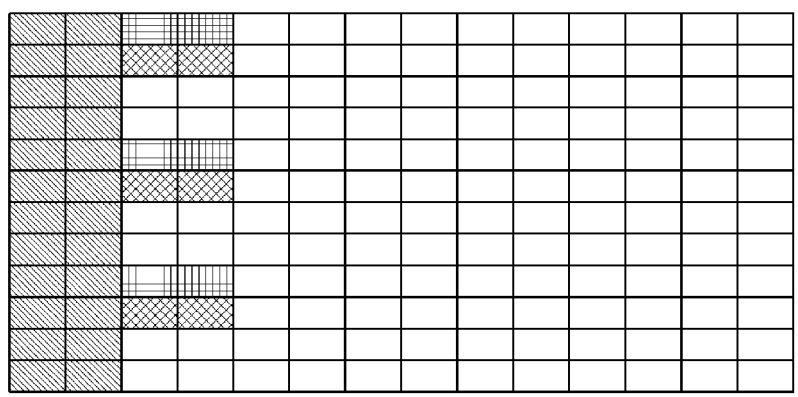
Figure 35:
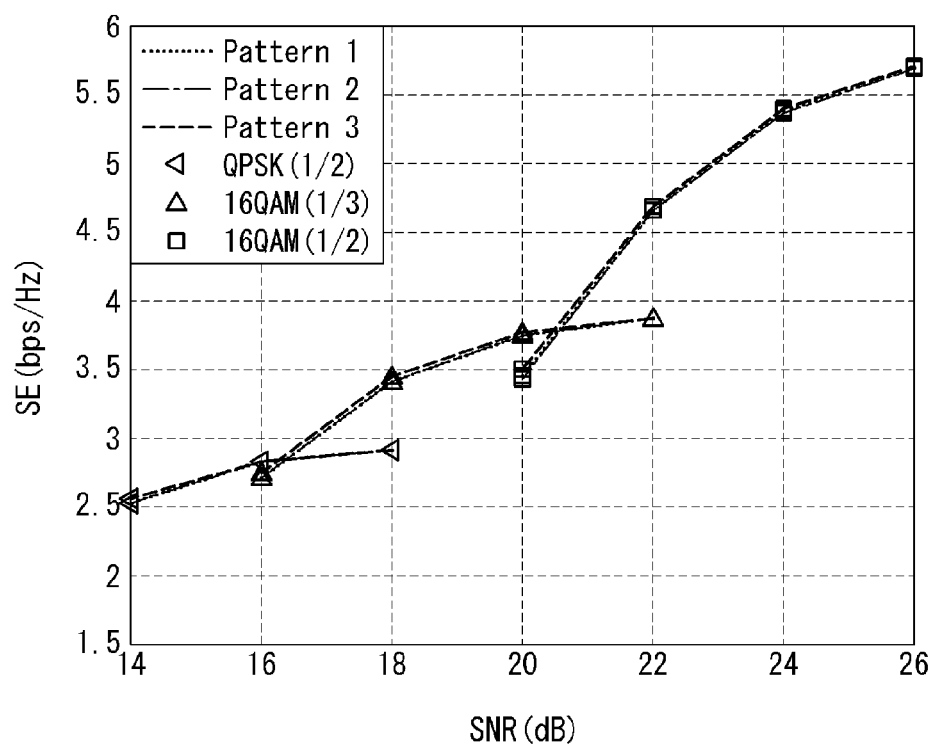

FIGS. 34 and 35 are diagrams illustrating the mapping pattern of the DMRS and the performance of the SE of layer 4 transmission for the mapping pattern when the maximum number of ports is 4.

When FIG. 34(a) is pattern 1, FIG. 34(b) is pattern 2, and FIG. 34(c) is pattern 3, the SE performance of layer 4 transmission for the patterns is illustrated in FIG. 35.

As illustrated in FIG. 35, it can be seen that there is no difference in SE performance between the mapping patterns. However, the mapping pattern of mapping the DMRS by using one OFDM symbol may be advantages for early decoding and may be resistant to the influence of the phase noise in the high-frequency domain.

Figure 36:
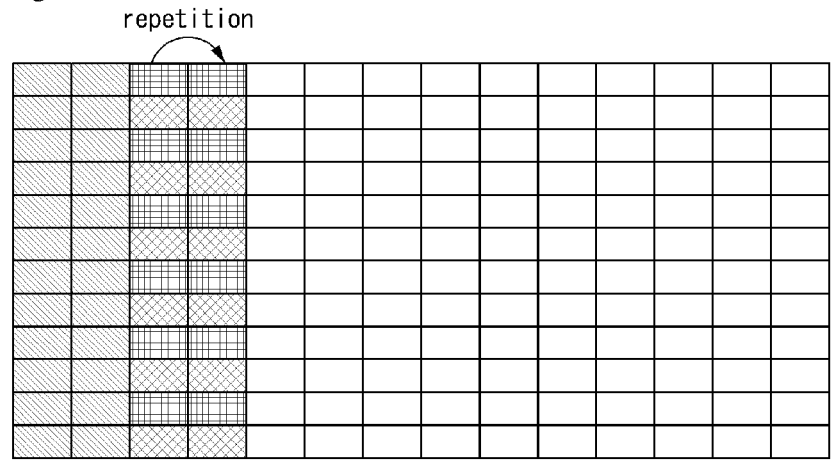
Figure 36:
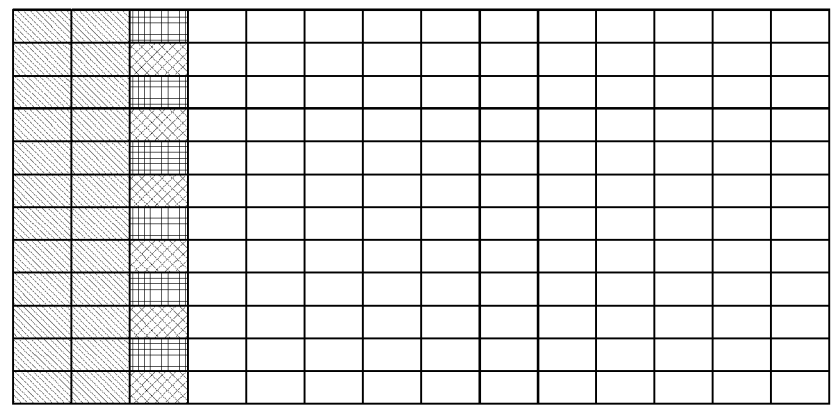
Figure 37:
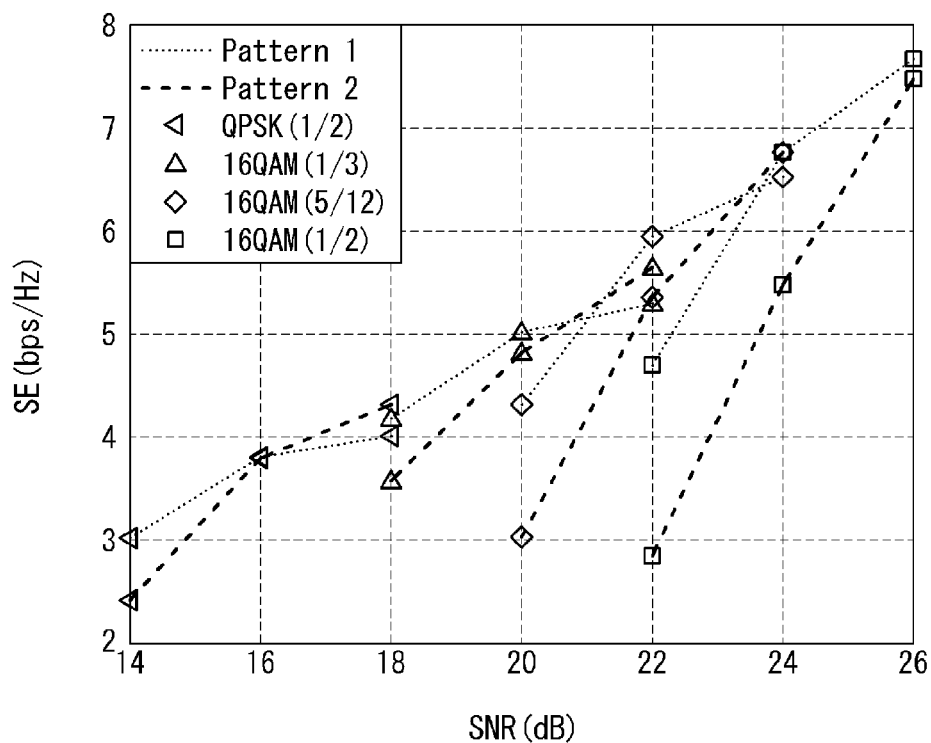

FIGS. 36 and 37 are diagrams illustrating the mapping pattern of the DMRS and the performance of the SE of 6 layer transmission for the mapping pattern when the maximum number of ports is 6.

When FIG. 36(a) is pattern 1, FIG. 36(b) is pattern 2, and FIG. 34(c) is pattern 3, the SE performance of layer 6 transmission for the patterns is illustrated in FIG. 37.

As illustrated in FIG. 37, it can be seen that pattern 1 of using two OFDM symbols for rank 6 has more excellent SE than pattern 2 of using one OFDM symbol.

Since the mapping pattern of using two OFDM symbols may acquire larger RS energy than the mapping pattern of using one OFDM symbol, the channel estimation performance may be enhanced.

Further, since the mapping pattern of using two OFDM symbols may reduce the interlayer interference, the SE performance increases as compared with the case of using one OFDM symbols even though the RS overhead increases.

Further, in case of 4 ports or more, two OFDM symbols based on the DMRS pattern may be supported in the case of the DMRS pattern.

In association with the number of DMRS OFDM symbols, in the case of MU-MIMI transmission, even though the rank of the UE is equal to or smaller than 4, a total transmission rank is larger than rank 4 when MU-MIMO scheduling is considered.

Accordingly, even though the UE receives rank N (N<5) PDSCH by using N DMRS ports, it should be supported that the DMRS is transmitted by using two OFDM symbols by considering an MU-MIMO possibility.

In this case, by considering the advantages of the 1 OFDM symbol DMRS, such as the early decoding, the phase noise influence, and the MU possibility, the number of OFDM symbols to which the DMRS is mapped may be configured as 1 or 2 when each UE rank is 5 less.

Figure 38:
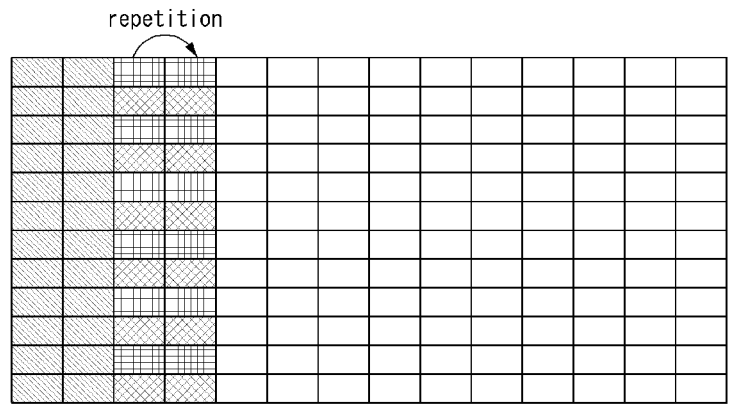
Figure 38:
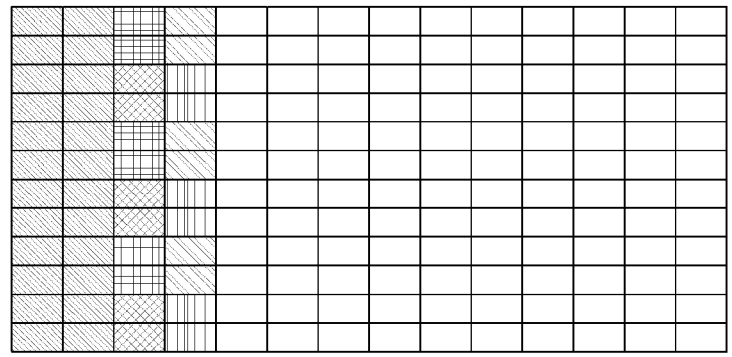
Figure 38:
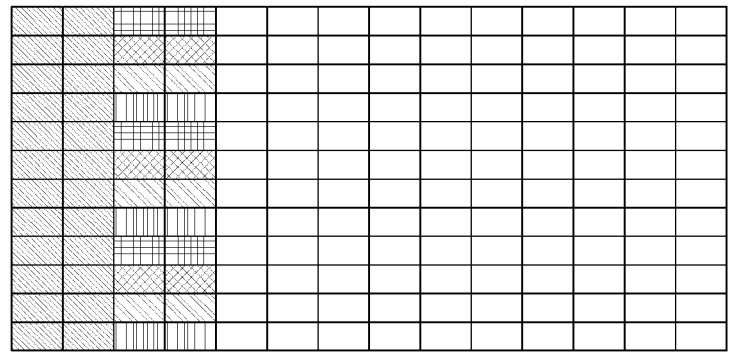
Figure 39:
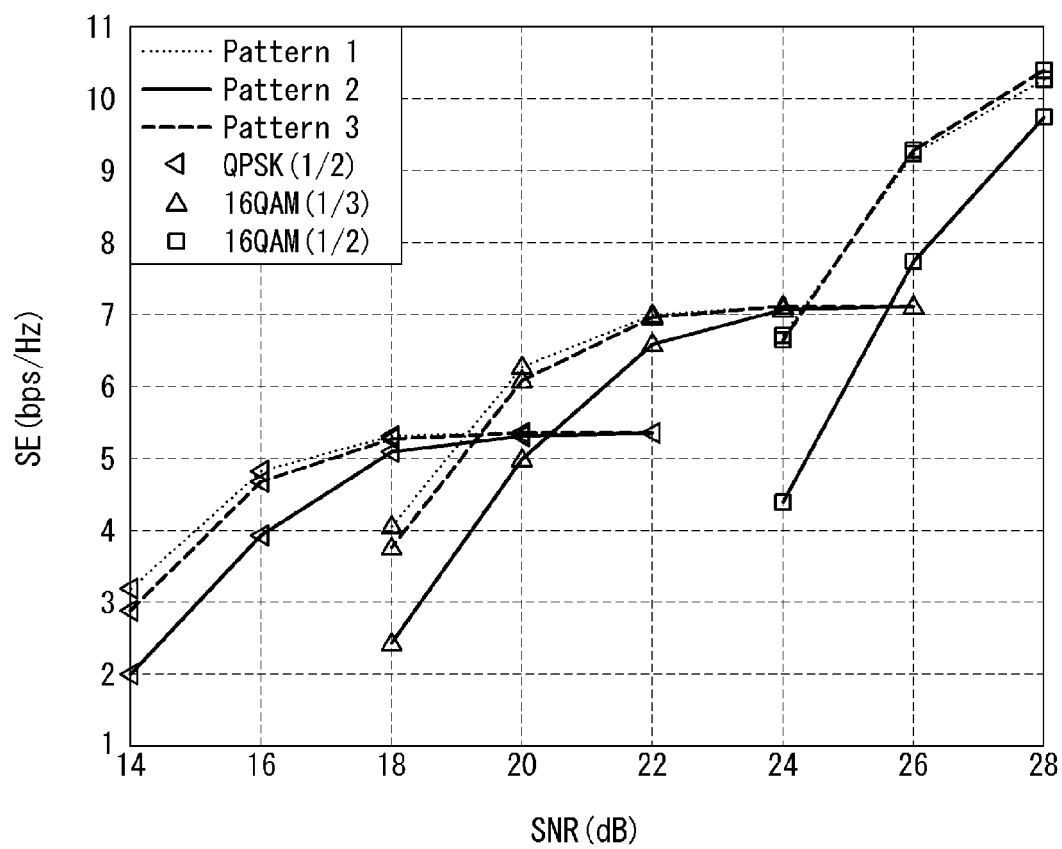

FIGS. 38 and 39 are diagrams illustrating the mapping pattern of the DMRS and the performance of the SE of 8 layer transmission for the mapping pattern when the maximum number of ports is 8.

When FIG. 38(a) is pattern 1, FIG. 38(b) is pattern 2, and FIG. 38(c) is pattern 3, the SE performance of layer 8 transmission for the patterns is illustrated in FIG. 39.

As illustrated in FIG. 39, it can be seen that pattern 1 of using the repetition pattern and pattern 3 of using the time domain CDM have more excellent SE performance than pattern 2 of using the TDM for layer 8 transmission having a DMRS of a maximum of 8 ports.

That is, when the TDM is used in 8 ports, since the ports using the TDM may not share transmission power, pattern 2 of using the TDM causes a boosting power limit of the DMRS to degrade the channel estimation performance, and as a result, SE performance loss occurs.

Pattern 1 of using the repetition pattern and pattern 3 of using the time domain CDM have more excellent SE performance than pattern 2 of using the TDM for layer 8 transmission having a DMRS of a maximum of 8 ports.

Since pattern 1 of repeatedly using the DMRS mapping pattern of one OFDM symbol among patterns 1 to 3 illustrated in FIG. 38 may compensate the phase noise influence by using the repeated DMRS sequence, pattern 1 may be suitable for an mmWave application.

When four ports or more are used, the DMRS mapping pattern of one OFDM symbol may be repeatedly used in the time domain at least in the high-frequency band.

Figure 40:
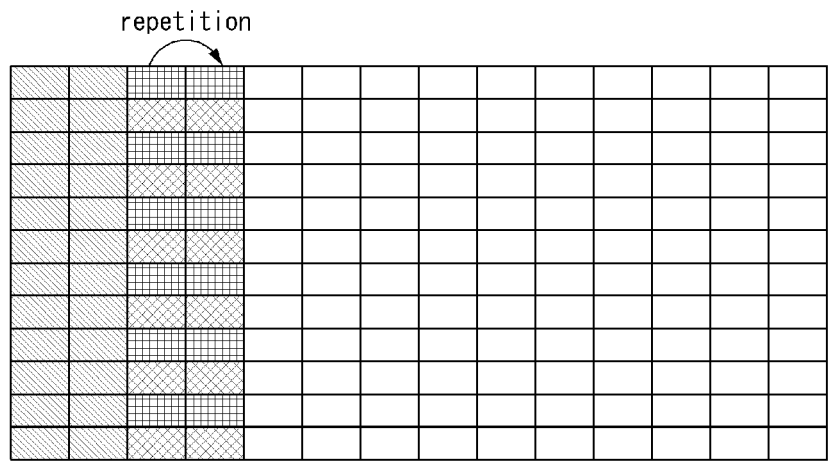
Figure 40:
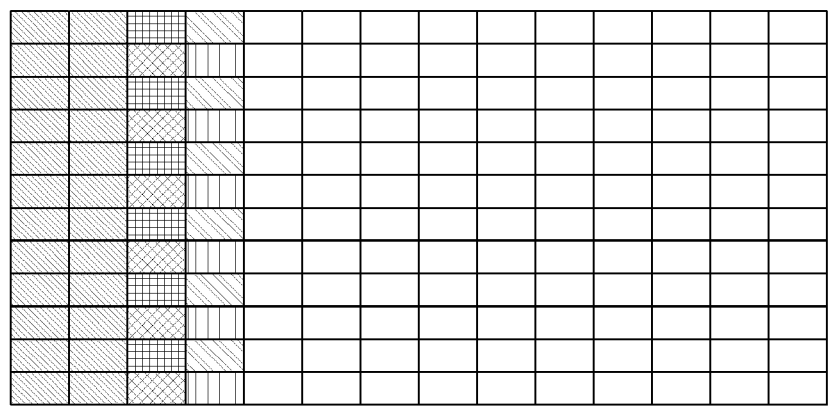
Figure 40:
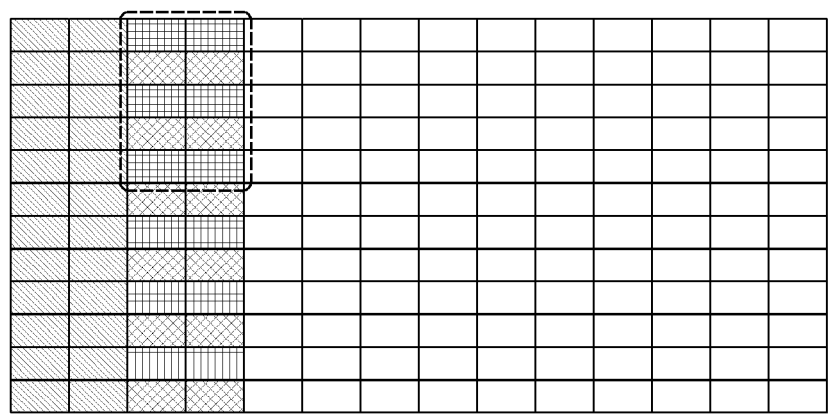
Figure 41:
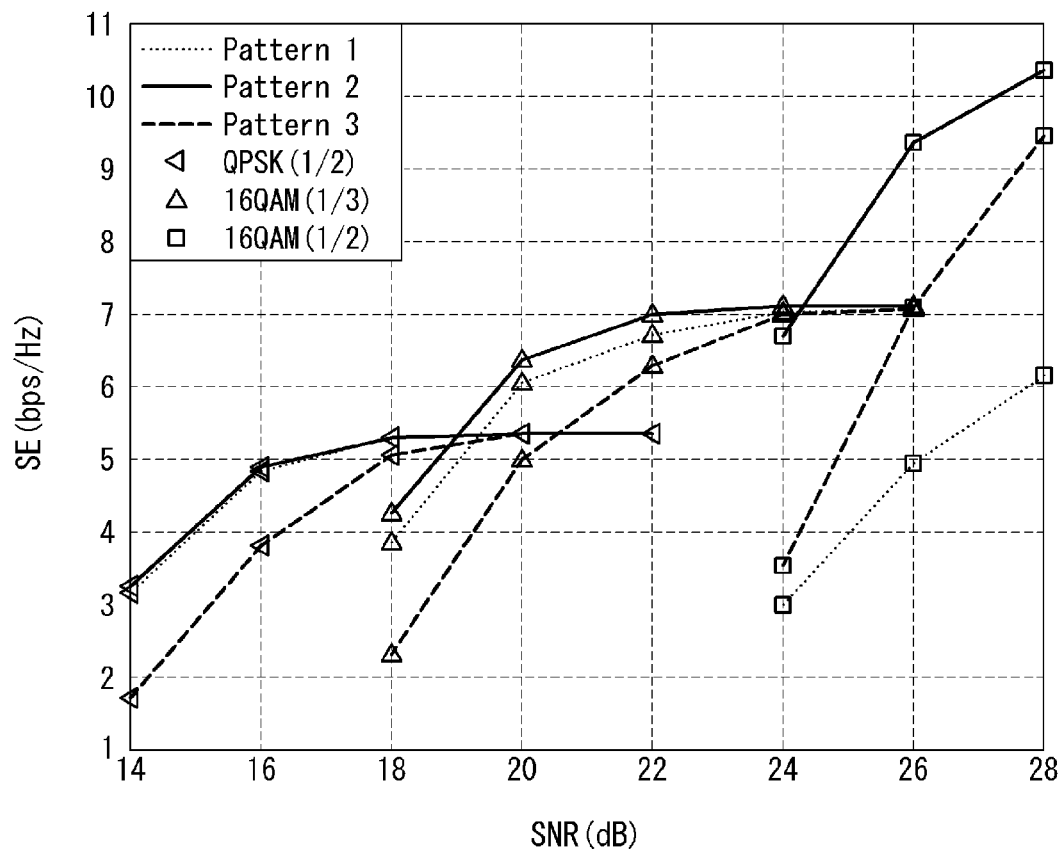

FIGS. 40 and 41 are diagrams illustrating the mapping pattern of the DMRS and the performance of the SE of layer 8 transmission for the mapping pattern when the maximum number of ports is 12.

When FIG. 40(a) is pattern 1, FIG. 38(b) is pattern 2, and FIG. 38(c) is pattern 3, the SE performance of layer 8 transmission for the patterns is illustrated in FIG. 41.

As illustrated in FIG. 41, patterns 1 and 3 have more excellent SE performance than pattern 2 except for a high MCS area.

Since pattern 1 is more sensitive to the frequency selectivity of the channel, the loss in the SE performance may occur in the high MCS area. When lower frequency selectivity is considered, pattern 1 does not cause the SE performance loss in the high MCS area.

As described above, the mapping pattern of repeatedly using the DMRS mapping pattern of one OFDM symbol in four ports or more may provide appropriate channel estimation performance and in particular, the mapping pattern is suitable for the high-frequency band application.

On the contrary, the mapping pattern of using the time domain CDM for port multiplexing may be used in a high-frequency selectivity channel.

When such a point is considered, an optimal mapping pattern and an optimal multiplexing scheme for the DMRS may vary depending on the carrier frequency, the phase noise influence of the UE, the frequency selectivity, and the maximum DMRS port number.

Accordingly, various DMRS mapping patterns and multiplexing methods considering such a point may be used.

Figure 42:
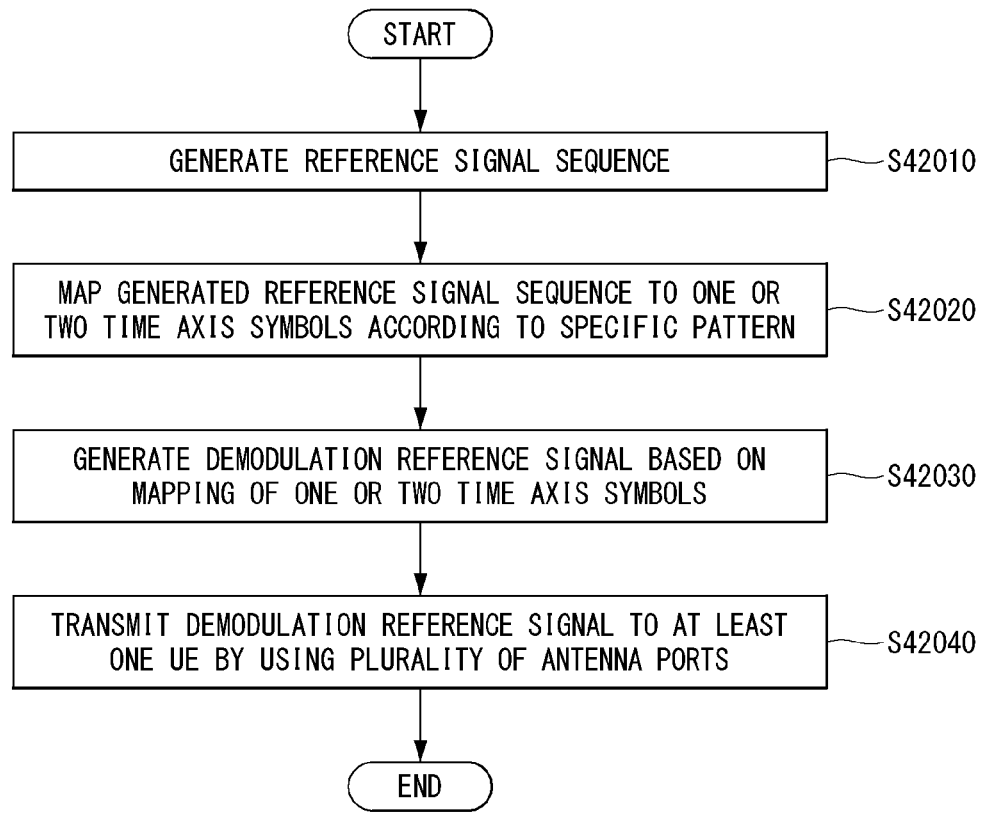
FIG. 42 is a flowchart showing one example of a method for generating and transmitting a demodulation reference signal proposed by the present disclosure.

FIG. 42 is a flowchart showing one example of a method for generating and transmitting a demodulation reference signal proposed by the present disclosure.

Referring to FIG. 42, an eNB generates a reference signal sequence based on a pseudo-random sequence (S42010). In this case, a demodulation reference signal may be the front-loaded DMRS described above.

Thereafter, the eNB maps the generated reference signal sequence to one or two time axis symbols (S42020). In this case, the eNB may map the generated reference signal sequence to one or two time axis symbols according t a specific pattern and the specific pattern may be one of the patterns described in FIGS. 8 to 40.

In this case, the demodulation reference sequence may be generated in units of one symbol through the methods described in FIGS. 10, 11, 29, and 30.

Further, the eNB may map the DMRS to one or two time axis symbols according to the antenna port number described in FIGS. 8 to 40.

Thereafter, the eNB generates the demodulation reference signal based on the mapping of one or two time axis symbols and transmits the generated demodulation reference signal to a UE by using different antenna ports (S42030 and S42040).

In this case, the demodulation reference signal sequence is mapped onto the same time axis symbol and each demodulation reference signal is transmitted on a specific antenna port and the demodulation reference signal may be positioned on the same time axis symbol as at least one another demodulation reference signal transmitted on another antenna port.

Figure 43:
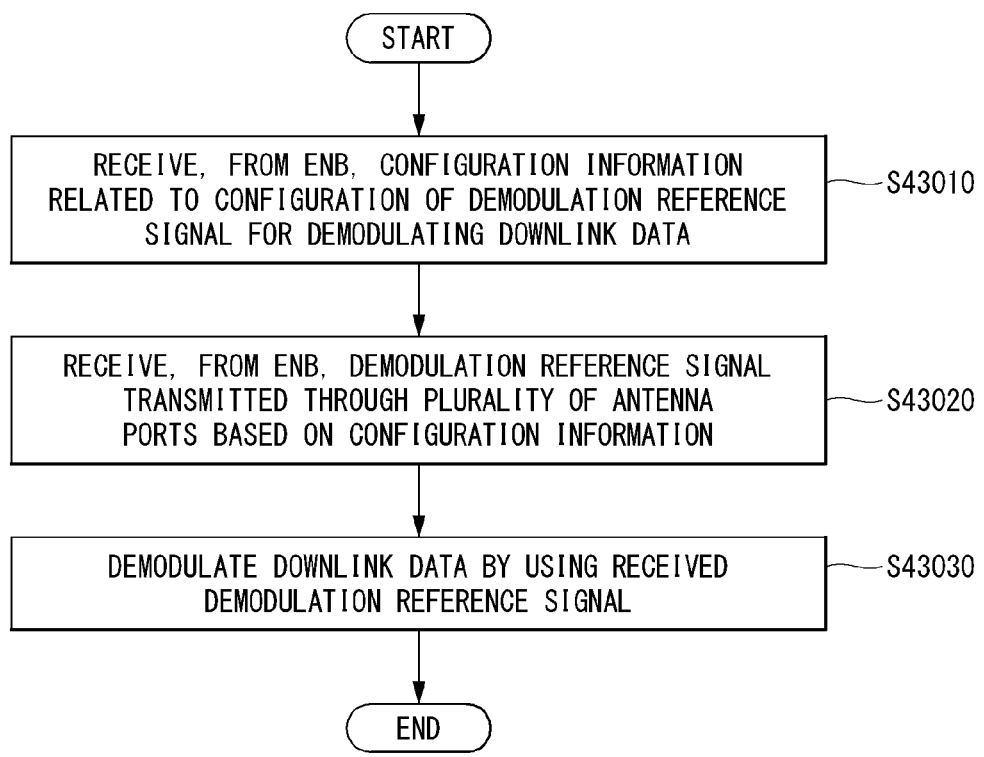
FIG. 43 is a flowchart showing one example of a method for decoding data by receiving a demodulation reference signal proposed by the present disclosure.

FIG. 43 is a flowchart showing one example of a method for decoding data by receiving a demodulation reference signal proposed by the present disclosure.

Referring to FIG. 43, the UE receives, from the eNB, configuration information related to the configuration of the demodulation reference signal for modulating downlink data (S43010).

The configuration information related to the demodulation reference signal may include at least one of the maximum number of ports related to mapping of the DMRS, the number of OFDM symbols to which the DMRS is mapped, or the port multiplexing method as described in FIGS. 10 and 11.

Further, the UE may receive, from the eNB, downlink control information (DCI) including information such as the antenna port depending on the number of codewords and the number of layers.

Thereafter, the UE receives the demodulation reference signal transmitted through a plurality of antenna ports from the eNB based on the received configuration information (S43020).

In this case, the demodulation reference signal may be mapped to the Orthogonal Frequency Division Multiplexing (OFDM) symbol according to the specific pattern as described in FIGS. 8 to 40 and multiplexed through the Code Division Multiplexing scheme.

Further, the specific pattern may be one of the patterns described in FIGS. 8 to 40 and as the Code Division Multiplexing scheme, a Cyclic Shift Code may be applied to the frequency do main and an Orthogonal Cover Code may be applied to the time domain as described in FIGS. 10 and 11.

Further, the demodulation reference signal may be transmitted on a specific antenna port and may be positioned on one or two time axis symbols which are the same as at least one another demodulation reference signal transmitted on another antenna port.

Thereafter, the UE may demodulate the downlink data by using the received demodulation reference signal (S43030).

Figure 44:
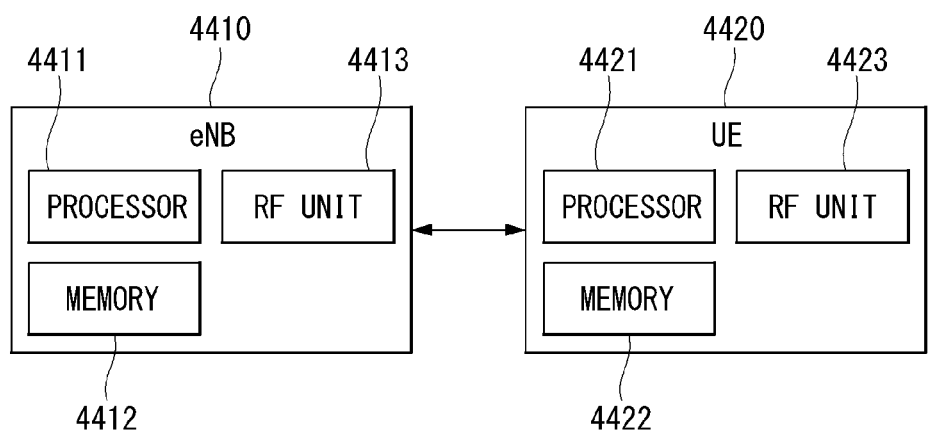
FIG. 44 is a diagram illustrating one example of an internal block diagram of a wireless apparatus to which the present disclosure may be applied.

FIG. 44 is a diagram illustrating one example of an internal block diagram of a wireless apparatus to which the present disclosure may be applied.

Here, the wireless apparatus may be an eNB or a UE and the eNB includes both a macro eNB and a small eNB.

As illustrated in FIG. 44, the eNBn 4410 and the UE 4420 include communication units (a transceiving unit and an RF unit) 4413 and 4423, processors 4411 and 4421, and memories 4412 and 4422.

Besides, the BS and the UE may further include an input unit and an output unit.

The communication units 4413 and 4423 the processors 4411 and 4421, the input unit, the output unit, and the memories 4412 and 4422 are functionally connected to perform the method proposed in the present disclosure.

Upon receiving information generated from a PHY protocol layer, the communication units (the transceiving unit and the RF unit) 4413 and 4423 move the received information to a radio-frequency (RF) spectrum and performs filtering, amplification, and the like and transmits the information to an antenna. Further the communication unit performs a function to move a radio frequency RF) signal received by the antenna to a band that may be processed by a PHY protocol and perform filtering.

In addition, the communication unit may also include a switch function for switching transmission and reception functions.

The processors 4411 and 4421 implement a function, a process, and/or a method which are proposed in the present specification. Layers of a radio interface protocol may be implemented by the processor.

The processor may be expressed as a control section, a controller, a control unit, a computer, and the like.

The memories 4412 and 4422 are connected with the processor to store a protocol or a parameter for performing the uplink resource allocation method.

The processors 4411 and 4421 may include an application-specific integrated circuit (ASIC), another chipset, a logic circuit, and/or a data processing apparatus. The memory may include a read-only memory (ROM), a random access memory (RAM), a flash memory, a memory card, a storage medium, and/or other storage devices. The communication unit may include a baseband circuit for processing the radio signal. When the embodiment is implemented by software, the aforementioned technique may be implemented by a module (a process, a function, and the like) that performs the aforementioned function.

The module may be stored in the memory and executed by the processor. The memory may be positioned inside or outside the processor and connected with the processor by various well-known means.

An output unit (display section or display unit) is controlled by the processor, and outputs information output from the processor together with a key input signal generated by a key input unit various information signals from the processor.

Furthermore, although the drawings have been described for the sake of convenience of explanation, it is also possible to design a new embodiment to be implemented by merging the embodiments described in each drawing. It is also within the scope of the present disclosure to design a computer-readable recording medium in which a program for executing the previously described embodiments is recorded according to the needs of those skilled in the art.

Configurations and methods of the described embodiments may not be limitedly applied to the direction based apparatus search method according to present disclosure, but all or some of the respective embodiments may be selectively combined and configured so as to be variously modified.

Meanwhile, the direction based apparatus search method of present disclosure may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of present disclosure have been illustrated and described above, present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

In addition, in present disclosure, both the invention of the object and the invention of the method are described and the description of both inventions may be supplemented as necessary.

INDUSTRIAL APPLICABILITY

An example in which in the wireless communication system of the present disclosure, the RRC connection method is applied to the 3GPP LTE/LTE-A system is described primarily, but it is possible to apply the RRC connection method to various wireless communication systems in addition to the 3GPP LTE/LTE-A system.

The invention claimed is:

1. A method for demodulating, by a terminal, data in a wireless communication system, the method comprising:
   receiving, from a base station, configuration information related to a configuration of a demodulation reference signal (DMRS);
   receiving, from the base station, the DMRS transmitted through a plurality of antenna ports based on the configuration information; and
   demodulating the data by using the received DMRS,
   wherein the DMRS is mapped to an Orthogonal Frequency Division Multiplexing (OFDM) symbol according to a specific pattern and multiplexed through a Code Division Multiplexing scheme, wherein, based on the Code Division Multiplexing scheme, a cyclic shift code is applied in a frequency domain and an orthogonal cover code is applied in a time domain, and wherein a bit number of the configuration information is determined based on a number of codewords related to the DMRS and the configuration information includes at least one of the number of a plurality of antenna ports, the number of symbols to which the DMRS is mapped, or a number of layers related to the DMRS.

2. The method of claim 1, wherein the specific pattern is one of a first pattern in which the DMRS is mapped to one OFDM symbol or a second pattern in which the DMRS is mapped to two OFDM symbols.

3. The method of claim 1, wherein the DMRS is transmitted on a specific antenna port among the plurality of antenna ports and positioned on one or two time axis symbols which are the same as at least one another DMRS transmitted on another antenna port among the plurality of antenna ports.

4. The method of claim 1, wherein a DMRS sequence for generating the DMRS is generated by the cyclic shift code, the orthogonal cover code, and a base sequence.

5. The method of claim 4, wherein, based on the cyclic shift code being $w_{freq,p}(k')$, the orthogonal cover code being $w_{time,p}(l')$, and the base sequence being $r(k'')$, the DMRS sequence $a_{k,l}^{(p)}$ is generated by one of two following equations:

$$a_{k,l}^{(p)} = w_{time,p}(l') \cdot w_{freq,p}(k') \cdot r(k'') \text{ or}$$

$$a_{k,l}^{(p)} = w_{time,p}(l') \cdot w_{freq,p}(k') \cdot r(k'',l'').$$

6. The method of claim 4, wherein the base sequence is generated in units of one OFDM symbol.

7. The method of claim 4, wherein the base sequence is initialized by an index of the OFDM symbol.

8. The method of claim 1, further comprising:
performing a channel estimation procedure for estimating a channel for receiving the data by using the DMRS,
wherein the channel estimation procedure is performed by using a cyclic shift characteristic by the cyclic shift code.

9. The method of claim 1,
wherein the cyclic shift code is a Discrete Fourier Transform (DFT) code, and
wherein the orthogonal cover code is a Walsh-Hadamard code.

10. A terminal demodulating data in a wireless communication system, the terminal comprising:
a radio frequency (RF) unit including a transceiver configured to transmit and receive a radio signal; and
a processor functionally coupled with the RF unit,
wherein the processor is configured to
receive, from a base station, configuration information related to a configuration of a demodulation reference signal (DMRS),
receive, from the base station, the DMRS transmitted through a plurality of antenna ports based on the configuration information, and
demodulate the data by using the received DMRS,
wherein the DMRS is mapped to an Orthogonal Frequency Division Multiplexing (OFDM) symbol according to a specific pattern and multiplexed through a Code Division Multiplexing scheme,
wherein, based on the Code Division Multiplexing scheme, a cyclic shift code is applied in a frequency domain and an orthogonal cover code is applied in a time domain, and
wherein a bit number of the configuration information is determined based on a number of codewords related to the DMRS and the configuration information includes at least one of the number of a plurality of antenna ports, the number of symbols to which the DMRS is mapped, or a number of layers related to the DMRS.

11. The terminal of claim 10, wherein the specific pattern is one of a first pattern in which the DMRS is mapped to one OFDM symbol or a second pattern in which the DMRS is mapped to two OFDM symbols.

12. The terminal of claim 10, wherein the DMRS is transmitted on a specific antenna port among the plurality of antenna ports and positioned on one or two time axis symbols which are the same as at least one another DMRS transmitted on another antenna port among the plurality of antenna ports.

13. The terminal of claim 10, wherein a DMRS sequence for generating the DMRS is generated by the cyclic shift code, the orthogonal cover code, and a base sequence.

14. The terminal of claim 13, wherein, based on the cyclic shift code being $w_{freq,p}(k')$, the orthogonal cover code being $w_{time,p}(l')$, and the base sequence being $r(k'')$, the DMRS sequence $a_{k,l}^{(p)}$ is generated by one of two following equations:

$$a_{k,l}^{(p)} = w_{time,p}(l') \cdot w_{freq,p}(k') \cdot r(k''), \text{ or}$$

$$a_{k,l}^{(p)} = w_{time,p}(l') \cdot w_{freq,p}(k') \cdot r(k'',l'').$$

15. The terminal of claim 13, wherein the base sequence is generated in units of one OFDM symbol.

16. The terminal of claim 13, wherein the base sequence is initialized by an index of the OFDM symbol.

17. The terminal of claim 10,
wherein the processor performs a channel estimation procedure for estimating a channel for receiving the data by using the DMRS, and
wherein the channel estimation procedure is performed by using a cyclic shift characteristic by the cyclic shift code.

18. The terminal of claim 10,
wherein the cyclic shift code is a Discrete Fourier Transform (DFT) code, and
wherein the orthogonal cover code is a Walsh-Hadamard code.

* * * * *